United States Patent
Colossi et al.

(10) Patent No.: US 7,953,694 B2
(45) Date of Patent: May 31, 2011

(54) METHOD, SYSTEM, AND PROGRAM FOR SPECIFYING MULTIDIMENSIONAL CALCULATIONS FOR A RELATIONAL OLAP ENGINE

(75) Inventors: Nathan Gevaerd Colossi, San Jose, CA (US); William Earl Malloy, Santa Clara, CA (US); Mir Hamid Pirahesh, San Jose, CA (US); Craig Reginald Tomlyn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1479 days.

(21) Appl. No.: 10/341,763

(22) Filed: Jan. 13, 2003

(65) Prior Publication Data

US 2004/0139061 A1    Jul. 15, 2004

(51) Int. Cl.
*G06F 7/00* (2006.01)
*G06F 17/00* (2006.01)
*G06F 17/30* (2006.01)

(52) U.S. Cl. ............................ 707/600; 707/759
(58) Field of Classification Search ............. 707/600, 707/759
See application file for complete search history.

(56) References Cited

U.S. PATENT DOCUMENTS

| | | | |
|---|---|---|---|
| 5,537,524 A | 7/1996 | Aprile | |
| 5,594,897 A | 1/1997 | Goffman | |
| 5,692,107 A | 11/1997 | Simoudis et al. | |
| 5,692,175 A | 11/1997 | Davies et al. | |
| 5,706,494 A * | 1/1998 | Cochrane et al. | 1/1 |
| 5,748,188 A | 5/1998 | Hu et al. | |
| 5,767,854 A | 6/1998 | Anwar | |
| 5,832,475 A | 11/1998 | Agrawal et al. | |
| 5,832,496 A | 11/1998 | Anand et al. | |
| 5,870,746 A | 2/1999 | Knutson et al. | |
| 5,905,985 A | 5/1999 | Malloy et al. | |
| 5,918,232 A | 6/1999 | Pouschine et al. | |
| 5,926,815 A | 7/1999 | James, III | |
| 5,926,818 A | 7/1999 | Malloy | |
| 5,943,668 A | 8/1999 | Malloy et al. | |
| 5,960,423 A | 9/1999 | Chaudhuri et al. | |
| 5,978,788 A | 11/1999 | Castelli et al. | |
| 5,991,754 A * | 11/1999 | Raitto et al. | 707/2 |
| 6,003,036 A * | 12/1999 | Martin | 707/102 |

(Continued)

FOREIGN PATENT DOCUMENTS

JP    9106331    4/1997

(Continued)

OTHER PUBLICATIONS

Raphaely et al. Oracle8i Application Developer's Guide—Fundamentals, Release 8.1.5, Feb. 1999. pp. 20-1 to 20-22.*

(Continued)

*Primary Examiner* — Charles E Lu
(74) *Attorney, Agent, or Firm* — Janaki K. Davda; Konrad Raynes & Victor LLP

(57) ABSTRACT

Provided is a system, method, and program for specifying multidimensional calculations. Selection of a subset of a cube model metadata object that is generated from a facts metadata object and one or more dimension metadata objects is received. The facts metadata object references one or more measure metadata objects. A statement is generated for retrieving multidimensional information using metadata in the cube model metadata object and the measure metadata objects, wherein each of the measure metadata objects specifies one or more aggregations.

39 Claims, 42 Drawing Sheets

U.S. PATENT DOCUMENTS

| | | | |
|---|---|---|---|
| 6,031,977 A | 2/2000 | Pettus | |
| 6,092,064 A | 7/2000 | Aggarwal et al. | |
| 6,115,547 A * | 9/2000 | Ghatate et al. | |
| 6,122,636 A | 9/2000 | Malloy et al. | |
| 6,134,532 A | 10/2000 | Lazarus et al. | |
| 6,144,962 A | 11/2000 | Weinberg et al. | |
| 6,175,836 B1 | 1/2001 | Aldred | |
| 6,205,447 B1 | 3/2001 | Malloy | |
| 6,226,647 B1 | 5/2001 | Venkatasubramanian et al. | |
| 6,249,791 B1 | 6/2001 | Osborn et al. | |
| 6,292,797 B1 | 9/2001 | Tuzhilin et al. | |
| 6,308,168 B1 | 10/2001 | Dovich et al. | |
| 6,317,750 B1 | 11/2001 | Tortolani et al. | |
| 6,324,533 B1 | 11/2001 | Agrawal et al. | |
| 6,327,574 B1 | 12/2001 | Kramer et al. | |
| 6,339,776 B2 | 1/2002 | Dayani-Fard et al. | |
| 6,362,823 B1 | 3/2002 | Johnson et al. | |
| 6,366,903 B1 | 4/2002 | Agrawal et al. | |
| 6,374,234 B1 | 4/2002 | Netz | |
| 6,385,604 B1 | 5/2002 | Bakalash et al. | |
| 6,385,609 B1 | 5/2002 | Barshefsky et al. | |
| 6,408,292 B1 | 6/2002 | Bakalash et al. | |
| 6,418,428 B1 | 7/2002 | Bosch et al. | |
| 6,421,665 B1 | 7/2002 | Brye et al. | |
| 6,438,537 B1 | 8/2002 | Netz et al. | |
| 6,449,609 B1 | 9/2002 | Witkowski | |
| 6,477,536 B1 | 11/2002 | Pasumansky et al. | |
| 6,480,836 B1 | 11/2002 | Colby et al. | |
| 6,484,179 B1 | 11/2002 | Roccaforte | |
| 6,539,371 B1 | 3/2003 | Bleizeffer et al. | |
| 6,542,895 B1 | 4/2003 | DeKimpe et al. | |
| 6,546,381 B1 | 4/2003 | Subramanian et al. | |
| 6,546,395 B1 | 4/2003 | DeKimpe et al. | |
| 6,567,796 B1 | 5/2003 | Yost et al. | |
| 6,574,619 B1 * | 6/2003 | Reddy et al. | 707/2 |
| 6,574,791 B1 | 6/2003 | Gauthier et al. | |
| 6,581,054 B1 | 6/2003 | Bogrett | |
| 6,581,068 B1 * | 6/2003 | Bensoussan et al. | 707/104.1 |
| 6,604,110 B1 | 8/2003 | Savage et al. | |
| 6,609,123 B1 | 8/2003 | Cazemier et al. | |
| 6,615,201 B1 | 9/2003 | Seshadri et al. | |
| 6,628,312 B1 | 9/2003 | Rao et al. | |
| 6,633,882 B1 | 10/2003 | Fayyad et al. | |
| 6,633,885 B1 | 10/2003 | Agrawal et al. | |
| 6,636,845 B2 | 10/2003 | Chau et al. | |
| 6,636,853 B1 | 10/2003 | Stephens, Jr. | |
| 6,643,633 B2 | 11/2003 | Chau et al. | |
| 6,643,661 B2 | 11/2003 | Polizzi et al. | |
| 6,651,055 B1 | 11/2003 | Kilmer et al. | |
| 6,654,764 B2 | 11/2003 | Kelkar et al. | |
| 6,665,682 B1 | 12/2003 | DeKimpe et al. | |
| 6,671,689 B2 | 12/2003 | Papierniak | |
| 6,681,223 B1 | 1/2004 | Sundaresan | |
| 6,684,207 B1 | 1/2004 | Greenfield et al. | |
| 6,694,322 B2 | 2/2004 | Warren et al. | |
| 6,697,808 B1 | 2/2004 | Hurwood et al. | |
| 6,707,454 B1 | 3/2004 | Barg et al. | |
| 6,711,579 B2 | 3/2004 | Balakrishnan | |
| 6,711,585 B1 | 3/2004 | Copperman et al. | |
| 6,714,940 B2 | 3/2004 | Kelkar | |
| 6,768,986 B2 | 7/2004 | Cras et al. | |
| 6,775,662 B1 * | 8/2004 | Witkowski et al. | 707/3 |
| 6,801,992 B2 | 10/2004 | Gajjar et al. | |
| 6,823,334 B2 | 11/2004 | Vishnubhotla et al. | |
| 6,831,668 B2 | 12/2004 | Cras et al. | |
| 6,842,758 B1 | 1/2005 | Bogrett | |
| 6,865,573 B1 | 3/2005 | Hornick et al. | |
| 6,871,140 B1 | 3/2005 | Florance et al. | |
| 6,898,603 B1 | 5/2005 | Petculescu et al. | |
| 6,931,418 B1 | 8/2005 | Barnes | |
| 6,947,929 B2 | 9/2005 | Bruce et al. | |
| 6,957,225 B1 | 10/2005 | Zait et al. | |
| 6,996,556 B2 | 2/2006 | Boger et al. | |
| 7,007,039 B2 | 2/2006 | Chaudhuri et al. | |
| 7,051,038 B1 | 5/2006 | Yeh et al. | |
| 7,139,764 B2 | 11/2006 | Lee | |
| 7,149,983 B1 | 12/2006 | Robertson et al. | |
| 7,162,464 B1 | 1/2007 | Miller et al. | |
| 7,188,090 B2 | 3/2007 | Kim et al. | |
| 7,191,169 B1 | 3/2007 | Tao | |
| 7,203,671 B1 | 4/2007 | Wong | |
| 7,246,116 B2 | 7/2007 | Barsness et al. | |
| 7,266,565 B2 | 9/2007 | Diab | |
| 7,275,024 B2 | 9/2007 | Yeh et al. | |
| 7,346,601 B2 | 3/2008 | Chaudhuri et al. | |
| 7,430,562 B1 | 9/2008 | Bedell et al. | |
| 7,447,687 B2 | 11/2008 | Andersch et al. | |
| 7,472,127 B2 | 12/2008 | Malloy et al. | |
| 7,480,663 B2 | 1/2009 | Colossi et al. | |
| 2001/0026276 A1 | 10/2001 | Sakamoto et al. | |
| 2001/0037228 A1 * | 11/2001 | Ito et al. | 705/7 |
| 2001/0037327 A1 | 11/2001 | Haas et al. | |
| 2001/0047355 A1 | 11/2001 | Anwar | |
| 2001/0047364 A1 | 11/2001 | Proctor | |
| 2001/0051947 A1 | 12/2001 | Morimoto et al. | |
| 2001/0055018 A1 | 12/2001 | Yaginuma et al. | |
| 2002/0002469 A1 | 1/2002 | Hillstrom | |
| 2002/0029207 A1 | 3/2002 | Bakalash et al. | |
| 2002/0073088 A1 | 6/2002 | Beckmann et al. | |
| 2002/0078039 A1 | 6/2002 | Cereghini et al. | |
| 2002/0087516 A1 | 7/2002 | Cras et al. | |
| 2002/0091679 A1 | 7/2002 | Wright | |
| 2002/0091681 A1 | 7/2002 | Cras et al. | |
| 2002/0095430 A1 | 7/2002 | Egilsson et al. | |
| 2002/0122078 A1 | 9/2002 | Markowski | |
| 2002/0123993 A1 | 9/2002 | Chau et al. | |
| 2002/0124002 A1 | 9/2002 | Su et al. | |
| 2002/0129003 A1 | 9/2002 | Bakalash et al. | |
| 2002/0129032 A1 | 9/2002 | Bakalash et al. | |
| 2002/0138316 A1 | 9/2002 | Katz et al. | |
| 2002/0143783 A1 | 10/2002 | Bakalash et al. | |
| 2002/0188587 A1 | 12/2002 | McGreevy | |
| 2002/0188599 A1 | 12/2002 | McGreevy | |
| 2003/0004914 A1 | 1/2003 | McGreevy | |
| 2003/0004942 A1 | 1/2003 | Bird | |
| 2003/0014397 A1 | 1/2003 | Chau et al. | |
| 2003/0033277 A1 | 2/2003 | Bahulkar et al. | |
| 2003/0055813 A1 | 3/2003 | Chaudhuri et al. | |
| 2003/0055832 A1 | 3/2003 | Roccaforte | |
| 2003/0061207 A1 | 3/2003 | Spektor | |
| 2003/0071814 A1 | 4/2003 | Jou et al. | |
| 2003/0078852 A1 | 4/2003 | Shoen et al. | |
| 2003/0078913 A1 | 4/2003 | McGreevy | |
| 2003/0081002 A1 | 5/2003 | De Vorchik et al. | |
| 2003/0093424 A1 | 5/2003 | Chun et al. | |
| 2003/0101202 A1 | 5/2003 | Kelkar et al. | |
| 2003/0115183 A1 | 6/2003 | Abdo et al. | |
| 2003/0115207 A1 | 6/2003 | Bowman et al. | |
| 2003/0126144 A1 | 7/2003 | O'Halloran et al. | |
| 2003/0184588 A1 | 10/2003 | Lee | |
| 2003/0206201 A1 | 11/2003 | Ly | |
| 2003/0212667 A1 | 11/2003 | Andersch et al. | |
| 2003/0225768 A1 | 12/2003 | Chaudhuri et al. | |
| 2004/0006574 A1 | 1/2004 | Witkowski et al. | |
| 2004/0010505 A1 | 1/2004 | Vishnubhotla | |
| 2004/0059705 A1 | 3/2004 | Wittke et al. | |
| 2004/0098415 A1 | 5/2004 | Bone et al. | |
| 2004/0122646 A1 | 6/2004 | Colossi et al. | |
| 2004/0122844 A1 | 6/2004 | Malloy et al. | |
| 2004/0128287 A1 | 7/2004 | Keller et al. | |
| 2004/0128314 A1 | 7/2004 | Katibah et al. | |
| 2004/0181502 A1 | 9/2004 | Yeh et al. | |
| 2004/0215626 A1 | 10/2004 | Colossi et al. | |
| 2004/0267774 A1 | 12/2004 | Lin et al. | |
| 2005/0027754 A1 | 2/2005 | Gajjar et al. | |
| 2005/0033730 A1 | 2/2005 | Chaudhuri et al. | |
| 2005/0267868 A1 | 12/2005 | Liebl et al. | |
| 2005/0278290 A1 | 12/2005 | Bruce et al. | |
| 2005/0283494 A1 | 12/2005 | Colossi et al. | |
| 2008/0133582 A1 | 6/2008 | Andersch et al. | |

FOREIGN PATENT DOCUMENTS

| | | |
|---|---|---|
| JP | 9146962 | 6/1997 |
| JP | 10247197 | 9/1998 |
| JP | 2001243242 | 9/2001 |
| JP | 2001243244 | 9/2001 |
| JP | 2002007435 | 1/2002 |

| | | |
|---|---|---|
| JP | 2002123530 | 4/2002 |
| WO | 0022493 | 4/2000 |
| WO | 0065479 | 11/2000 |
| WO | 0072165 | 11/2000 |
| WO | WO 01/09768 | 2/2001 |
| WO | 0129690 | 4/2001 |

OTHER PUBLICATIONS

Colliat, George. "OLAP, Relational, and Multidimensional Database Systems." SIGMOD, vol. 25, No. 3, Sep. 1996. pp. 64-69.*

Hyperion Solutions Corp., © 1998. "Providing OLAP to User-Analysts: An IT Mandate," by E.F. Codd & Associates, pp. 1-22, [online] [retrieved on Oct. 8, 2002]. Retrieved from http://www.hyperion.com/downloads/olap_to_useranalysts_wp.pdf.

Business Intelligence, Ltd., © 2002. "The OLAP Report: What is OLAP?," by N. Pendse, pp. 1-7, [online] [retrieved on Oct. 8, 2002]. Retrieved from http://www.olapreport.com/fasmi.

Microsoft Corp. & Hyperion Solutions Corp., "XML for Analysis Specification," Version 1.0, Updated on Apr. 24, 2001, pp. 1-107, [online] [retrieved on Oct. 8, 2002]. Retrieved from http://www.essbase.com/downloads/XML_Analysis_spec.pdf.

W3C® (MIT,INRIA, Keio), © 1999. "XML Path Language (Xpath)," Version 1.0, W3C Recommendation Nov. 16, 1999, pp. 1-37, [online] [retrieved on Oct. 8, 2002]. Retrieved from http://www.w3/prg/TR/xpath.

Colossi, N., W. Malloy and B. Reinwald. "Relational Extensions for OLAP." IBM Systems Journal, vol. 41, No. 4, 2002, pp. 714-731.

U.S. Appl. No. 09/356,647, filed Jul. 19, 1999, entitled "Improving Performance of Table Insertion by Using Multiple Threads," by DM DeKimpe, WE Malloy, SE Moore and G. Robinson.

ACM Digital Library, 1998. "Simultaneous Optimization and Evaluation of Multiple Dimensional Queries," by Y. Zhao, P.M. Deshpande, J.F. Naughton and A. Shukla. SIGMOD Record, vol. 27, No. 2, pp. 271-282, Jun. 1998.

ACM Digital Library, 1998. An Alternative Storage Organization for ROLAP Aggregate Views Based on Cubetrees, by Y. Kotidis and N. Roussopoulos. SIGMOD Record, vol. 27, No. 2, pp. 249-258.

ACM Digital Library, 1998. "Requirement-Based Data Cube Schema Design," by D. Cheung, B. Zhou, B. Kao, H. Lu, T.W. Lam and H.F. Ting. Department of Computer Science and Information Systems, University of Hong Kong, pp. 162-169.

ACM Digital Library, 1999. "High Performance Multidimensional Analysis of Large Datasets," by S. Goil and A. Choudhary. Center for Parallel and Distributed Computing, Department of Electrical and Computer Engineering, Northwestern University, pp. 34-39.

"Towards the Building of a Dense-Region-Based OLAP System," by D.W. Cheung, B. Zhou, B. Kao, K. Hu and S.D. Lee, Department of Computer Science and Information Systems; Hong Kong Univ., China. Data and Knowledge Engineering, vol. 36, No. I, pp. 1-27, Jan. 2001. (Abst).

"ScanChunk: an EfficientAlgorithm for Hunting Dense Regions in Data Cube," by B. Zhou. Department of Computer Science and Engineering, Hangzhou, China. Chinese Journal of Computers, vol. 22, No. 6, pp. 620-626, Jun. 1999. Science Press (Abst).

"Topaz: a Cost-Based, Rule-Driven, Multi-Phase Parallelizer," by C Nippl and B. Mitschang. Proceedings of the Twenty-Fourth International Conference on Very-Large Databases, pp. 251-262, 1998. San Francisco: Morgan Kaufmann Publishers, Inc.

Stöhr, T., et al. "*An Integrative and Uniform Model for Metadata Management in Data Warehousing Environments.*" Proceedings of the International Workshop on Design and Management of Data Warehouse DMDW99, Jun. 14-15, 1999, pp. 1-16.

Schwarz, H., et al. "*Improving the Processing of Decision Support Queries: the Case for DSS Optimizer.*" Proceedings 2001 International Database Engineering and Applications Symposium, IEEE Comput. Soc., USA, Jul. 16-18, 2001, pp. 177-186.

Mangisengi, O., et al. "*Metadata Management Concept for Multidimensional OLAP Data Based on Object-Oriented Concepts.*" Web Information Systems Engineering, 2000. Proceedings of the First International Conference on Hong Kong, China, Jun. 19-21, 2000. IEEE Comput. Soc., USA, Jun. 19, 2000, pp. 358-365.

Gray, J., et al. "*Data Cube: a Relational Aggregation Operator Generalizing Group-By, Cross-Tab, and Sub-Totals.*" Journal of Data Mining and Knowledge Discovery, Norwell: MA, USA, 1997, pp. 29-53.

PCT International Search Report for International Application No. PCT/GB03/05490 filed on Dec. 17, 2003.

PCT Written Opinion, Sep. 6, 2004, for International Application No. PCT/GB 03/05490.

PCT International Preliminary Examination Report, Apr. 11, 2005, for International Application No. PCT/GB 03/05490.

Amendment and Request for Preparation of International Preliminary Examination Report in PCT International Application No. PCT International Application No. PCT/GB2003/005490, filed Mar. 31, 2005, 3 pages.

Reply to Written Opinion in PCT International Application No. PCT/GB03/05490, filed Nov. 24, 2004, 4 pages.

Abstract and Machine Translation for JP9106331, published Apr. 22, 1997, Total 44 pp.

Abstract and Machine Translation for JP9146962, published Jun. 6, 1997, Total 31 pp.

Abstract and Machine Translation for JP10247197, published Sep. 14, 1998, Total 40 pp.

Abstract and Machine Translation for JP2001243242, published Sep. 7, 2001, Total 55 pp.

Abstract and Machine Translation for JP2001243244, published Sep. 7, 2001, Total 46 pp.

Abstract and Machine Translation for JP2002007435, published Jan. 11, 2002, Total 63 pp.

Abstract and Machine Translation for JP2002123530, published Apr. 26, 2002, Total 27 pp.

Abstract for JP2003500741, published Jan. 7, 2003, Total 1 pp [Abstract for corresponding case WO0072165].

Abstract for JP2003519418, published Jun. 17, 2003, Total 1 pp [Abstract for corresponding case WO0109768].

Notice of Allowance 5, Dec. 17, 2009, for U.S. Appl. No. 10/325,245, Total 69 pp.

Colossi, N., W. Malloy and B. Reinwald. "Relational Extensions for OLAP." IBM Systems Journal, vol. 41, No. 4, 2002, pp. 714-731.

Albrecht, J., W. Hummer, W. Lehner, and L. Schlesinger, "Query Optimization by Using Derivability In a Data Warehouse Environment", Proceedings of the 3rd ACM international workshop on Data warehousing and OLAP, 2000, Total 8 pp.

Alcorn, M.H., "Seeing is Believing", [online], 2004, [Retrieved on Jun. 28, 2007], retrieved from the Internet at <URL: http://www.db2mag.com/story/showArticle.jhtml?articleID=17602307>, DB2 Magazine, Quarter 1, vol. 9, No. 1, Total 15 pp.

Andres, F., M. Noureddine, K. Ono, and A. Zhang, "Metadata Model, Resource Discovery, and Querying on Large Scale Multidimensional Datasets—The GEREQ Project", Proceedings 2000 Kyoto International Conference on DigitalLibraries: Research and Practice, 2000, (and IEEE 2001) Total 8 pp.

Bird, C.L. and S.G. Chapman, "Viewing Data Within a Three-Dimensional Space by Two-Dimensional Devices", IBM Technical Disclosure Bulletin, vol. 34, No. 12, May 1992, Total 2 pp.

Bito, Y., R. Kero, H. Matsuo, Y. Shintani, and M. Silver, "Interactively Visualizing Data Warehouses", Journal of Healthcare Information Management, vol. 15, No. 2, 2001,Total 10 pp.

Chen, Q., "Mining Exceptions and Quantitative Association Rules in OLAP Data Cube", Dissertation, Jul. 1999, Department of Computer Science, University of Science and Technology of China, Simon Fraser University, Total 113 pp.

Eick, S.G., "New Visualization Techniques", SIGGRAPH Computer Graphics Newsletter, vol. 34, No. 1, [online] Feb. 2000, [retrieved on Apr. 8, 2004], retrieved from the Internet at <URL: http://www.siggraph.org/publications/newsletter/v34n1/contributions/Eick.html>, Total 11 pp.

Final Office Action 1, Jan. 5, 2006, for U.S. Appl. No. 10/323,131, Total 14 pp.

Final Office Action 1, Mar. 2, 2006, for U.S. Appl. No. 10/410,793, Total 22 pp.

Final Office Action 1, Mar. 27, 2007, for U.S. Appl. No. 10/867,970, Total 21 pp.

Final Office Action 1, Oct. 4, 2007, for U.S. Appl. No. 10/874,398, Total 32 pp.

Final Office Action 2, Mar. 27, 2007, for U.S. Appl. No. 10/410,793, Total 23 pp.

Final Office Action 2, Feb. 4, 2008, for U.S. Appl. No. 10/867,970, Total 13 pp.

Final Office Action 3, Apr. 24, 2008, for U.S. Appl. No. 10/410,793, Total 19 pp.

Goil S. and A. Choudhary, "A Parallel Scalable Infrastructure for OLAP and Data Mining", Proceedings of the International Symposium on Database Engineering and Applications, Aug. 1999, Total 10 pp.

Hammer, J. and L. Fu., "CubiST++: Evaluating Ad-Hoc CUBE Queries Using Statistics Trees", Distributed and Parallel Database, vol. 14, Iss. 3, 2003, Total 34 pp.

Han, J, S. Nishio, H. Kawano, and W. Wang, "Generalization-Based Data Mining in Object-Oriented Databases Using an Object Cube Model", Data and Knowledge Engineering, vol. 25, 1998, Total 43 pp.

Hedberg S.R., "Parallelism Speeds Data Mining", IEEE Parallel & Distributed Technology, vol. 3, No. 4, Winter 1995, Total 4 pp.

Hess, J.T. and J.D. Wells, "Understanding How Metadata and Explanations Can Better Support Data Warehousing and Related Decision Support Systems: An Exploratory Case Study", Proceedings of the 35th Annual Hawaii International Conference on System Sciences, 2002 IEEE, Total 10 pp.

Howard, J., "DB2 Newsletter", [online], Jun. 2003 [retrieved on Apr. 1, 2009], retrieved from the Internet at <URL:http://txmq_.com/resources/newsletter_archive/db2news_jun03.htm>, Total 12 pp.

Huynh, T.N., O. Mangisengi, A.M., TJOA, "Metadata for Object-Relational Data Warehouse", Proceedings of the International Workshop on Design and Management of Data Warehouses, Jun. 2000, Total 9 pp.

IBM Corporation, "IBM DB2 Information Integrator V8.1", Software Announcement, May 20, 2003, Total 19 pp.

IBM Corporation, "IBM QMF for Windows for DB2 Workstation Databases, V7.2—Business Intelligence Starts Here!",Software Announcement, Feb. 26, 2002, Total 6 pp.

IBM Query Management Facility, "QMF High Performance Option User's Guide for z/OS and OS/390", IBM Corp., 2002, Version 7, Release 2, Total 355 pp.

IDS Report, Jun. 16, 2009, listing art cited by the examiner in the Jun. 2, 2009 Office Action for JP2004-566154, Total 2 pp.

Kamber, M., J. Han, and J.Y. Chiang, "Metarule-Guided Mining of Multi-Dimensional Association Rules Using Data Cubes", Proceedings of the 3rd International Conference on Knowledge Discovery and Data Mining, Aug. 1997, Total 4 pp.

Kenan Systems Corporation, "An Introduction to Multidimensional Database Technology", [online], 1993-1995, [retrieved on Apr. 8, 2004], retrieved from the Internet at <URL: http://www.fing.edu.uy/inco/grupos/csi/esp/Cursos/cursos_act/2003DAP_SistDW/Material/ken96.pdf>, Total 29 pp.

Lumpkin, G. and H. Jakobsson, "Query Optimization in Oracle9i, an Oracle White Paper", [online], Feb. 2002, retrieved from the Internet at <URL: http://www.oracle.com/technology/products/bi/pdf/o9i_optimization_twp.pdf>, Total 30 pp.

Maniatis, A.S., P. Vassiliadis, S. Skiadopoulos, and Y. Vassiliou, "Advanced Visualization for OLAP", Proceedings of the 6th ACM International Workshop on Data Warehousing and OLAP, Nov. 2003, Total 8 pp.

Morgan, R., "Web-Based Interactive Database Query Builder", Dissertation submitted to the University of Bristol, Sep. 2002, Total 101 pp.

Mullins, C.S., "Get Your Business Where it Needs to Go", [online], 2003, [Retrieved on Jan. 29, 2008], retrieved from the Internet at <URL: http://www.craigmullins.com/db2infra.htm>, Total 4 pp.

Notice of Allowance 1, Nov. 4, 2005, for U.S. Appl. No. 10/144,347, Total 8 pp.

Notice of Allowance 1, Apr. 19, 2005, for U.S. Appl. No. 10/144,540, Total 11 pp.

Notice of Allowance 1, May 19, 2006, for U.S. Appl. No. 10/323,131, Total 9 pp.

Notice of Allowance 1, Aug. 22, 2006, for U.S. Appl. No. 10/325,245, Total 11 pp.

Notice of Allowance 1, Nov. 4, 2008, for U.S. Appl. No. 10/867,970, Total 11 pp.

Notice of Allowance 1, Dec. 11, 2008, for U.S. Appl. No. 10/874,397, Total 17 pp.

Notice of Allowance 1, Sep. 3, 2008, for U.S. Appl. No. 10/874,398, Total 16 pp.

Notice of Allowance 2, Oct. 18, 2007, for U.S. Appl. No. 10/144,347, Total 13 pp.

Notice of Allowance 2, Sep. 20, 2006, for U.S. Appl. No. 10/323,131, Total 13 pp.

Notice of Allowance 2, Feb. 8, 2007, for U.S. Appl. No. 10/325,245, Total 8 pp.

Notice of Allowance 2, Nov. 25, 2009, for U.S. Appl. No. 10/867,970, Total 14 pp.

Notice of Allowance 2, May 29, 2009, for U.S. Appl. No. 10/874,397, Total 10 pp.

Notice of Allowance 3, Jun. 25, 2008, for U.S. Appl. No. 10/144,347, Total 16 pp.

Notice of Allowance 3, Jan. 29, 2009, for U.S. Appl. No. 10/325,245, Total 11 pp.

Notice of Allowance 4, Jul. 20, 2009, for U.S. Appl. No. 10/325,245, Total 28 pp.

Office Action 1, May 25, 2009, for Application No. JP2004566154, Total 13 pp. [with translation].

Office Action 1, Sep. 24, 2004, for U.S. Appl. No. 10/144,347, Total 18 pp.

Office Action 1, Oct. 13, 2004, for U.S. Appl. No. 10/144,540, Total 15 pp.

Office Action 1, Jul. 5, 2005, for U.S. Appl. No. 10/323,131, Total 15 pp.

Office Action 1, Mar. 10, 2006, for U.S. Appl. No. 10/325,245, Total 9 pp.

Office Action 1, Sep. 20, 2005, for U.S. Appl. No. 10/410,793, Total 26 pp.

Office Action 1, Nov. 14, 2006, for U.S. Appl. No. 10/867,970, Total 37 pp.

Office Action 1, Mar. 14, 2007, for U.S. Appl. No. 10/874,397, Total 27 pp.

Office Action 1, Mar. 5, 2007, for U.S. Appl. No. 10/874,398, Total 33 pp.

Office Action 2, May 10, 2005, for U.S. Appl. No. 10/144,347, Total 14 pp.

Office Action 2, Oct. 4, 2007, for U.S. Appl. No. 10/874,397, Total 39 pp.

Office Action 3, Jul. 26, 2006, for U.S. Appl. No. 10/144,347, Total 8 pp.

Office Action 3, Sep. 19, 2006, for U.S. Appl. No. 10/410,793, Total 30 pp.

Office Action 3, Sep. 11, 2007, for U.S. Appl. No. 10/867,970, Total 9 pp.

Office Action 3, Apr. 7, 2008, for U.S. Appl. No. 10/874,397, Total 26 pp.

Office Action 3, Mar. 3, 2008, for U.S. Appl. No. 10/874,398, Total 24 pp.

Office Action 4, Jan. 29, 2007, for U.S. Appl. No. 10/144,347, Total 12 pp.

Office Action 5, Jun. 27, 2007, for U.S. Appl. No. 10/144,347, Total 11 pp.

Office Action 5, Oct. 19, 2007, for U.S. Appl. No. 10/410,793, Total 18 pp.

Office Action 5, May 5, 2008, for U.S. Appl. No. 10/867,970, Total 11 pp.

Office Action 6, Aug. 20, 2008, for U.S. Appl. No. 10/410,793, Total 18 pp.

Office Action 6, Apr. 14, 2009, for U.S. Appl. No. 10/867,970, Total 31 pp.

Office Action 7, Feb. 12, 2009, for U.S. Appl. No. 10/410,793, Total 17 pp.

Oracle Corporation, "Chapter 4: Discovering the Available Metadata", [online], 2000-2003, [Retrieved on Jun. 28, 2007], retrieved from the Internet at <URL: http://www.stanford.edu/dept/itss/docs/oracle/10g/olap.101/b10335/discover.htm>, Total 16 pp.

Oracle Corporation, "Oracle OLAP Analytic Workspace Java API Reference", [online], 2003, [Retrieved on Jan. 29, 2008], retrieved from the Internet at <URL: http://www.acs.ilstu.edu/docs/oracle/olap.101/b12180/overview-summary.html>, Total 4 pp.

Oracle Corporation, "Oracle9i OLAP Services: Concepts and Administration Guide", Release 1 (9.0.1), Jun. 2001, Total 126 pp.

Pederson, D., K. Riis, and T.B. Pederson, "A Powerful and SQL-Compatible Data Model and Query Language for OLAP", (c) 2001, Australian Computer Science Communications, vol. 24, Iss. 2, 2002, Total 10 pp.

Pires, C. and J.C. Machado, "DORS: Database Query Optimizer with Rule Based Search Engine", SugarLoafPLoP 2002 Proceedings, Total 16 pp.

Poelman, J., "How to Build a Metadata Bridge for DB2 Cube Views", [online], May 2003, [Retrieved on Jan. 29, 2008]. Retrieved from the Internet at <URL: http://www.ibm.com/developerworks/db2/library/techarticle/0305poelman/0305poelman.html>, Total 15 pp.

Pokorny, J. and P. Sokolowsky, "A Conceptual Modelling Perspective for Data Warehouses", [online], 1999, [retrieved on Apr. 8, 2004], retrieved from the Internet at <URL: http://wi99.iwi.uni-sb.de/teilnehmer/pdf-files/EF_32_WiB082.pdf>, Total 20 pp.

Poole, J.D., "Model-Driven Architecture: Vision, Standards and Emerging Technologies", [online], Apr. 2001. Retrieved from the Internet at <URL: http://java.sun.com/products/jmi/pdf/arch.pdf>, Total 15 pp.

Post, L.L. and J.J. Sydir, "Dynamically Configurable User Interface for the Manipulation of Data Objects", IBM TDB, vol. 37, No. 3, Mar. 1994, Total 8 pp.

Rabenhorst, D.A., "Many-Dimensional Visualization Technique", IBM TDB, vol. 35, No. 6, Nov. 1992, Total 3 pp.

Rai, A. and V. Storey, "Data Mining Multidimensional Databases, OLAP (Online Analytical Processing), & Data Warehousing", [online] 2001, [retrieved on Apr. 8, 2004], retrieved from the Internet at <URL: http://www.cis.gsu.edu/~dstraub/JMBA/MBA8473/2001/DataMine3-2ups.pdf>, Total 40 pp.

Wolfram Research, Inc., "Hexagonal Prism", [online], 2004, [retrieved on Jun. 6, 2004], retrieved from the Internet at <URL: http://mathworld.wolfram.com/HexagonalPrism.html>, Total 2 pp.

Response to Office Action 1, Jun. 12, 2006, for U.S. Appl. No. 10/325,245, Total 9 pp.

Rundensteiner, A.E., A. Koeller, and X. Zhang, "Maintaining Data Warehouses Over Changing Information Sources", Communications of the ACM, Jun. 2000, vol. 43, No. 6, Total 6 pp.

SAP America, Inc., "Mutli-Dimensional Modeling with BW", SAP America White Paper, 2000, Total 68 pp.

Sapia, C., M. Blaschka, G. Hofling, and B. Dinter, "Extending the E/R Model for the Multidimensional Paradigm", Proceedings of the Workshops on Data Warehousing and Data Mining: Advances in Database Technologies, 1998, Total 12 pp.

Shah, K. and A. Sheth, "Infoharness: Managing Distributed, Heterogeneous Information", IEEE Educational Activities Department, Nov. 1999, vol. 3, No. 6, Total 11 pp.

Shukla, A., P.M. Deshpande, and J.F. Naughton, "Materialized View Selection fro Multi-cube Data Models", vol. 1777, Proceedings of the 7th International Conference on Extending Database Technology: Advances in Database Technology, 2000, Total 12 pp.

Sifer, M., "A Visual Interface Technique for Exploring OLAP Data with Coordinated Dimension Hierarchies", Proceedings of the Twelfth International Conference on Information and Knowledge Management, Nov. 2003, Total 4 pp.

Stefanovic, N., J. Han, and K. Koperski, "Object-Based Selective Materialization for Efficient Implementation of Spatial Data Cubes", IEEE Transactions on Knowledge and Data Engineering, vol. 12, No. 6, Nov./Dec. 2000, Total 21 pp.

Stewart, H.M., "OLAP/EIS Tops Off the Data Warehouse", Proceedings of the 1995 Cause Annual Conference, 1995, Total 16 pp.

Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, Total 10 pp.

Supplemental NOA, Sep. 21, 2006, for U.S. Appl. No. 10/325,245, Total 11 pp.

Supplemental NOA, Mar. 24, 2009, for U.S. Appl. No. 10/325,245, Total 3 pp.

Tang, D., C. Stolte, and R. Bosch, "Design Choices when Architecting Visualizations", Information Visualization, vol. 3, Iss. 2, 2004, Total 10 pp.

Toyama, M., "SuperSQL: An Extended SQL for Database Publishing and Presentation", vol. 27, No. 2, Proceedings of the 1998 ACM SIGMOD International Conference on Management of Data, Jun. 1998, Total 6 pp.

U.S. Appl. No. 09/602,490, filed Jun. 23, 2000, entitled "System and Method for Web Based Sharing of Search Engine Queries", invented by R. Kraft, Total 48 pp.

Vassiliadis, P., "Modeling Multidimensional Databases, Cubes and Cube Operations", Proceedings of the 10th International Conference on Scientific and Statistical Database Management, 1998, Total 10 pp.

Warshaw, L.B. and D.P. Miranker, "Rule-Based Query Optimization, Revisited", Proceedings of the Eighth International Conference on Information and Knowledge Management, 1999, Total 10 pp.

White, C.J., "The IBM Business Intelligence Software Solution", Version 3, DataBase Associates International, Inc., Mar. 1999, Total 22 pp.

Wolfram Research, Inc., "Polyhedron", [online], 2004, [retrieved on Jun. 6, 2004], retrieved from the Internet at <URL: http://mathworld.wolfram.com/Polyhedron.html>, 5 pp. (sixth page blank).

Wolfram Research, Inc., "Prism", [online], 2004, [retrieved on Jun. 6, 2004], retrieved from the Internet at <URL: http://mathworld.wolfram.com/Prism.html>, 5 pp. (sixth page blank).

Wolfram Research, Inc., "Triangular Prism", [online], 2004, [retrieved on Jun. 6, 2004], retrieved from the Internet at <URL: http://mathworld.wolfram.com/TriangularPrism.html>, 2 pp.

Written Opinion, Sep. 6, 2004, for International Application No. PCT/GB03/05490, 7 pp.

Final Office Action 4, Dec. 9, 2009, for U.S. Appl. No. 10/410,793, Total 56 pp.

Notice of Allowance 1, Sep. 13, 2010, for U.S. Appl. No. 11/971,157, Total 5 pp.

Office Action 1, Jun. 3, 2010, for U.S. Appl. No. 11/971,157, Total 46 pp.

Canadian Office Action, Dec. 22, 2010, for Application No. 2,510,747, Total 3 pp.

Notice of Allowance 2, Oct. 12, 2010, for U.S. Appl. No. 10/410,793, Total 7 pp.

NOA2, Oct. 12, 2010, for U.S. Appl. No. 10/410,793, Total 7 pp.

\* cited by examiner

Cube Model:

1800

| Property | Value |
|---|---|
| Name | LocationProduct |
| Facts | SalesFacts |
| Set of Dimensions | (Location, LocationFacts), (Product, ProductFacts) |

Cube:

1802

| Property | Value |
|---|---|
| Name | LocationProduct |
| Cube Model | LocationProduct |
| Cube Facts | SalesCFacts |
| List of Cube Dimensions | LocationCD, ProductCD |

Facts:

1804

| Property | Value |
|---|---|
| Name | SalesFacts |
| Set of Measures | Revenue, Profit |
| Set of Attributes | ProductID_Facts, LocationID_Facts |
| Set of Joins | <no joins used> |

Cube Facts:

1806

| Property | Value |
|---|---|
| Name | SalesCFacts |
| Facts | SalesFacts |
| Set of Measures | Revenue, Profit |

Measure:

1808

| Property | Value |
|---|---|
| Name | Revenue |
| List of SQL Expression Template | "{$$1}" |
| List of Columns and Measures | *Column*: Facts.SalesDollar |
| List of Aggregations | (SUM, <empty>) |
| Datatype | DOUBLE |

1810

| Property | Value |
|---|---|
| Name | Profit |
| List of SQL Expression Template | "{$$1} - {$$2}" |
| List of Columns and Measures | *Measure*: Revenue, *Column*: Facts.SalesCost |
| List of Aggregations | (SUM, <empty>) |
| Datatype | DOUBLE |

FIG. 18A

Dimension:

1812

| Property | Value |
|---|---|
| Name | Location |
| Set of Attributes | LocationID, Country, State, City |
| Set of Joins | <no joins used> |
| Set of Hierarchies | LocDetail, LocOverview |
| Type | REGULAR |

1814

| Property | Value |
|---|---|
| Name | Product |
| Set of Attributes | ProductID, GroupName, ProdName |
| Set of Joins | <no joins used> |
| Set of Hierarchies | Product |
| Type | REGULAR |

Cube Dimension:

1816

| Property | Value |
|---|---|
| Name | LocationCD |
| Dimension | Location |
| Cube Hierarchy | LocOverviewCH |

1818

| Property | Value |
|---|---|
| Name | ProductCD |
| Dimension | Product |
| Cube Hierarchy | ProductCH |

Hierarchy:

1820

| Property | Value |
|---|---|
| Name | Loc Detail |
| List of Attributes | Country, State, City |
| Set of Attribute Relationships | <no attribute relationships used> |
| Type | BALANCED |
| Deployment | STANDARD |

1822

| Property | Value |
|---|---|
| Name | LocOverview |
| List of Attributes | Country, State |
| Set of Attribute Relationships | <no attribute relationships used> |
| Type | BALANCED |
| Deployment | STANDARD |

| Property | Value |
|---|---|
| Name | Product |
| List of Attributes | GroupName, ProdName |
| Set of Attribute Relationships | <no attribute relationships used> |
| Type | BALANCED |
| Deployment | STANDARD |

Cube Hierarchy:

1826

| Property | Value |
|---|---|
| Name | LocOverviewCH |
| Hierarchy | LocOverview |
| List of Attributes | Country, State |
| Set of Attribute Relationships | <no attribute relationships used> |

1828

| Property | Value |
|---|---|
| Name | ProductCH |
| Dimension | ProductCD |
| Hierarchy | Product |
| List of Attributes | GroupName, ProdName |
| Set of Attribute Relationships | <no attribute relationships used> |

Join:

1830

| Property | Value |
|---|---|
| Name | LocationFacts |
| Join Triplets | (LocationID, LocationID_Facts, =) |
| Type | INNER |

1832

| Property | Value |
|---|---|
| Name | ProductFacts |
| Join Triplets | (ProductID, ProductID_Facts, =) |
| Type | INNER |

FIG. 18C

Attribute:

| | Property | Value |
|---|---|---|
| 1834 | Name | City |
| | List of Columns and Attributes | *Column*: Location.City |
| | SQL Expression Template | "{$$1}" |
| | Datatype | VARCHAR(40) |
| | Role | LEVEL |
| 1836 | Name | State |
| | List of Columns and Attributes | *Column*: Location.State |
| | SQL Expression Template | "{$$1}" |
| | Datatype | VARCHAR(40) |
| | Role | LEVEL |
| 1838 | Name | ProdName |
| | List of Columns and Attributes | *Column*: Product.Name |
| | SQL Expression Template | "{$$1}" |
| | Datatype | VARCHAR(40) |
| | Role | LEVEL |
| 1840 | Name | GroupName |
| | List of Columns and Attributes | *Column*: Product.GroupName |
| | SQL Expression Template | "{$$1}" |
| | Datatype | VARCHAR(40) |
| | Role | LEVEL |
| 1842 | Name | ProductID |
| | List of Columns and Attributes | *Column*: Product.ProductID |
| | SQL Expression Template | "{$$1}" |
| | Datatype | INTEGER |
| | Role | DIMKEY |
| 1844 | Name | ProductID_Facts |
| | List of Columns and Attributes | *Column*: Facts.ProductID |
| | SQL Expression Template | "{$$1}" |
| | Datatype | INTEGER |
| | Role | DIMKEY |

FIG. 18D

| 1846 | Property | Value |
|---|---|---|
| | Name | LocationID |
| | List of Columns and Attributes | *Column*: Location.LocationID |
| | SQL Expression Template | "{$$1}" |
| | Datatype | INTEGER |
| | Role | DIMKEY |

| 1848 | Property | Value |
|---|---|---|
| | Name | LocationID_Facts |
| | List of Columns and Attributes | *Column*: Facts.LocationID |
| | SQL Expression Template | "{$$1}" |
| | Datatype | INTEGER |
| | Role | DIMKEY |

FIG. 18E

Table A

| | 1910 UnitPrice | 1912 Revenue | 1914 Profit |
|---|---|---|---|
| 1902 — Trousers | 40.00 | 680.00 | 68.00 |
| 1904 — Shirt | 60.00 | 780.00 | 117.00 |
| 1906 — Tie | 25.00 | 175.00 | 52.50 |

Table C 2100

|          | Jan                          | Feb                          | Mar                           | Qtr1                  |
|----------|------------------------------|------------------------------|-------------------------------|-----------------------|
| Trousers | SJ = 10<br>LA = 18<br>CA =   | SJ = 8<br>LA = 22<br>CA =    | SJ = 15<br>LA = 10<br>CA =    | SJ =<br>LA =<br>CA =  |
| Shirt    | SJ = 22<br>LA = 36<br>CA =   | SJ = 27<br>LA = 28<br>CA =   | SJ = 24<br>LA = 31<br>CA =    | SJ =<br>LA =<br>CA =  |
| Tie      | SJ = 8<br>LA = 12<br>CA =    | SJ = 11<br>LA = 7<br>CA =    | SJ = 6<br>LA = 13<br>CA =     | SJ =<br>LA =<br>CA =  |
| Clothes  | SJ =<br>LA =<br>CA =         | SJ =<br>LA =<br>CA =         | SJ =<br>LA =<br>CA =          | SJ =<br>LA =<br>CA =  |

FIG. 21A

Table C — 2100

2105 →

|  | Jan | Feb | Mar | Qtr1 |
|---|---|---|---|---|
| Trousers | SJ = 10<br>LA = 18<br>CA = | SJ = 8<br>LA = 22<br>CA = | SJ = 15<br>LA = 10<br>CA = | SJ =<br>LA =<br>CA = |
| Shirt | SJ = 22<br>LA = 36<br>CA = | SJ = 27<br>LA = 28<br>CA = | SJ = 24<br>LA = 31<br>CA = | SJ =<br>LA =<br>CA = |
| Tie | SJ = 8<br>LA = 12<br>CA = | SJ = 11<br>LA = 7<br>CA = | SJ = 6<br>LA = 13<br>CA = | SJ =<br>LA =<br>CA = |
| 2102 — Clothes<br>2104 — | SJ = 30*<br>LA = 66*<br>CA = | SJ = 46*<br>LA = 57*<br>CA = | SJ = 45*<br>LA = 54*<br>CA = | SJ =<br>LA =<br>CA = |

FIG. 21B

Table C

|  | Jan | Feb | Mar | Qtr1 |
|---|---|---|---|---|
| Trousers | SJ = 10<br>LA = 18<br>CA = | SJ = 8<br>LA = 22<br>CA = | SJ = 15<br>LA = 10<br>CA = | SJ = 11+<br>LA = 16.6+<br>CA = |
| Shirt | SJ = 22<br>LA = 36<br>CA = | SJ = 27<br>LA = 28<br>CA = | SJ = 24<br>LA = 31<br>CA = | SJ = 24.3+<br>LA = 31.6+<br>CA = |
| Tie | SJ = 8<br>LA = 12<br>CA = | SJ = 11<br>LA = 7<br>CA = | SJ = 6<br>LA = 13<br>CA = | SJ = 8.3+<br>LA = 10.6+<br>CA = |
| Clothes | SJ = 30*<br>LA = 66*<br>CA = | SJ = 46*<br>LA = 57*<br>CA = | SJ = 45*<br>LA = 54*<br>CA = | SJ = 40.3+<br>LA = 59+<br>CA = |

FIG. 21C

|  | Jan | Feb | Mar | Qtr1 |
|---|---|---|---|---|
| Table C | | | | |
| Trousers | SJ = 10<br>LA = 18<br>CA = 18- | SJ = 8<br>LA = 22<br>CA = 22- | SJ = 15<br>LA = 10<br>CA = 15- | SJ = 11+<br>LA = 16.6+<br>CA = 16.6- |
| Shirt | SJ = 22<br>LA = 36<br>CA = 36- | SJ = 27<br>LA = 28<br>CA = 28- | SJ = 24<br>LA = 31<br>CA = 31- | SJ = 24.3+<br>LA = 31.6+<br>CA = 31.6- |
| Tie | SJ = 8<br>LA = 12<br>CA = 12- | SJ = 11<br>LA = 7<br>CA = 11- | SJ = 6<br>LA = 13<br>CA = 13- | SJ = 8.3+<br>LA = 10.6+<br>CA = 10.6- |
| Clothes | SJ = 30*<br>LA = 66*<br>CA = 66- | SJ = 46*<br>LA = 57*<br>CA = 57- | SJ = 45*<br>LA = 54*<br>CA = 54- | SJ = 40.3+<br>LA = 59+<br>CA = 59- |

FIG. 21D

Table D

| 3000 | | Symmetric | Asymmetric |
|---|---|---|---|
| 3002 | Cost | X | |
| | Revenue | X | |
| 3004 | Inventory | | X |
| | Profit | X | |
| | Profit Margin | X | |
| | Profit Rank | X | |
| | RevProfit Correlation | X | |

FIG. 30

| Table E | | |
|---|---|---|
| | Distributive | Non-distributive |
| SUM | X | |
| AVG | | X |
| CORRELATION | | X |

FIG. 31

Table F

| | First Option Step 1 [Product, Market, Time] | Second Option Step 1 [Product, Market] | Second Option Step 2 [Time] |
|---|---|---|---|
| Cost | SUM (1) | SUM (1)* | SUM (2)* |
| Revenue | SUM (1) | SUM (1)* | SUM (2)* |
| Inventory | --- | SUM (1) | AVG (2) |
| Profit | SUM (1) | SUM (1)* | SUM (2)* |
| Profit Margin | SUM, SUM (1) | SUM, SUM (1)* | SUM, SUM (2)* |
| Profit Rank | SUM (1) | SUM (1)* | SUM (2)* |
| RevProfit Correlation | CORRELATION (1) | --- | --- |

FIG. 32

METHOD, SYSTEM, AND PROGRAM FOR SPECIFYING MULTIDIMENSIONAL CALCULATIONS FOR A RELATIONAL OLAP ENGINE

BACKGROUND OF THE INVENTION

1. Field of the Invention

The present invention relates to specifying multidimensional calculations for a relational on-line analytical processing (OLAP) engine.

2. Description of the Related Art

On-line analytical processing (OLAP) has become increasingly popular. Instead of reviewing piles of static reports printed on green-bar paper, an OLAP analyst can explore business results interactively, dynamically adjusting the view of the data and asking questions and getting answers almost immediately. This freedom from static answers to fixed questions on a fixed schedule allows business analysts to operate more effectively and to effect improvements in business operations.

Nigel Pendse introduced the term "FASMI" to characterize OLAP systems. The FASMI characteristics are: Fast, Analysis, Shared, Multidimensional, and Information. For further information, see N. Pendse, "What Is OLAP?" The OLAP Report.

As for fast, in keeping with the spirit of the "O" in OLAP, such systems need to provide results very quickly usually in just a few seconds, and seldom in more than 20 or 30 seconds. This level of performance is key in allowing analysts to work effectively without distraction.

As for analysis, considering the "A" in OLAP, OLAP systems generally provide rich analytic functions appropriate to a given application, with minimal programming.

As for shared, an OLAP system is usually a shared resource. This means that there is a requirement for OLAP systems to provide appropriate security and integrity features. Ultimately, this can mean providing different access controls on each cell of a database.

As for multidimensional, multidimensionality is the primary requirement for an OLAP system. OLAP products present their data in a multidimensional framework. Dimensions are collections of related identifiers, or attributes (product, market, time, channel, scenario, or customer, for example) of the data values of the system. The identifiers ("The Lord of the Rings-DVD," "San Jose, Calif.," "2002," "Retail Rental," and "John Q. Public," for example) belonging to the collection for a particular dimension generally have some sort of structure, such as hierarchical. Sometimes there is more than one natural structure for these identifiers.

The multidimensional characteristic means that an OLAP system can quickly switch among various orientations of dimensions, as well as among various subsets and structural arrangements of a dimension. Because of the multidimensional nature of OLAP systems, the collections of data that they implement are referred to as cubes. As for information, OLAP systems store and calculate information. Data for OLAP systems often come from one or more operational systems. Analytical models are applied to these data, and the results are either stored in the system or generated at query time. The quantity of information that a particular OLAP system can manage is one characteristic of that system.

Enterprises have been storing multidimensional data, using a star or snowflake schema, in relational databases for many years. Over time, relational database vendors have added optimizations that enhance query performance on these schemas. During the 1990s many special purpose databases were developed that could handle added calculational complexity and that generally performed better than relational engines.

Multidimensional OLAP (MOLAP) refers to the family of OLAP systems in which special-purpose file systems or indexes are used to store cube data. Express Web Publisher, Essbase™, TM1, and Pilot Suite are a few examples of products based on special-purpose storage and indexing technology. Microsoft's OLAP offering also includes a MOLAP engine. These systems are often read-only systems that are loaded with base data periodically, then derived results are calculated, stored, and indexed. Scalability of MOLAP systems is often limited by the size of the batch window within which derived results are calculated and stored. To improve scalability, such systems often have a means for deferring calculation of some derived results until query time.

For relational OLAP (ROLAP), star schemas have been used for many years as a means for representing multidimensional data in a relational database. Many commercial software development companies, such as MicroStrategy, Brio, Business Objects, Metacube, Hyperion, and Metaphor, have developed batch or interactive multidimensional reporting and exploration interfaces for relational star schemas. These systems were all designed and implemented before super aggregate operators were added to the Structured Query Language (SQL) language definition.

In particular, until a few years ago, relational databases allowed the calculation of aggregates at only a single level per query. For example, one SELECT statement with a GROUP BY clause would be used to retrieve a result set at a quarter level (i.e., for a set of quarters), while another SELECT statement with a GROUP BY clause would be used to retrieve a result set at a month level (i.e., for a set of months). This forced relational OLAP systems to run multiple queries against the database in order to calculate cells at varying levels.

To facilitate OLAP-type query creation and provide more advanced optimizations, a DB2® Relational Database Management System (RDBMS), available from International Business Machines Corporation, implemented three new super aggregate operators that were added to the SQL standard to allow a single query to generate multiple aggregates: ROLLUP, CUBE, and GROUPING SETS. These super aggregate operators are extensions to the GROUP BY clause and specify that aggregates be generated at multiple levels. For example, one SELECT statement may be used to obtain a result set of calculations of aggregates at multiple levels (e.g., both quarter and month).

Note that these super aggregate operators are more than mere shorthand for generating multiple grouping sets. Because multiple grouping sets are requested in a single statement, the DB2® RDBMS can build an execution plan that generates all the grouping sets in such a way that each input row needed for the calculation is referenced only once. This can result in performance improvements of orders of magnitude, especially when the set of input rows does not fit in the buffer pool (i.e., cache).

Prior art systems are designed to produce multidimensional reports showing results with different levels of granularity by issuing multiple queries. Multiple result sets are obtained for the multiple queries, and the result sets are merged to form a single report. Such systems depend on some sort of description (metadata) of the roles for the tables and columns in a star schema for generating the necessary SQL statements to retrieve the data to produce the multidimensional reports. The precise metadata varies from product to product.

Multidimensional on-line analytical processing (OLAP) systems (e.g., from companies such as Hyperion, Cognos, and Microsoft) are designed to return multidimensional result sets naturally, when given sets of members for each edge of a multidimensional cube. The multidimensional OLAP systems are also designed to compute some or all of the results in advance of any query.

Multidimensional analysis has been done using SQL since the introduction of relational databases, but relational OLAP systems have not been able to return multidimensional results sets naturally or compute some or all of the results in advance of a query.

Thus, there is a need in the art for an improved relational OLAP system.

SUMMARY OF THE INVENTION

Provided are a method, system, and program for specifying multidimensional calculations. Selection of a subset of a cube model metadata object that is generated from a facts metadata object and one or more dimension metadata objects is received. The facts metadata object references one or more measure metadata objects. A statement is generated for retrieving multidimensional information using metadata in the cube model metadata object and the measure metadata objects, wherein each of the measure metadata objects specifies one or more aggregations.

The described implementations of the invention provide a method, system, and program for specifying multidimensional calculations in a relational OLAP system.

BRIEF DESCRIPTION OF THE DRAWINGS

Referring now to the drawings in which like reference numbers represent corresponding parts throughout:

FIGS. 18A-18E illustrate a possible set of metadata object instances and some properties of metadata objects that may be generated for a star schema in accordance with certain implementations of the invention.

FIG. 19 illustrates Table A, which shows base data in accordance with certain implementations of the invention.

FIGS. 21A-21D illustrate Table C, which shows a measure that has the aggregations: SUM(Product) (i.e., sum of product), AVG(Time) (i.e., average over time), and MAX(Market) (i.e., maximum for market), in accordance with certain implementations of the invention.

FIG. 30 illustrates Table D, which lists some measures and indicates which measures are symmetric or asymmetric in accordance with certain implementations of the invention FIG. 31 illustrates Table E, which lists some aggregation functions and indicates which aggregation functions are distributive and which are non-distributive in accordance with certain implementations of the invention.

FIG. 32 illustrates Table F, which lists measures and how an aggregation step may be broken up into multiple aggregation steps for the measures in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

A. Multidimensional Metadata Introduction

In certain implementations, the invention provides multidimensional metadata objects and techniques for using the multidimensional metadata objects. For ease of reference, the invention will be referred to as an "OLAP multidimensional metadata system 100" herein, and multidimensional metadata objects will be referred to as "metadata objects."

In certain implementations, the OLAP multidimensional metadata system 100 is implemented in a DB2® Universal Database (UDB) RDBMS, available from International Business Machines Corporation. Although the present specification describes the use of IBM's DB2® UDB RDBMS software, those skilled in the art will recognize that the present invention can use other RDBMS software, such as RDBMS software available from Oracle, IBM Informix, Sybase. Additionally, the present invention can run on computers using various operating systems, such as IBM z/OS®, IBM AIX®, Microsoft Windows® 2000, Microsoft Windows® XP, Linux, Solaris, HP-UX.

Figure 1:
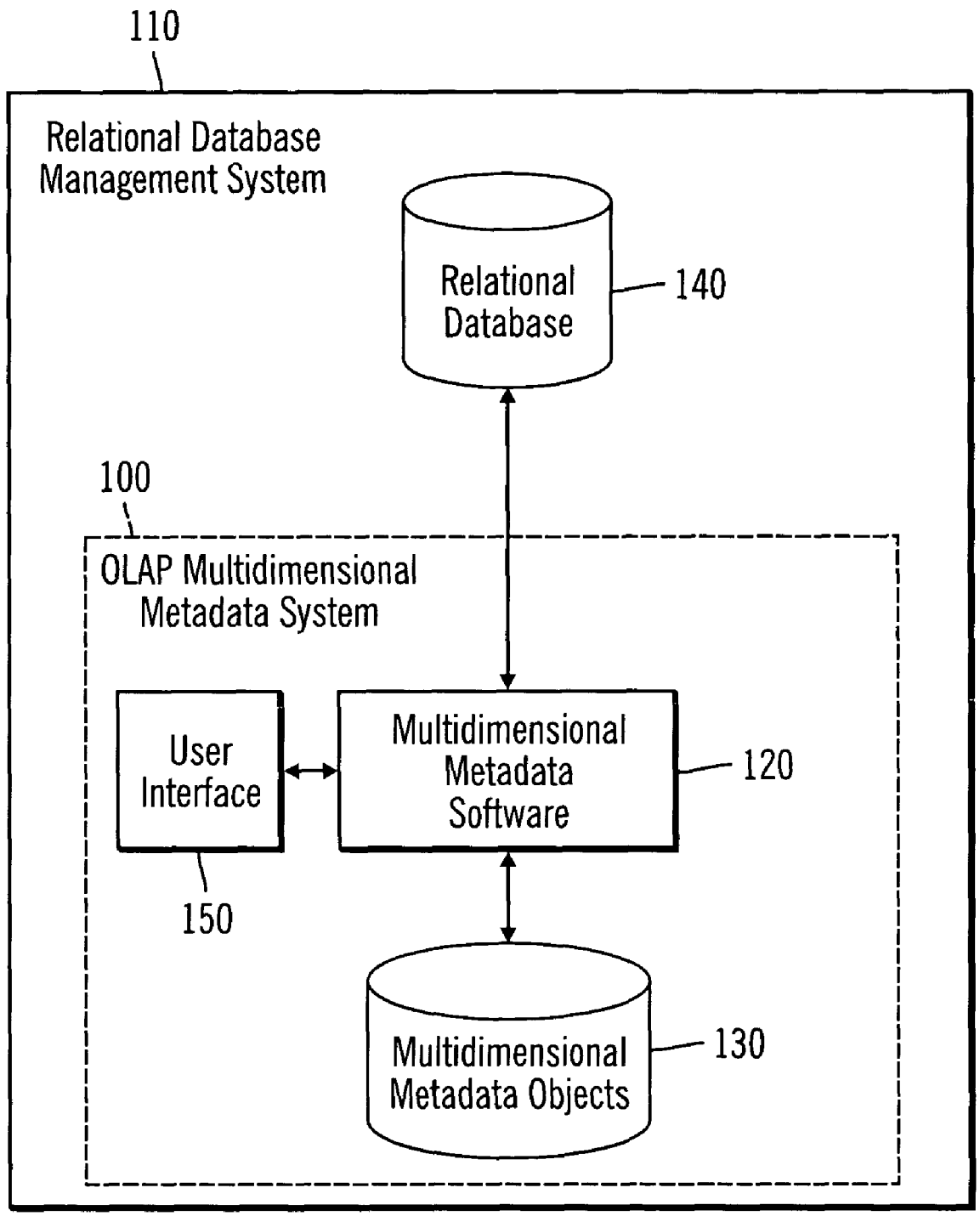
FIG. 1 illustrates, in a block diagram, a computing environment in accordance with certain implementations of the invention.

FIG. 1 illustrates, in a block diagram, a computing environment in accordance with certain implementations of the invention. A Relational Database Management System (RDBMS) 110 includes multidimensional metadata software 120 (e.g., a stored procedure application programming interface (API)) and a user interface 150. The RDBMS 110 accesses multidimensional metadata objects 130 and a relational database 140. In certain implementations, the data in multidimensional metadata objects 130 and relational database 140 may be stored in a single database.

An OLAP multidimensional metadata system 100 includes multidimensional metadata software 120 (e.g., a stored procedure application programming interface (API)), a user interface 150, and multidimensional metadata objects 130. The multidimensional metadata software 120 is used to create, store, and access the multidimensional metadata objects 130. Optionally, a user interface 150 may be provided for a user or administrator to send commands to the multidimensional metadata software 120. A user may create, access, modify, or delete multidimensional metadata objects 130 by submitting commands via the user interface 150. The commands are received and processed by the multidimensional metadata software 120. For example, the multidimensional metadata software 120 may create and store multidimensional metadata objects 130.

In certain implementations, the OLAP multidimensional metadata system 100 provides an add-on feature for an RDBMS 110, such as DB2® Universal Database (referred to herein as DB2® UDB), that improves the ability of the RDBMS 110 to perform OLAP processing. The invention streamlines the deployment and management of OLAP solutions, and improves the performance of OLAP tools and applications.

In particular, the OLAP multidimensional metadata system 100 provides metadata objects. The new metadata objects are stored in, for example, a database catalog (e.g., the DB2® UDB catalog) that describes the dimensional model and OLAP constructs of existing relational data. The database catalog provides a single repository from which OLAP applications can capture multidimensional metadata. In certain implementations, the metadata objects may reside on a data store other than the database catalog or may reside across multiple data stores. With the information in the central repository, a database optimizer is able to use techniques specific to star schemas for optimizing the execution of queries.

With the metadata objects, the invention can optimize OLAP query performance by aggregating data in summary tables and creating indexes. The OLAP multidimensional metadata system 100 also provides a metadata programming interface. In particular, the OLAP multidimensional metadata system 100 provides a SQL-based and extensible mark-up language (XML)-based application programming interface (API) for OLAP tools and application developers. Through, for example, Command Line Interface (CLI), Open Database Connectivity (ODBC), or Java Database Connectivity (JDBCTM) connections or by using, for example, embedded SQL to DB2® UDB, applications and tools can use a single stored procedure (i.e., an example of multidimensional metadata software 120) to create, modify, and retrieve metadata objects. In certain implementations, multiple stored procedures may provide the functionality for creating, modifying, and retrieving metadata objects.

OLAP multidimensional metadata system 100 metadata objects describe relational information as intelligent OLAP structures, but the multidimensional metadata objects provided by the invention are different from traditional OLAP objects. The metadata objects of the invention store metadata, meaning the metadata objects store information about the data in the base tables. Metadata objects describe where pertinent data is located and can also describe relationships within the base data. For example, a facts metadata object is a specific metadata object that stores information about related measures, attributes and joins, but does not include the data specifically from the base fact table.

Metadata provides a new perspective from which to understand data. Without metadata objects, a database catalog only knows about table and column names and cannot store information about the meanings of the tables and columns or how the tables and columns relate to each other. With metadata objects, this information may be stored.

Each metadata object completes a piece of the big picture showing what the relational data means. Some metadata objects act as a base to directly access relational data by aggregating data or directly corresponding to particular columns in relational tables. Other metadata objects describe relationships between the base metadata objects and link these base metadata objects together. Ultimately, all of the metadata objects can be grouped together by their relationships to each other, into a metadata object called a cube model. A cube model represents a particular grouping and configuration of relational tables. The purpose of a cube model is to describe OLAP structures to a given application or tool. Cube models tend to describe all cubes that different users might want for the data that are being analyzed. A cube model groups dimensions and facts, and offers the flexibility of multiple hierarchies for dimensions. A cube model conveys the structural information needed by query design tools and applications that generate complex queries on star schema databases.

The multidimensional metadata object model is designed to describe the schemas used in relational databases to represent multidimensional data. One way to organize such data is by using a star or snowflake schema (in snowflake schemas the dimension tables are normalized). However, the model is flexible enough to handle any type of schema (e.g., more normalized schemas).

A.1 Multidimensional Metadata Overview

The multidimensional metadata enables maintenance of metadata about OLAP structures stored in data warehouses.

This information was not previously available in the database catalog and frequently is not documented by data warehouse metadata repositories. Multidimensional metadata helps the data warehouse designer represent the structural relationship among tables and their columns. Once this metadata exists in the database catalog, other components of the RDBMS 110, such as a database optimizer (e.g., a DB2® UDB optimizer), can take advantage of the structural information and perform queries, against data described by these new OLAP metadata objects, faster. The metadata objects can also assist business intelligence tools by providing the base structural information needed to generate multidimensional queries against the data warehouse. In order to capture OLAP structural information, the OLAP multidimensional metadata system 100 defines several new metadata objects. These metadata objects are able to describe key aspects of schemas frequently used to model OLAP data, such as star-join and snowflake schemas.

Adding the metadata objects to a database catalog provides full functionality and integration with other database components. The new metadata objects are owned by a schema, in the same way as regular tables. Another design point for the metadata objects is that most of them are independently useful. That is, the metadata objects provide information about the underlying relational schema, whether or not the metadata objects are included in a more complex multidimensional structure.

Figure 2:
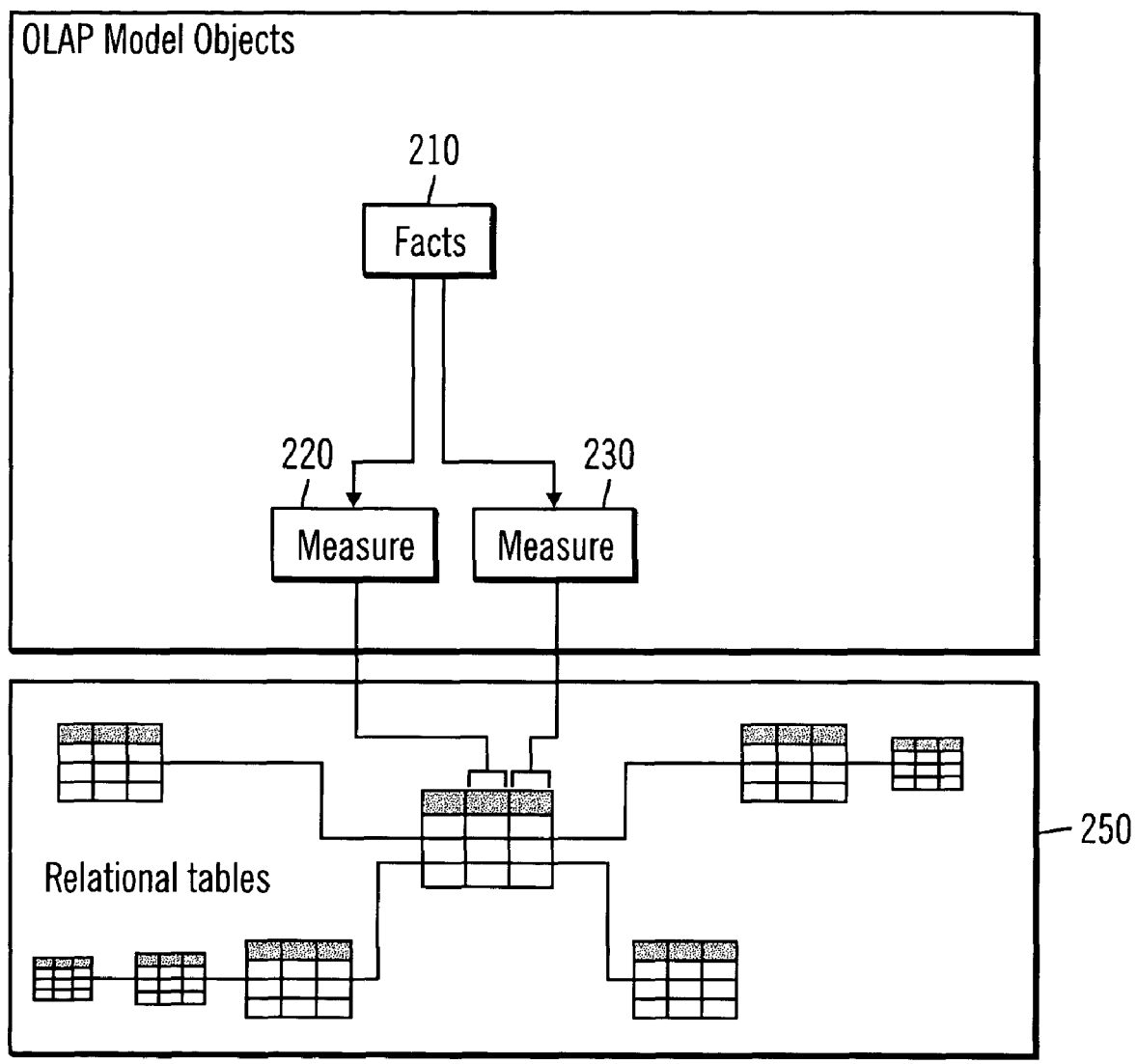
FIG. 2 illustrates that a facts metadata object and measure metadata objects relate to relational data in accordance with certain implementations of the invention.

A cube model can be constructed in many ways, but is often built to represent a relational star schema or snowflake schema. A cube model based on a simple star schema is built around a central facts metadata object that describes aggregated relational data from a fact table. Measure metadata objects describe data calculations from columns in a relational table and are joined together to create the facts metadata object. FIG. 2 illustrates that a facts metadata object 210 and measure metadata objects 220, 230 relate to relational data 250 in accordance with certain implementations of the invention.

Dimension metadata objects are connected to the facts metadata object in a cube model just as the dimension tables are connected to the fact table in a star schema. Columns of data from relational tables are represented by attribute metadata objects that are joined together to make up a dimension metadata object.

Figure 3:
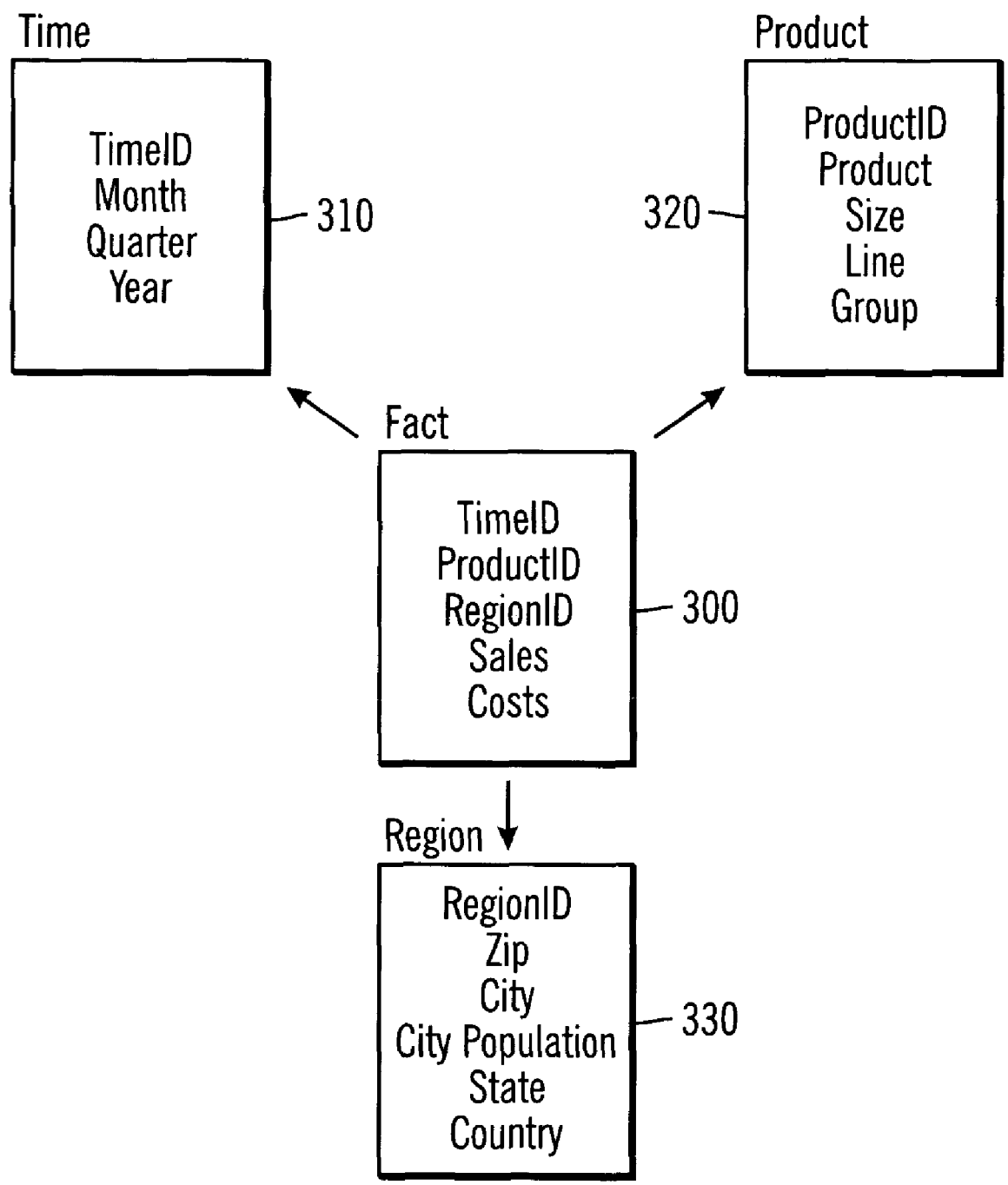
FIG. 3 illustrates a sample star-join schema in accordance with certain implementations of the invention.

FIG. 3 illustrates a sample star-join schema in accordance with certain implementations of the invention. The star-join schema has Time 310, Product 320, and Region 330 dimension tables joined to a central Sales facts table 300. Attributes are created for the relevant dimension and fact table 300, 310, 320, 330 columns in a relational table. Each dimension table 310, 320, 330 has a dimensional key attribute such as TimeID, ProductID, or RegionID. The region dimension table 330 also has City and City_Population attributes and an attribute relationship named CityPop AR. The attribute relationship expresses the functional dependency that every value in the City attribute determines a corresponding value in the City_Population attribute. Within the facts table, there are two measures for Sales and Costs and the three dimensional key attributes TimeID, ProductID, and RegionID.

Three joins join each dimension table 310, 320, 330 to the central facts table 300 on the corresponding dimensional key attributes. In this example, the dimension tables 310, 320, 330 are joined with the facts table 300 based on either the TimeID, ProductID, or RegionID attributes.

Figure 4:
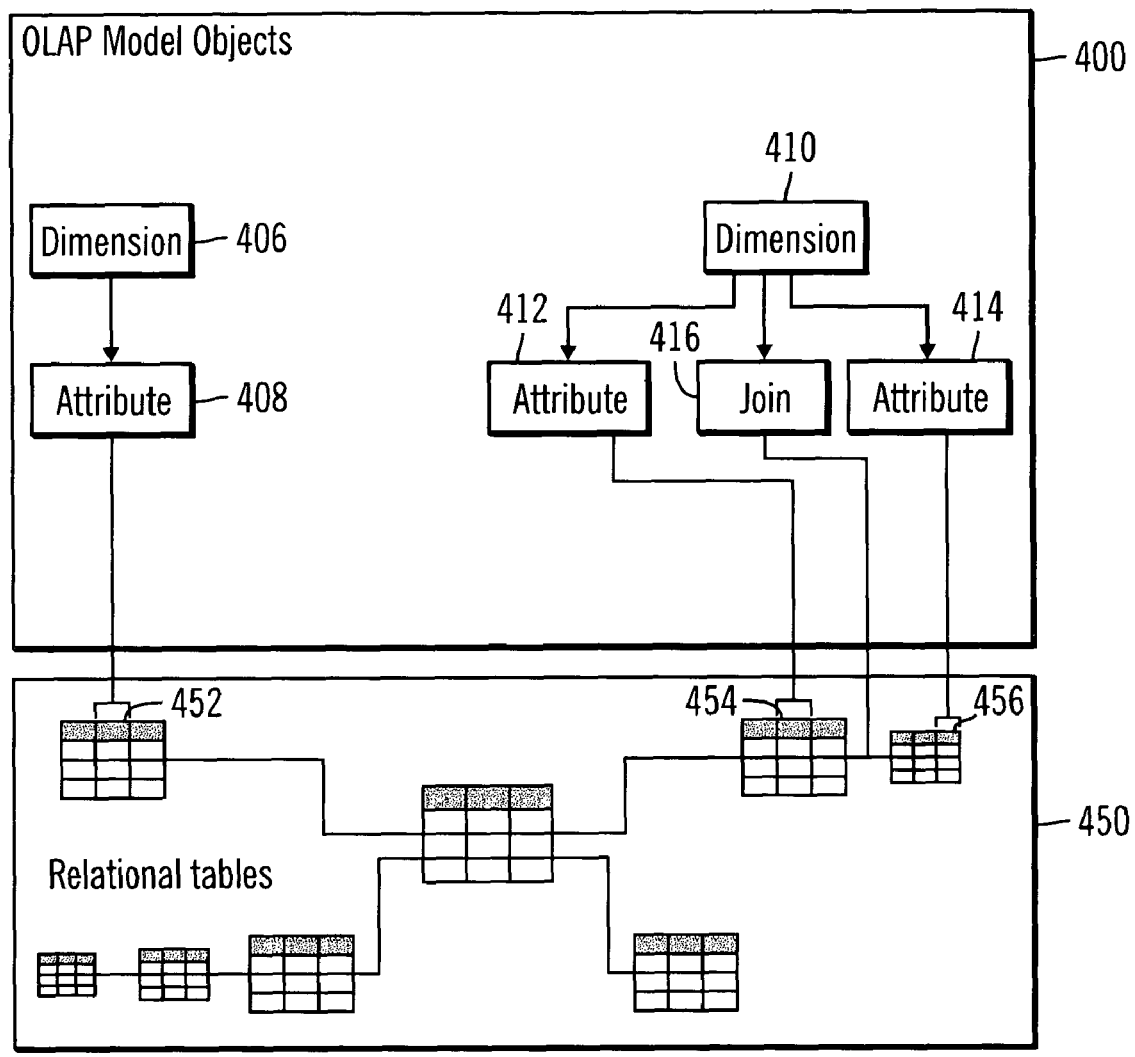
FIG. 4 illustrates that dimension metadata objects are built from relational tables in accordance with certain implementations of the invention.

FIG. 4 illustrates that dimension metadata objects 406, 410 are built from relational tables 450 in accordance with certain implementations of the invention. For example, among the metadata objects, dimension metadata object 406 is built on attribute metadata object 408, and attribute metadata object 408 is connected to an attribute 452 in a relational table. Dimension metadata object 410 is built on attribute metadata objects 412, 414 and a join metadata object 416. The attribute metadata objects are connected to attributes 454 and 456 in the relational tables 450.

Hierarchies store information about how the attributes within a dimension are related to each other and structured. As a metadata object, a hierarchy provides a way to calculate and navigate a dimension. Each dimension has a corresponding hierarchy with levels defined for each member attribute. For example, the Region dimension has a RegionH hierarchy with levels defined for the State and City attributes, and also references the CityPop AR attribute relationship. In a cube model, each dimension can have multiple hierarchies, but the example star schema has one hierarchy defined for each dimension.

In a star schema, all of the dimension metadata objects are connected in a star shape to a central facts metadata object to create a cube model. Join metadata objects can join tables to create a facts metadata object or a dimension metadata object. Metadata joins can also act as glue within the cube model by joining facts metadata objects to dimension metadata objects. The dimension metadata objects have information about all of their component hierarchies, attributes, attribute relationships and related joins. Facts metadata objects have information about all of their component measures, attributes, and related joins.

Figure 5:
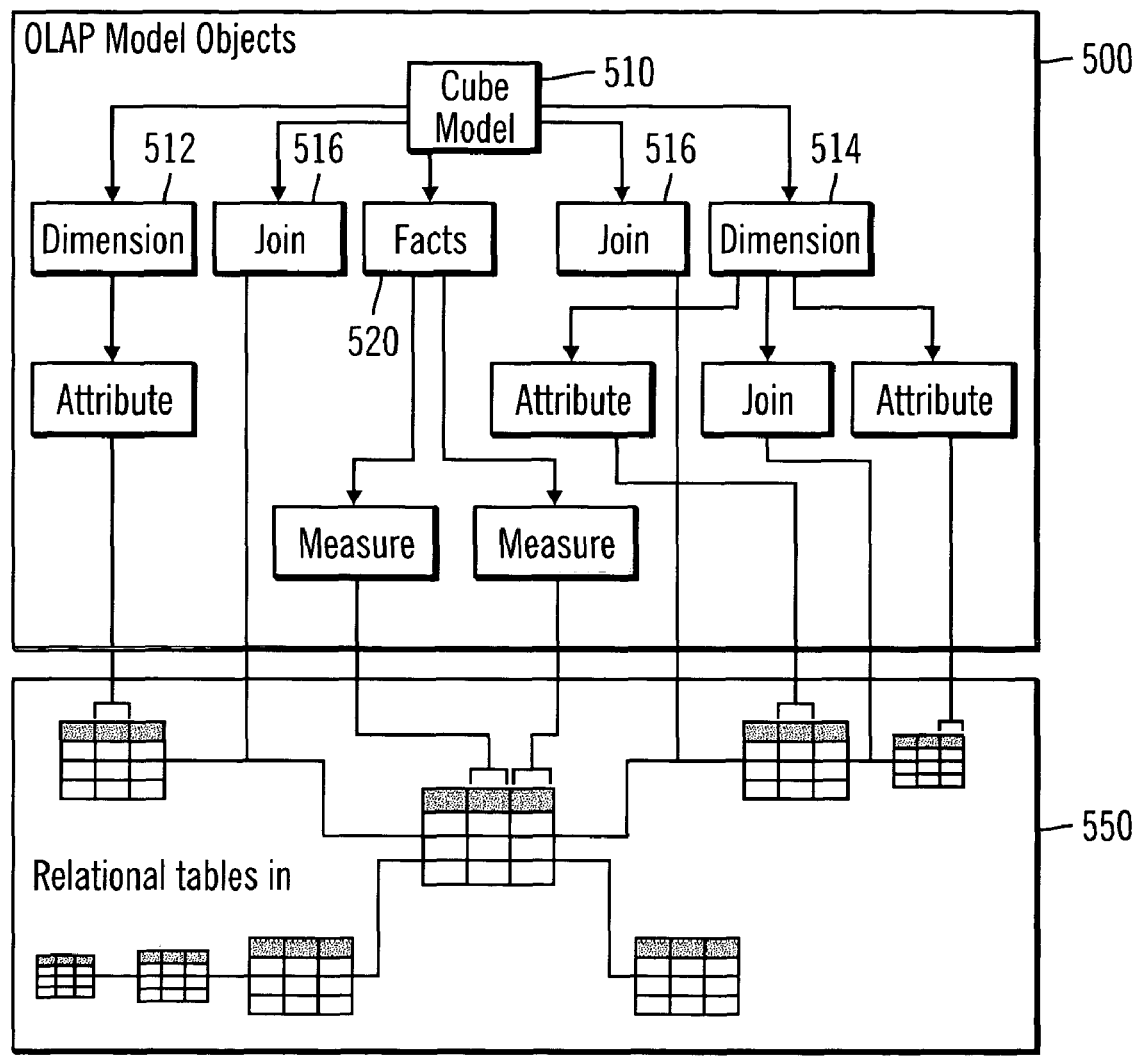
FIG. 5 illustrates that metadata objects fit together in a cube model and map to a relational star schema of relational tables in accordance with certain implementations of the invention.

FIG. 5 illustrates that metadata objects 500 fit together in a cube model and map to a relational star schema of relational tables 550 in accordance with certain implementations of the invention. A cube model metadata object 510 is built on dimension metadata objects 512, 514, join metadata objects 516, 518, and a facts metadata object 520.

Cube model metadata objects are flexible metadata objects whose components may be reused to create more precise cube metadata objects for specific applications. For example, a cube model metadata object may have 37 facts, but one cube metadata object generated from the cube model metadata object may eliminate one or more dimension metadata objects, one or more levels of a dimension metadata object, and/or one or more measure metadata objects.

In addition to cube model metadata objects, there is a more specific metadata object called a cube metadata object. A cube metadata object is the closest metadata object to an OLAP conceptual cube. A cube metadata object is a specific instance or subset of a cube model metadata object. A cube metadata object has a specific set of similar but more restrictive metadata objects derived from the parent cube model metadata object including: cube dimensions, cube hierarchies, and cube facts. For example, a RegionCubeDim is a cube dimension that is a subset of attributes derived from the Region dimension. RegionCubeDim references the State and City attributes, but does not reference the City_Population attribute or CityPop AR attribute relationship. The RegionCubeDim references the Region dimension that it scopes and all of the structural information, including the join information, stays with the cube model Region dimension.

In certain implementations, a cube metadata object has one cube hierarchy defined per cube dimension, while a dimension metadata object can have many hierarchies defined for the cube model metadata object. This structural difference between a cube metadata object and a cube model metadata object allows retrieval of a cube metadata object with a single SQL statement.

Figure 6:
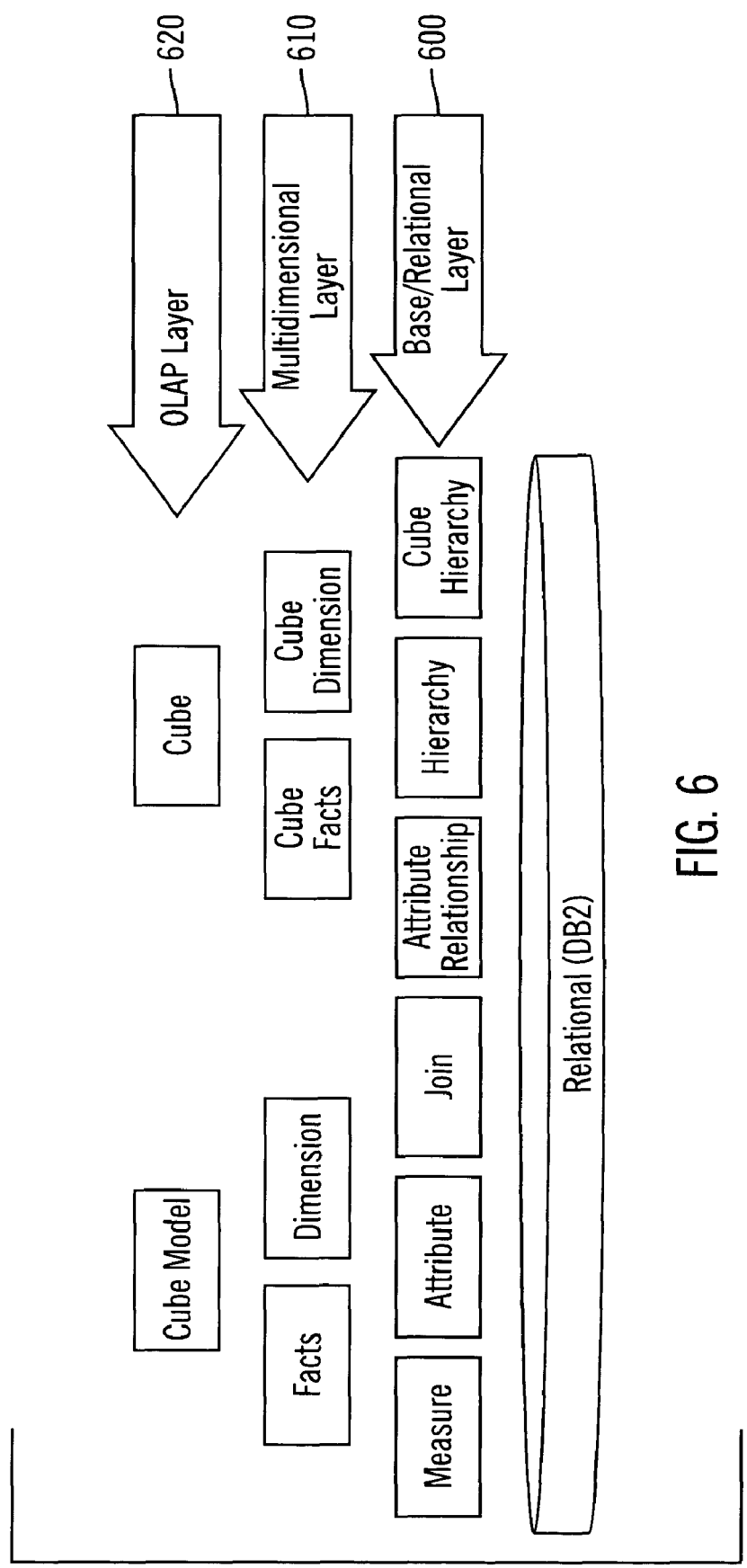
FIG. 6 illustrates that conceptual metadata objects are categorized in three layers in accordance with certain implementations of the invention.

FIG. 6 illustrates that conceptual metadata objects are categorized in three layers in accordance with certain implementations of the invention. These layers are a Base/Relational layer 600, a Multidimensional layer 610, and an OLAP layer 620. The Base/Relational layer 600 provides base infrastructure to other metadata objects and encapsulates concepts of the relational database. The Multidimensional layer 610 includes metadata objects that reference metadata objects in the Base/Relational layer 600 to provide a multidimensional abstraction over the relational database. The OLAP layer 620 contains high-level metadata objects that represent OLAP structures. By grouping metadata objects from other layers, the OLAP layer 620 provides OLAP cubes with different degrees of complexity.

An example is provided for better understanding of the invention. The example is based on a common structure used in data marts, a star-join schema. For the star join schema, instances of the metadata objects are created based on the Base/Relational, Multidimensional, and OLAP layers. FIG. 3 illustrates a simple star-join schema consisting of a fact table 300, Fact, and three dimension tables Time 310, Product 320, and Region 340 in accordance with certain implementations of the invention.

Existing database catalogs typically store table and column names. The information about what roles these tables and columns play, and how the tables and columns relate to each other is lost. However, with the OLAP multidimensional metadata system 100, this information is captured by creating metadata objects.

Figure 7:
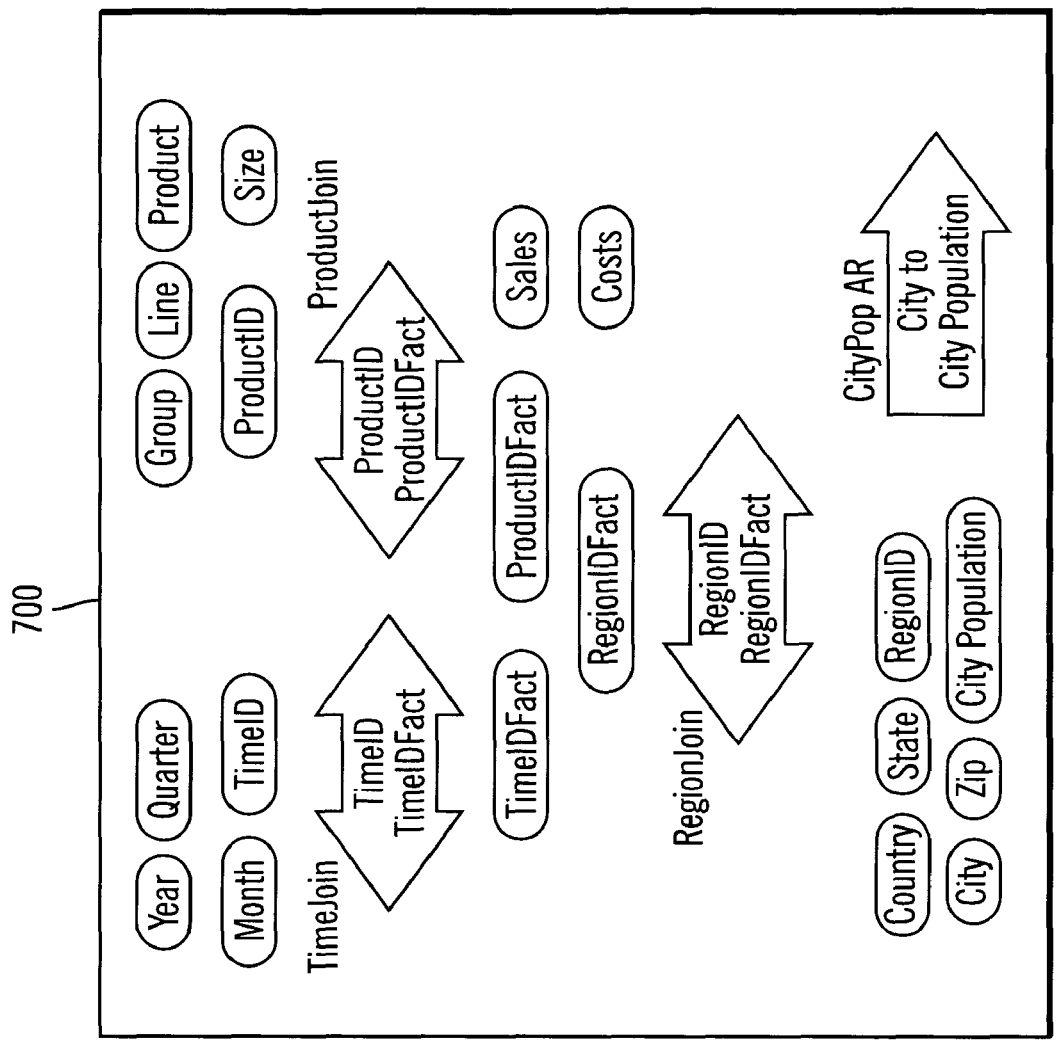
FIG. 7 illustrates that metadata objects corresponding to a Base/Relational layer are created in accordance with certain implementations of the invention.

FIG. 7 illustrates that metadata objects 700 corresponding to a Base/Relational layer are created in accordance with certain implementations of the invention. Attributes are created for all the dimension tables columns, and fact table columns used in joins. One measure metadata object is created for each fact column in the fact table. The joins used in this star-join schema are captured by the three join metadata objects. The join metadata objects specify how to join corresponding attributes of the fact table and dimension tables. One attribute relationship in the Region dimension table is created to represent the relationship between City and City_Population, and the fact that every value in the City attribute determines a value in the City_Population attribute.

Figure 8:
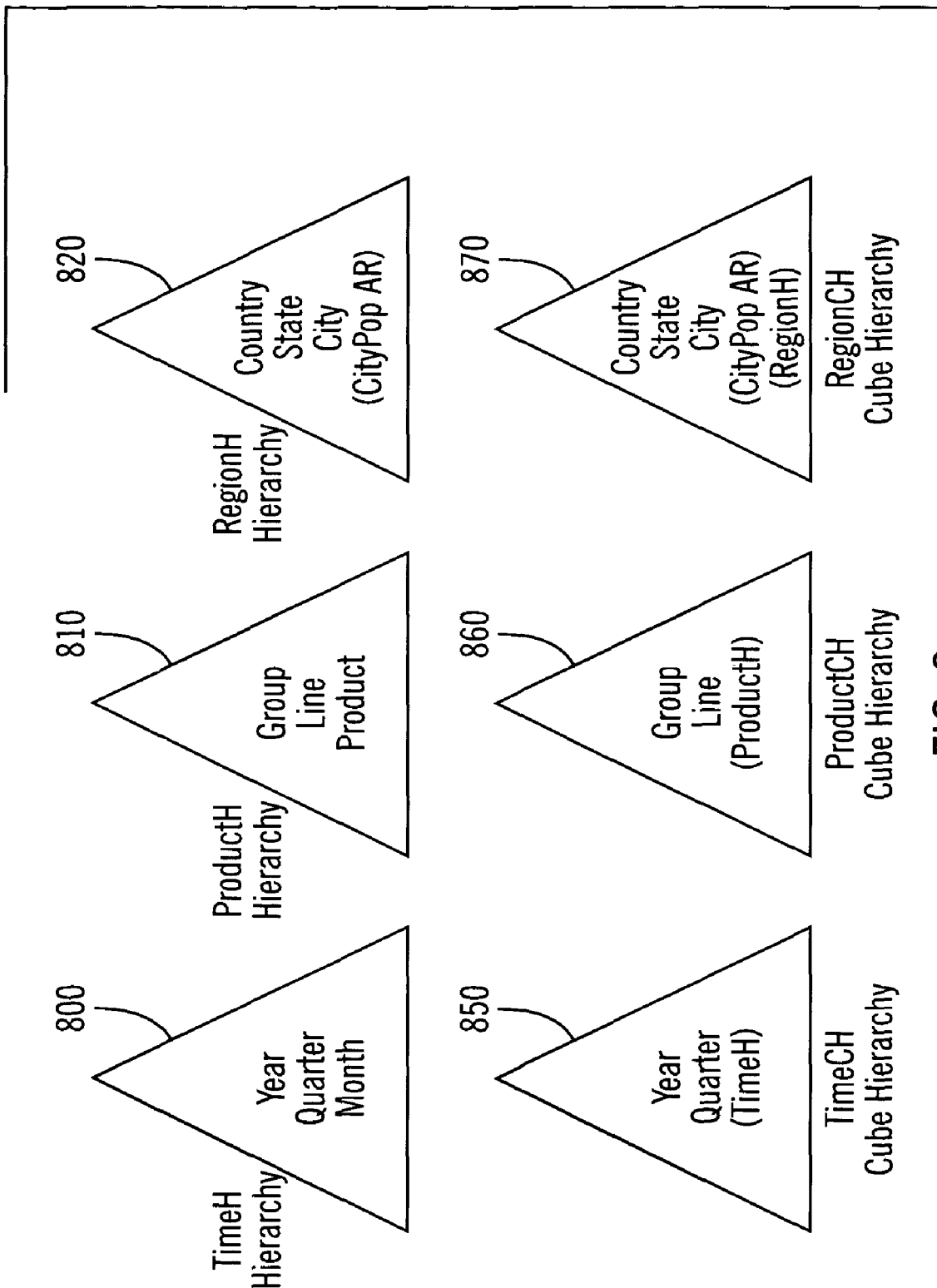
FIG. 8 illustrates additional metadata objects from the Base/Relational layer in accordance with certain implementations of the invention.

FIG. 8 illustrates additional metadata objects from the Base/Relational layer in accordance with certain implementations of the invention. Three hierarchies 800, 810, 820 are created, indicating the relationships among related attributes. These hierarchies 800, 810, 820 are used in the multidimensional layer by dimensions in order to create a means to calculate and navigate the dimension. In the RegionH hierarchy 820, the CityPop AR attribute relationship is referenced. All attribute relationships that apply to a given hierarchy are captured. One cube hierarchy 850, 860, 870 per hierarchy is also created in order to be used in a cube context. The cube hierarchies 850, 860, 870 are used to scope the levels of a hierarchy that are interesting for a given cube. A cube hierarchy 850, 860, 870 also captures attribute relationships that apply to it.

Figure 9:
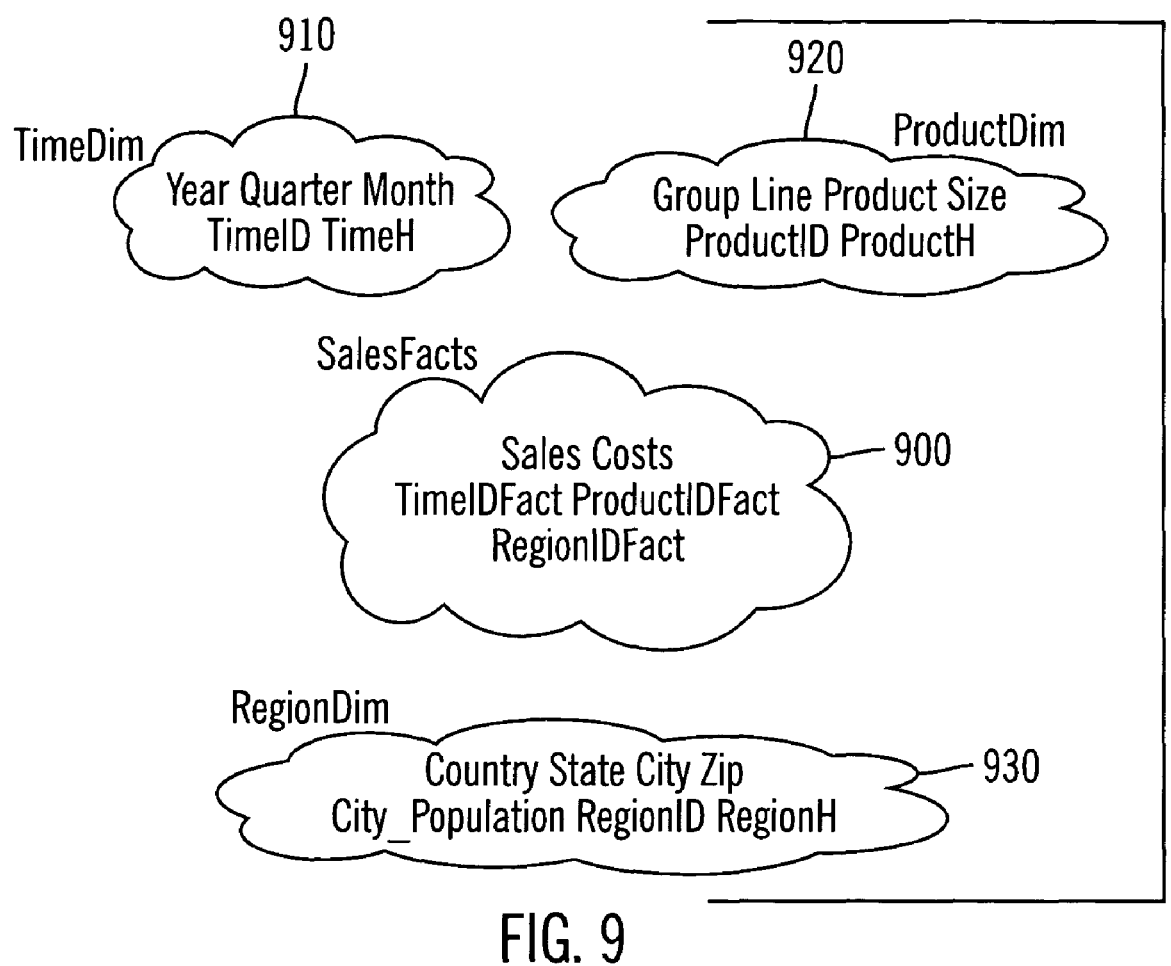
FIG. 9 illustrates multidimensional layer metadata objects created based on a star-join schema in accordance with certain implementations of the invention.

FIG. 9 illustrates multidimensional layer metadata objects created based on a star-join schema in accordance with certain implementations of the invention. One Facts metadata object 900 is created for the fact table Fact. The SalesFacts metadata object 900 includes the measures available and the attributes needed in the facts to dimension joins. One dimension metadata object 910, 920, 930 is created for each dimension table that is part of the star-join schema. A dimension metadata object groups attributes that are highly correlated, coming from a single dimension table in this example. A dimension metadata object also references hierarchies that apply on attributes of a dimension. Dimensions can have multiple hierarchies defined, however, in the example, only one hierarchy is defined per dimension.

Figure 10:
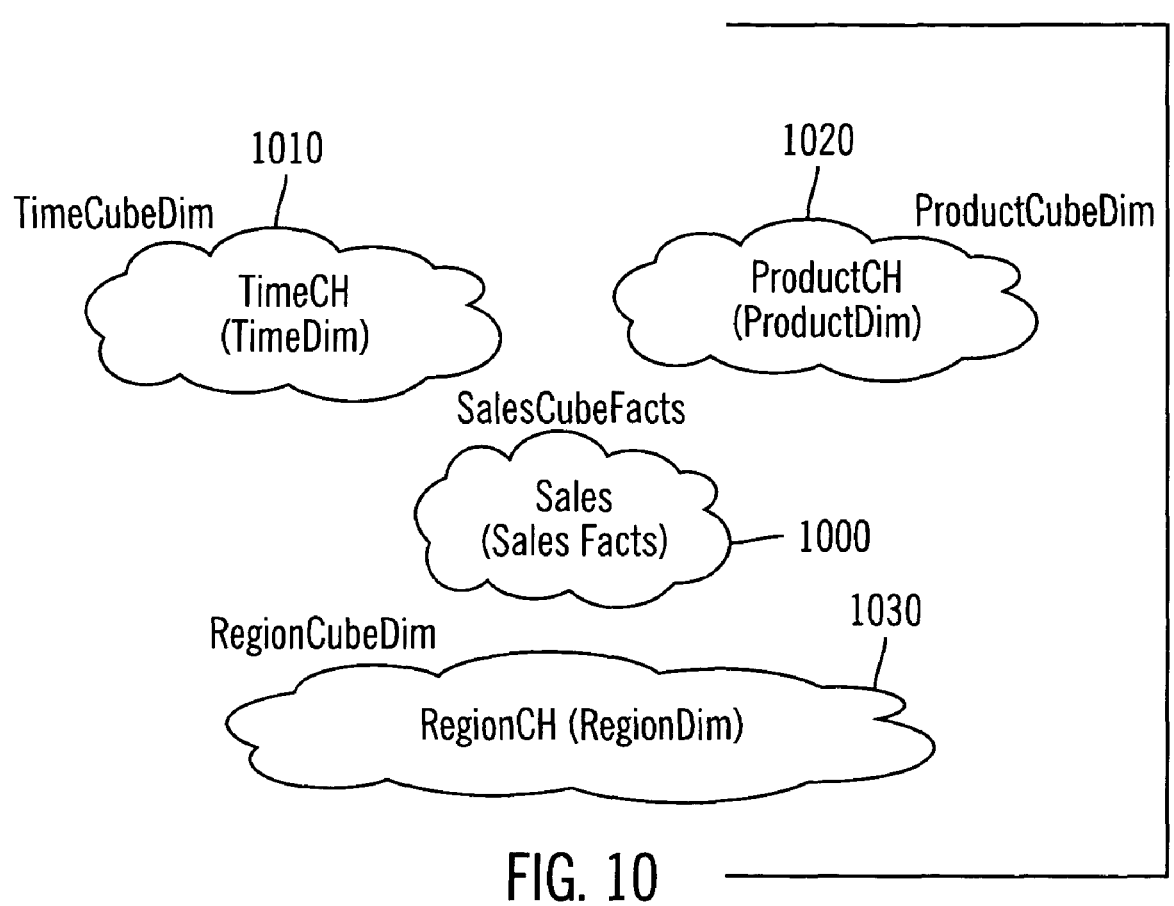
FIG. 10 illustrates instances of metadata objects used to define a cube in accordance with certain implementations of the invention.

FIG. 10 illustrates instances of metadata objects 1000, 1010, 1020, 1030 used to define a cube in accordance with certain implementations of the invention. A cube facts, cube dimension, and cube hierarchy metadata objects are used to scope the attributes and measures that are part of a cube. Each of these metadata objects references the metadata object that is being scoped, and all structural information, such as joins, is kept in the main (i.e., parent) metadata object. All cube specific objects hold a reference to a main object from which they were defined. For example, the cube hierarchy metadata object has a reference to the hierarchy metadata object from which the cube hierarchy metadata object was defined. In certain implementations, for cube dimensions, one hierarchy is assigned. In the example, a cube fact SalesCubeFacts 1000 is created and lists the measure (Sales) that is used in the cube.

The OLAP layer is composed by cube model and cube metadata objects. A cube model metadata object describes the facts and dimensions that are interesting to a given application. The dimensions of a cube model metadata object can have multiple hierarchies defined, which makes a cube model metadata object a very flexible structure. A cube metadata object is derived from a cube model metadata object, and so all cube dimensions, cube hierarchies, and cube facts metadata objects are derived from the cube model metadata object. A difference between a cube model metadata object and a cube metadata object is that in a cube metadata object one hierarchy is defined per dimension, which makes it possible to retrieve a cube metadata object with a single SQL statement.

Figure 11:
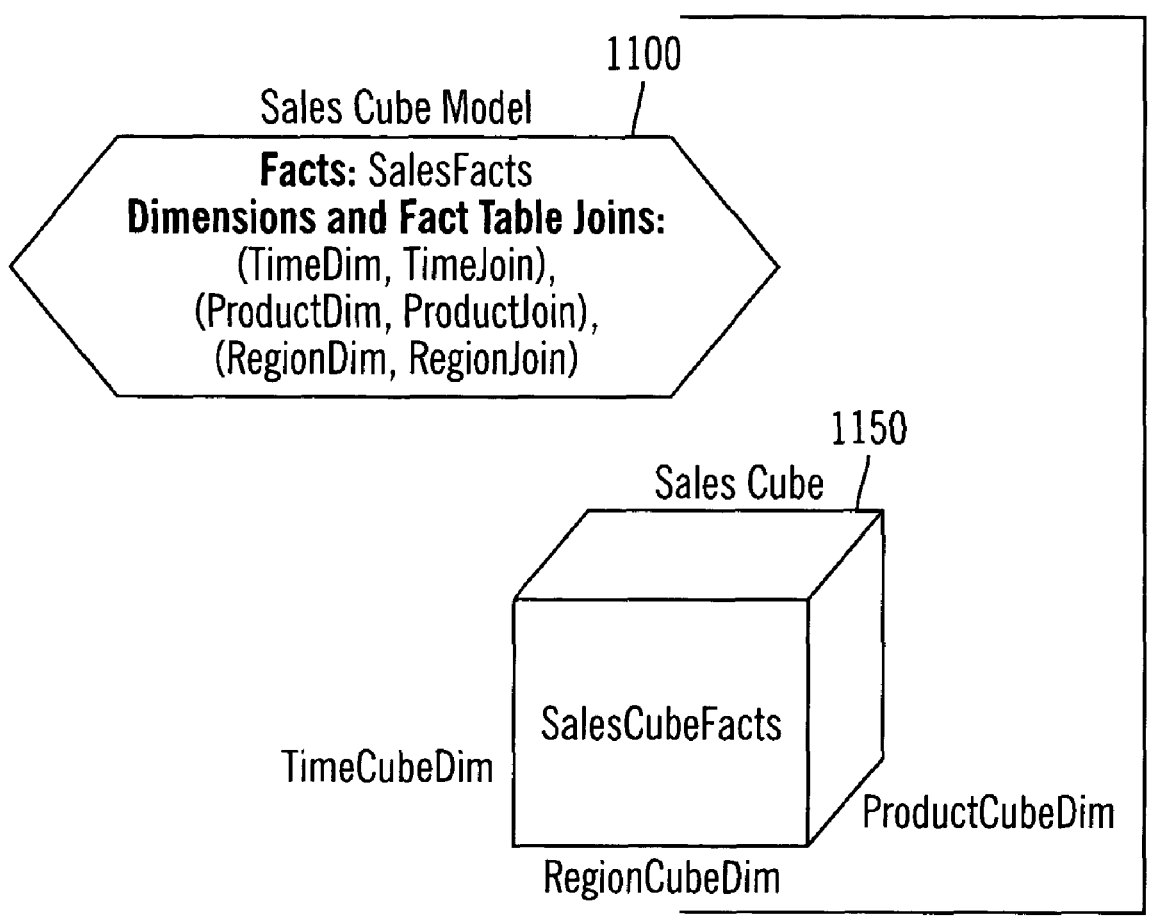
FIG. 11 illustrates that one instance of each metadata object in an on-line analytical processing (OLAP) layer is created in accordance with certain implementations of the invention.

FIG. 11 illustrates that one instance of each metadata object in an OLAP layer is created in accordance with certain implementations of the invention. The cube model created in the example captures one possible cube model 1100 generated from the example star-join schema of FIG. 3. A cube 1150 is created based on the cube dimensions TimeCubeDim, ProductCubeDim, RegionCubeDim and cube facts SalesCubeFacts.

A.2 Metadata Object Properties

Each metadata object has a set of general properties in addition to metadata object-specific properties. The general properties are used to identify the metadata object instances, to describe the usage or role of the metadata object instances, and to track metadata object instance changes. In certain implementations, the metadata objects are named using a schema in the same way that other database metadata objects are named. Full qualifications of the metadata object may be required when the default user name schema is not desired.

Table 1 describes the general properties that exist for all metadata objects in accordance with certain implementations of the invention.

TABLE 1

| Property | Description |
| --- | --- |
| Name | Name of the metadata object. |
| Schema | Schema that owns the metadata object. |
| Business name | Name presented to the end user. This name may be used in graphic user interfaces as a name more meaningful to the end user. |
| Comments | Textual description or comment on the nature or usage of the metadata object. |
| Create time | Time the metadata object was created. |
| Creator | User (schema) that defined the metadata object. |
| Modify time | Time the metadata object was last modified. |
| Modifier | User (schema) that performed the modification. |

In addition to a common set of general properties shared by all metadata objects, each metadata object has a set of metadata object specific properties. These metadata object specific properties describe the components and qualities that define the metadata object.

The cube model is a representation of a logical star schema. The cube model is a grouping of relevant dimension metadata objects around a central facts metadata object. Each dimension can have multiple hierarchies, which increases the flexibility of the cube model. The structural information about how to join the tables used by the facts and dimension metadata objects is stored in the cube model. Also stored in the cube model is enough information to retrieve OLAP data. Other reporting and OLAP tools that understand the cube model and can handle multiple hierarchies of a specific dimension can benefit from the use of a cube model.

Cube models define a complex set of relationships and can be used to selectively expose relevant facts and dimensions to an application. Each join metadata object connecting a dimension to the central facts metadata object is stored with the corresponding dimension as a set. Subsets of cube model components can be used by many cubes for different analysis purposes.

An empty cube model may be created that does not have a facts metadata object or any dimensions. However, the cube model is completed before creating a corresponding cube. The OLAP multidimensional metadata system 100 validates a cube model by ensuring that the cube model includes a facts metadata object, at least one dimension, and joins between the existing facts and dimensions, and that all of the attributes reference valid tables. A hierarchy is not required to consider a cube model complete, however, to be able to define a cube from a cube model, at least one hierarchy per dimension is defined.

Each metadata object has a set of metadata object-specific properties that describe the components and qualities that define the metadata object. The metadata object specific properties of a cube model are described Table 2 in accordance with certain implementations of the invention.

TABLE 2

| Property | Description |
| --- | --- |
| Facts | Facts used in the cube model. |
| Set of (dimension, join) | Dimensions that are used in the cube model and their corresponding joins. |

The facts metadata object groups related measures which are interesting to a given application. Multiple relational fact tables can be joined on specific attributes to map additional related measures. The facts metadata object stores information about the attributes used in fact to dimension joins, and the attributes and joins used to map the additional measures across multiple database tables. Therefore, in addition to a set of measures, a facts metadata object stores a set of attributes and a set of joins. A facts metadata object is used in a cube model as the center of a star schema.

The facts metadata object plays the role of a fact table in a star schema. Just as a fact table does, a facts metadata object gathers measurement entities, represented in the database catalog by measures. These need not come from the same table, allowing the designer to group measures as required for any OLAP application.

The metadata object specific properties of a facts metadata object are described in Table 3 in accordance with certain implementations of the invention.

TABLE 3

| Property | Description |
| --- | --- |
| Set of measures | Set of all related measures in the facts metadata object. |
| Set of attributes | Set of all attributes used in the facts metadata object. |
| Set of joins | Set of all joins needed to join all of the specified measures and attributes. |

The dimension metadata object plays the role of a dimension table in a star schema. Dimensions group related attributes, which together describe some aspect of one or more measures. Thus, the dimension metadata object provides a way to categorize a set of related attributes that together describe one aspect of a measure. Dimensions are used in cube models to organize the data in the facts metadata object according to logical categories such as Region, Product, or Time. Related attributes and the joins needed to group these attributes together are defined in the dimension metadata object specific properties.

Dimensions reference one or more hierarchies. Hierarchies describe the relationship and structure of the dimensional attributes and can be used to drive navigation and calculation of the dimension.

Dimensions also have a type that describes whether the dimension is time oriented. For example, a dimension called Time might contain attributes such as Year, Quarter, and Month, and would be a time type. Another dimension called Region might contain attributes such as Country, State, City, and Population and would be a regular type. Type information can be used by applications to intelligently and appropriately perform time related functions.

The metadata object specific properties of dimension metadata objects are described in the following Table 4 in accordance with certain implementations of the invention.

TABLE 4

| Property | Description |
| --- | --- |
| Set of attributes | Set of all attributes used in the dimension. |
| Set of joins | Set of all joins needed to join all of the specified attributes. The joins needed to join the dimension tables are specified here. |
| Set of hierarchies | Set of hierarchies that apply to the dimension. |
| Type [REGULAR, TIME] | Dimension type. |

A hierarchy defines relationships among a set of one or more attributes within a given dimension of a cube model. Defining these relationships provides a navigational and computational means of traversing a given dimension. Multiple hierarchies can be defined for a dimension of a cube model. The hierarchy metadata object also references a set of attribute relationships that link attributes in the hierarchy to other related attributes. The attributes that are directly related by an attribute relationship can be queried as part of the hierarchy. For example, a hierarchy for a Region dimension can have a City attribute, and an attribute relationship can link City to a City_Population attribute. This hierarchy can include City_Population information in a query that includes City.

A hierarchy describes parent-child relationships among attributes. This information is referred to by a dimension to indicate how dimension members can be browsed, and how to aggregate data in the dimension.

The hierarchy type describes the relationship among the attributes within the hierarchy. The following four hierarchy types are supported: balanced, unbalanced, ragged, and network.

Figure 12:
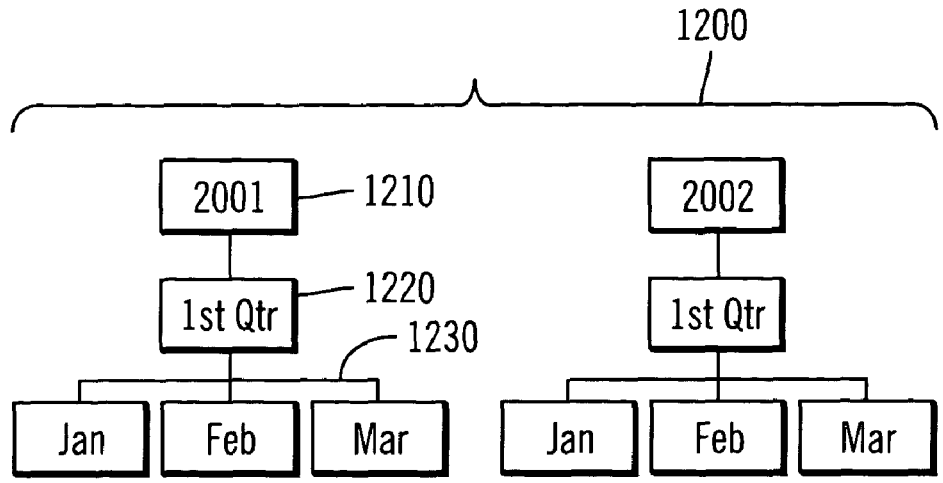
FIG. 12 illustrates an example of a balanced hierarchy in accordance with certain implementations of the invention.

FIG. 12 illustrates an example of a balanced hierarchy 1200 in accordance with certain implementations of the invention. A balanced hierarchy is one with meaningful levels and branches that have a consistent depth. A logical parent of each attribute is in the level directly above that attribute. The balanced hierarchy 1200 represents time where the meaning and depth of each level, such as Year 1210, Quarter 1220 and Month 1230 is consistent.

Figure 13:
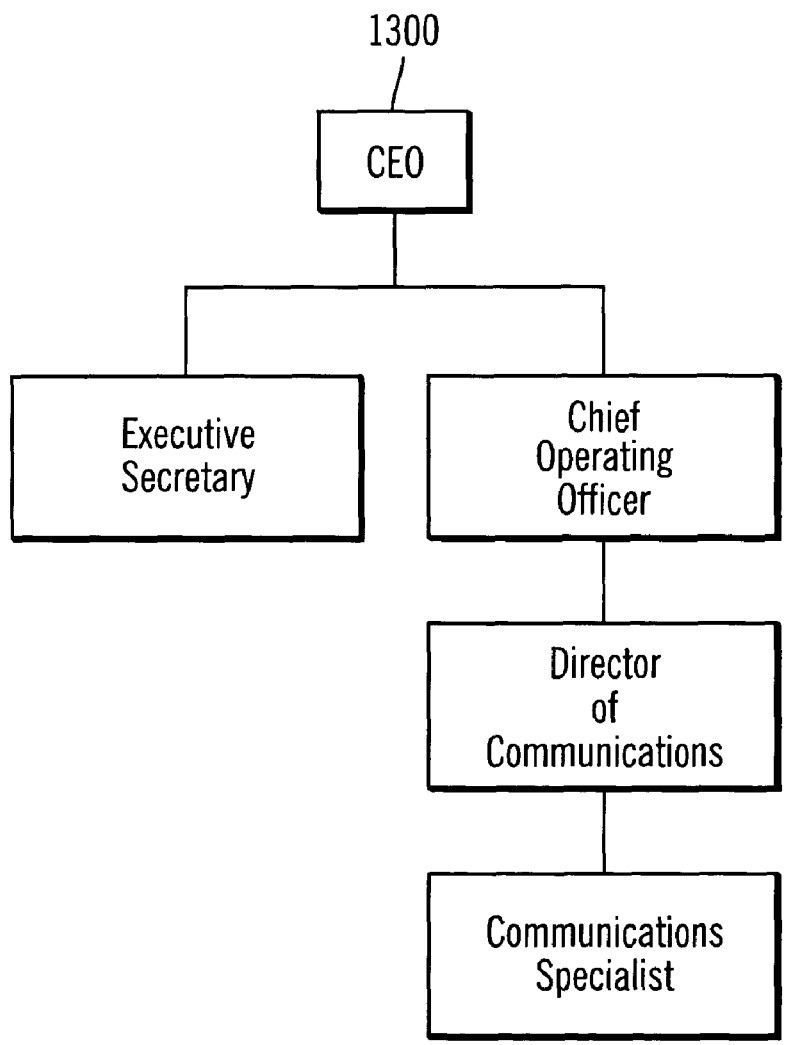
FIG. 13 illustrates an example of an unbalanced hierarchy in accordance with certain implementations of the invention.

FIG. 13 illustrates an example of an unbalanced hierarchy 1300 in accordance with certain implementations of the invention. An unbalanced hierarchy is one with levels that have a consistent parent-child relationship, but have an inconsistent semantic meaning for all members in a particular level. Also, the hierarchy branches have inconsistent depths. An unbalanced hierarchy can represent an organization chart. For example, the unbalanced hierarchy 1300 shows a CEO on the top level of the hierarchy and at least two of the people that might branch off below, including the chief operating officer and the executive secretary. The chief operating officer has many more people branching off also, but the executive secretary does not. There is a consistent parent-child relationship between the CEO and all of the people who report to the CEO. However the semantic meaning of the level directly below the CEO is inconsistent because of the different types of employees in that level.

Figure 14:
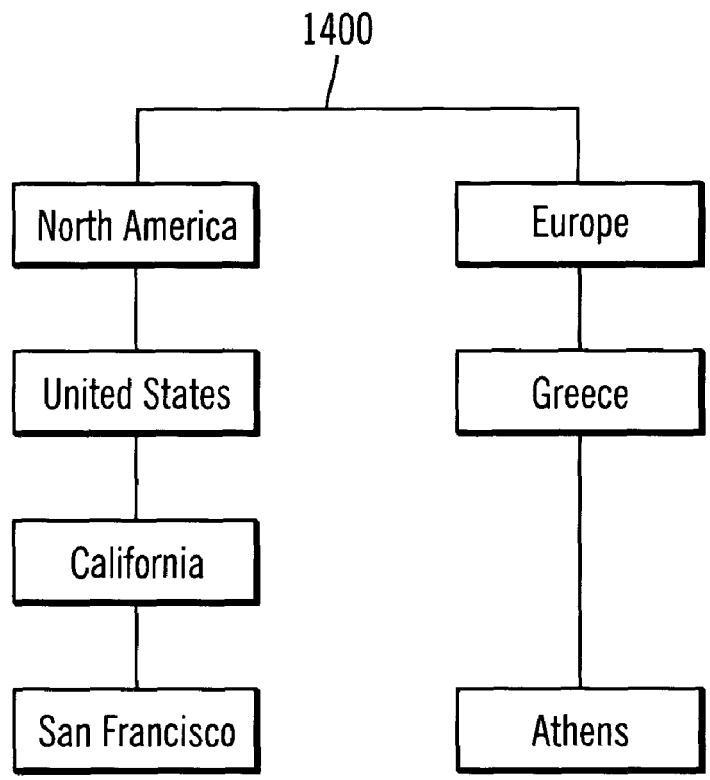
FIG. 14 illustrates a ragged hierarchy in accordance with certain implementations of the invention.

A ragged hierarchy is one in which each level has a consistent meaning, but the branches have inconsistent depths because at least one member attribute in a branch level is unpopulated. A ragged hierarchy can represent a geographic hierarchy in which the meaning of each level such as city or country is used consistently, but the depth of the hierarchy varies. FIG. 14 illustrates a ragged hierarchy 1400 in accordance with certain implementations of the invention. The ragged hierarchy 1400 shows a geographic hierarchy that has Continent, Country, Province/State, and City levels defined. One branch has North America as the Continent, United States as the Country, California as the Province/State, and San Francisco as the City. However the hierarchy 1400 becomes ragged when one member does not have an entry at all of the levels. For example, another branch has Europe as the Continent, Greece as the Country, and Athens as the City, but has no entry for the Province/State level because this level is not applicable to Greece. In this example, the Greece and United States branches descend to different depths, creating a ragged hierarchy 1400.

Figure 15:
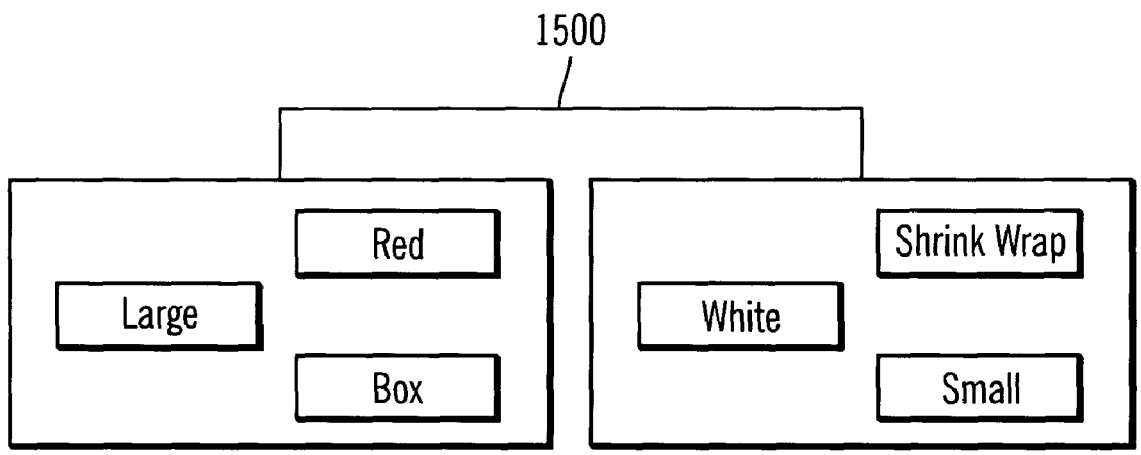
FIG. 15 illustrates a network hierarchy in accordance with certain implementations of the invention.

A network hierarchy is one in which the order of levels is not specified, but in which levels do have semantic meaning. FIG. 15 illustrates a network hierarchy 1500 that describes product attributes such as Color, Size, and PackageType in accordance with certain implementations of the invention. Because the attribute levels do not have an inherent parent-child relationship, the order of the levels may vary. A widget company might have member entries, such as white for Color, small for Size, and shrink wrap for PackageType. A second member entry might have red for Color, large for Size, and box for PackageType.

A hierarchy (balanced, unbalanced, ragged, or network) also specifies deployment mechanisms for the hierarchy. A deployment mechanism defines how to interpret the attributes of a hierarchy. The following two deployment mechanisms are supported: standard and recursive.

The standard deployment mechanism uses the level definitions of the hierarchy, where each attribute in the hierarchy defines one level. For example, a balanced hierarchy for a Time dimension would be organized by each defined level including Year, Quarter, and Month. Standard deployment can be used with all four hierarchy types. Table 5 shows how some of the balanced hierarchy attributes for a Time dimension are organized using a standard deployment in accordance with certain implementations of the invention.

TABLE 5

| Year | Quarter | Month |
|------|---------|-------|
| 2001 | $1^{st}$ quarter | January |
| 2001 | $1^{st}$ quarter | February |
| 2001 | $1^{st}$ quarter | March |
| 2002 | $1^{st}$ quarter | January |
| 2002 | $1^{st}$ quarter | February |
| 2002 | $1^{st}$ quarter | March |

The recursive deployment mechanism uses the inherent parent-child relationships between the attributes of the hierarchy. An unbalanced hierarchy using a recursive deployment is represented as parent-child attribute pairs. For example, Table 6 shows the attribute pairs for the unbalanced hierarchy describing an organization chart shown in FIG. 13 in accordance with certain implementations of the invention. The parent-child attribute pairs include: chief executive officer and executive secretary, chief executive officer and chief operating officer, chief operating officer and director of communications, director of communications and communications specialist. Recursive deployment may be used with an unbalanced hierarchy.

TABLE 6

| Parent Attribute | Child Attribute |
|------------------|-----------------|
| Chief executive officer | Executive secretary |
| Chief executive officer | Chief operating officer |
| Chief operating officer | Director of communications |
| Director of communications | Communications specialist |

The metadata object specific properties of a hierarchy metadata object are described in the following Table 7 in accordance with certain implementations of the invention.

TABLE 7

| Property | Description |
|----------|-------------|
| List of attributes | Ordered list of attributes from the top to the bottom of a hierarchy. In the case of a recursive hierarchy, two attributes are used as parent and child. |
| Set of attribute relationships | Set of all attribute relationships that link hierarchy attributes to other attributes. |
| Type [BALANCED, UNBALANCED, RAGGED, NETWORK] | Hierarchy type. |
| Deployment [STANDARD, RECURSIVE] | Hierarchy deployment. |

A measure metadata object defines a measurement entity and is used in facts metadata objects. Measures become meaningful within the context of a dimension. For example, a revenue of 300 is not meaningful by itself. When a revenue measure is put in the context of a dimension, such as Region, the measure becomes meaningful. For example, the revenue for Vermont is 300. Common examples of measure metadata objects are Revenue, Cost, and Profit.

The measure object makes explicit the existence of a measurement entity. Measures are defined by one or more SQL expressions, which can be as simple as a mapping to a table column, or can involve multiple columns and other measures or attributes. For each measure, a list of aggregations is defined for calculations in the context of a cube model, or cube. Each aggregation in the list specifies an aggregation function, such as SUM, COUNT, MIN, MAX, and a list of dimension in which the aggregation function is applied. An empty dimension set in an aggregation indicates that all remaining dimensions, non-explicitly referenced in the measure, are to be used. A measure will have more than one SQL expression template when the first aggregation function used requires more than one input, such as CORRELATION. A measure can have an empty list of aggregations when it has a single SQL expression template, and it only refers to other measures. In this case, the aggregation of the referenced measures take place. Measures and attributes share the same name space, meaning that the names, when fully qualified by a schema, have to be unique among measures and attributes. Common examples for measures are Sales, Costs, Profit, etc.

Measures are defined by the aggregation of SQL expressions. Table columns, attributes and measures are mapped to a template to build SQL expressions (i.e., a "SQL expression template"). The resulting SQL expressions are then used as input for the first aggregation function of the measure. If a measure has more than one aggregation, the aggregation functions are performed in the order they are listed, with each subsequent aggregation taking the result of the previous aggregation as input. If the SQL expression of the measure metadata object only references other measures, the aggregation function is omitted because the referenced measures describe any required aggregations.

A SQL expression of a measure is created by the combination of two properties: a SQL expression template and a list of columns, attributes, and measures. The SQL expression template uses a token notation where {$$n} is the token and n references a specific column, attribute, or measure from the list. The list of columns, attributes, and measures is ordered, and the position in the list of a column, attribute or measure corresponds to the token "n" value.

SQL expressions are used as input to the first aggregation. Each aggregation specifies a function that is applied to a corresponding dimension set. The aggregation function can be any aggregation function supported by the underlying database, including, for example, SUM, COUNT, MIN, MAX, and CORRELATION. In certain implementations, each dimension is aggregated once by the measure metadata object. If the dimension set is empty, the aggregation function is applied to all dimensions in the cube or cube model that are not specifically being used by another aggregation in the list. In certain implementations, the aggregate functions are user-defined aggregate functions that are supported by RDBMS 110.

An example of a simple measure is Revenue. The Revenue measure can be created for a cube model with three dimensions: Product, Market and Time. Revenue has a SQL expression template (template="{$$1} "), which represents a simple mapping to the column specified in the single-item list of columns, attributes, and measures, where list="Column Fact.Rev". The aggregation list is (SUM, <NULL>) where SUM is the aggregation function, and <NULL> is an empty dimension set. The SQL expression is used as input for the SUM aggregation function, resulting in the SQL: SUM(Fact.Rev).

A more complicated measure, Profit, might have a SQL expression template (template="{$$1}−{$$2}"), where the list of attributes, columns, and measures is list="Measure Revenue, Column Fact.Cost". Replacing the tokens with the correct references, the SQL expression becomes: "Revenue−Fact.Cost". Expanding the revenue measure reference to its column reference, the SQL expression becomes: "Fact.Rev−Fact.Cost". The aggregation list of the Profit measure is: (SUM, <NULL>). Using the profit SQL expression as input for the SUM aggregation function, the SQL for the Profit measure is: SUM(Fact.Rev−Fact.Cost).

If the measure has an aggregation function, such as CORRELATION, that requires two or more parameters, the measure will have the number of SQL expressions that the function requires as input. That is, the number of parameters matches the number of SQL expressions. For example, if CORRELATION requires two parameters, then there will be two SQL expressions.

Measures also have a data type that is based on SQL data types. The OLAP multidimensional metadata system 100 automatically determines the data type of a measure. Additionally, measures and attributes share the same name space. Therefore, each name, when fully qualified by a schema, is unique among measures and attributes. The metadata object specific properties of a measure metadata object are described in the following Table 8 in accordance with certain implementations of the invention.

TABLE 8

| Property | Description |
| --- | --- |
| List of SQL expression templates | List of SQL expression templates used as input for the first aggregation function of the measure. The templates reference columns, attributes, and measures by using a '{$$n}' notation. In the template, n is an ordinal number corresponding to the list of columns, attributes, and measures. |
| List of columns, attributes, and measures | For each SQL expression template, an ordered list of columns, attributes, and measures is supplied. These columns, attributes, and measures are applied as specified in the SQL expression template. |
| List of aggregations (list of aggregation functions, dimension sets) | List of aggregations that specify how a measure is calculated. Each aggregation is composed by a SQL aggregation function and an optional dimensions set to apply the function to. |
| Data type (schema, name, length, scale) | Determines the data type of the attribute. Based on SQL data types, and composed by data type schema, name, length, and scale. |

An attribute represents the basic abstraction of the database table columns. An attribute is defined by a SQL expression that can be a simple mapping to a table column, can involve multiple columns and other attributes, and can involve all functionalities of the underlying database, such as user-defined functions. In certain implementations, when other attributes are used in the defining SQL expression, the other attributes cannot form attribute reference loops. For example, if Attribute A references Attribute B, then Attribute B cannot reference Attribute A.

A SQL expression definition of an attribute is created by the combination of two properties: a SQL expression template and a list of columns and attributes. The SQL expression template uses a token notation where {$$n} is the token with n referencing a specific column or attribute from the list. The list of columns and attributes is ordered, and the position in the list of a column or an attribute corresponds to the token "n" value.

For example, the SQL expression template (template="{$$1}||"||{$$2}") can be used with a corresponding list such as list="Column CUSTOMER.FIRSTANME, Attribute LastName" to concatenate customers' first and last names with a space between them. Replacing the SQL expression template tokens with the correct list references, the SQL expression is: "Customer.FirstName ||"|| LastName". The attribute reference is further expanded to a column reference to form the SQL expression: "Customer.FirstName ||"|| Customer.LastName".

An attribute can serve multiple roles in the design of a data warehouse or data mart. The roles that an attribute can serve are: level, description, dimensional attribute, dimensional key, or key.

A level attributed is used in hierarchies. Examples of common level attributes are: Year and Quarter, State and City. A description attribute is used in a description type of attribute relationship and associates additional descriptive information to another attribute. For example, a table called Product might have an attribute with a product code and a description attribute with a textual description. The dimensional attribute is used in a dimensional type of attribute relationship and defines specific characteristics and qualities of another attribute. Examples of common dimensional attributes are: Population, Size, and Weight. The dimensional key attribute is used to join facts and dimension metadata objects and represents the primary key in a dimension table, or a foreign key from a dimension table to be used in a fact table. The key attribute is used to join tables within a facts or dimension metadata object. Key attributes are often used in a snowflake schema.

Attributes and measures share the same name space. Therefore, each name, when fully qualified by a schema, is unique among attributes and measures. Attribute and measure metadata objects are abstractions of a relational database column. However, they are defined by an SQL expression that can include multiple columns. Measures are more specialized than attributes-they include aggregation functions (column functions) that are used to calculate higher-level summaries from lower-level data.

Table 9 describes the metadata object specific properties that define an attribute metadata object in accordance with certain implementations of the invention.

TABLE 9

| Property | Description |
| --- | --- |
| SQL expression template | SQL expression that defines the attribute. The SQL expression template references columns and attributes by using a {$$n} notation, where n is an ordinal number corresponding to the list of columns and attributes. |
| List of columns and attributes for SQL expression | Ordered list of all columns and attributes composing the attribute. These columns and attributes are applied as specified in the SQL expression template. |
| Data type (schema, name, length, scale) | Determines the data type of the attribute. Based on SQL data types, and composed by data type schema, name, length, and scale. |
| Role [LEVEL, DESCRIPTION, DIMATTR, DIMKEY, KEY] | Roles that the attribute serves. |

An attribute relationship describes relationships of attributes in general. The relationships are described by a left and a right attribute, a type, a cardinality, and whether or not the relationships determine a functional dependency. The type describes what the role of the right attribute is with respect to the left attribute. For example, a ProductName right attribute describes a ProductCode left attribute. The relationship type between ProductName and ProductCode is DESCRIPTION. The cardinality describes how the instances of the left and right attributes are related and it is interpreted based on cardinality. In a 1:1 cardinality, there is at most one left attribute instance for each right attribute instance, and at most one right attribute instance for each left attribute instance. In a 1:N cardinality, there is at most one left attribute instance for each right attribute instance, and any number of right attribute instances for each left attribute instance. In a N:1 cardinality, there is any number of left attribute instances for each right attribute instance, and at most one right attribute instance for each left attribute instance. In a N:N cardinality, there is any number of left attribute instances for each right attribute instance, and any number of right attribute instances for each left attribute instance.

The functional dependency property tells whether the attribute relationship can also be used as a functional dependency. A functional dependency defines a functional relationship between two attributes. For example, a functional dependency can be defined between attributes such as City and Mayor or Product and Color. The functional dependency tells that every City value determines a Mayor value or that every Product value determines a Color value. This means that the cardinality described in the relationship is set by the designer, which is useful for query optimizations.

One use of an attribute relationship is within the context of a hierarchy in a dimension. Attributes that are directly related to the hierarchy attributes can be queried as part of the hierarchy. This allows each level of the hierarchy to define attributes that complement the information of a given level. For example, a hierarchy can have a City attribute. The City attribute can be related to a City—Population attribute with an attribute relationship. With the attribute relationship information, City—Population information can be included in a query that includes City.

The metadata object specific properties defining an attribute relationship metadata object are described in the following Table 10 in accordance with certain implementations of the invention.

TABLE 10

| Property | Description |
| --- | --- |
| Left attribute | Left attribute used in the relationship. |
| Right attribute | Right attribute used in the relationship. |
| Type [DESCRIPTION, ASSOCIATED] | Type of relationship described by the attribute relationships. The type is used to determine what role an attribute plays. |
| Cardinality [1:1, 1:N, N:1, N:N] | Cardinality expected in the join. |
| Functional dependency [YES, NO] | Determines if the attribute relationship is also a functional dependency. |

The join metadata object joins relational tables that are referenced by two metadata objects. Two metadata objects can be joined on one or more pairs of attribute metadata objects mapping to relational table columns. In a facts to dimension join, a join metadata object joins attributes from the facts metadata object and attributes from the dimension metadata object. In a composite join, the set of attribute pairs is from the same set of tables. For example, to join relational Table1 with a compound key of FirstName and LastName, with a relational Table2 that has a compound key of FName and Lname, one relational join with two join predicates is used; one join predicate for Table1.FirstName and Table2.FName, a second join predicate for Table1.LastName and Table2.LName. The information about this composite join is stored in one join metadata object.

The join metadata object is defined by a list of the left attribute, right attribute, and join operator. Also, the join type and expected cardinality are specified. Joins can be used between two facts, two dimensions, or a fact and a dimension. Join metadata objects are referred to by cube model, facts, and dimension objects.

The metadata object specific properties that define a join metadata object are described in the following Table 11 in accordance with certain implementations of the invention.

TABLE 11

| Property | Description |
| --- | --- |
| List of (left attribute, right attribute, operator) | Left attribute: The attribute on the left side of the join. Right attribute: The attribute on the right side of the join. Operator: Operator expected in the join [=, <, >, <>, >=, <=]. |
| Type [INNER, FULL OUTER, LEFT OUTER, RIGHT OUTER] | Type of join expected. |
| Cardinality [1:1, 1:N, N:1, N:N] | Cardinality expected in the join. |

A cube is a very precise definition of an OLAP cube that can be delivered using a single SQL statement. Each cube is derived from a single cube model. The cube facts and list of cube dimensions are subsets of those in the referenced cube model. A cube view name is also defined which represents the cube in the database. Cubes are appropriate for tools and applications that do not use multiple hierarchies because cube dimensions allow one cube hierarchy per cube dimension.

The purpose of a cube is to define a standard relational view of an OLAP structure. In addition to the relational view, a cube provides an extended describe (e.g., XML document) that describes the roles of its columns in multidimensional terms. In the process of defining a cube, the designer selects a subset of the possible elements, choosing a single hierarchy for each dimension. This ensures that the cube unambiguously defines a single relational result set. The simplicity of a cube makes the cube useful to less sophisticated OLAP applications, such as portable devices powered by World Wide Web ("Web") services.

The metadata object specific properties of a cube metadata object are described in the following Table 12 in accordance with certain implementations of the invention.

TABLE 12

| Property | Description |
| --- | --- |
| Cube model | Cube model from which the cube is derived. |
| Cube facts | Cube facts used in the cube. The cube facts is derived from the facts metadata object in the cube model. |
| List of cube dimensions | Ordered list of cube dimensions used in the cube. The cube dimension is derived from the dimensions in the cube model. One cube hierarchy is associated with each cube dimension. |
| Cube view | View in the database that represents the cube. |
| Extended Describe | XML document describing roles of columns and their relationships in terms of a multidimensional model |

A cube facts metadata object has a subset of measures in an ordered list from a specific facts metadata object. A cube facts metadata object gives a cube the flexibility to scope facts for a cube model. The structural information, such as the joins and attributes, is referenced from the parent facts metadata object. The metadata object specific properties that define a cube facts metadata object are described in the following Table 13 in accordance with certain implementations of the invention.

TABLE 13

| Property | Description |
| --- | --- |
| Facts | Facts from which the cube facts is derived. |
| List of measures | Ordered list of measures used in a cube. All measures are part of the facts from which the cube facts is derived. |

A cube dimension metadata object is used to scope a dimension for use in a cube. The cube dimension metadata object references the dimension from which it is derived and the relevant cube hierarchy for the given cube. In certain implementations, one cube hierarchy can be applied to a cube dimension. The joins and attributes that apply to the cube dimension are referenced from the dimension definition. The metadata object specific properties that define a cube dimension metadata object are described in the following Table 14 in accordance with certain implementations of the invention.

TABLE 14

| Property | Description |
| --- | --- |
| Dimension | Dimension from which the cube dimension is derived. |
| Cube hierarchy | Cube hierarchy that applies to the cube dimension. |

A cube hierarchy metadata object is a scoped version of a hierarchy and is used in a cube. A cube hierarchy references the hierarchy from which it is derived and can have a subset of the attributes from the parent hierarchy. Additionally, a cube hierarchy metadata object references the attribute relationships that apply on the cube. In certain implementations, one cube hierarchy can be defined for a cube dimension of a cube. A cube hierarchy metadata object has the same hierarchy types and deployment mechanisms as the hierarchy from which the cube hierarchy metadata object is derived.

A cube hierarchy is very similar to a hierarchy; however, a cube dimension refers to a single cube hierarchy. This allows a single SELECT statement to calculate the cells of a cube.

The metadata object specific properties that define a cube hierarchy metadata object are described in the following Table 15 in accordance with certain implementations of the invention.

TABLE 15

| Property | Description |
| --- | --- |
| Hierarchy | Hierarchy from which the cube hierarchy is derived. |
| Lists of attributes | Ordered list of all attributes from the top to the bottom of the cube hierarchy. The order of the attributes should be the same as in the parent hierarchy. |
| Set of attribute relationships | Set of all attribute relationships that link cube hierarchy attributes to other attributes. |

Figure 16:
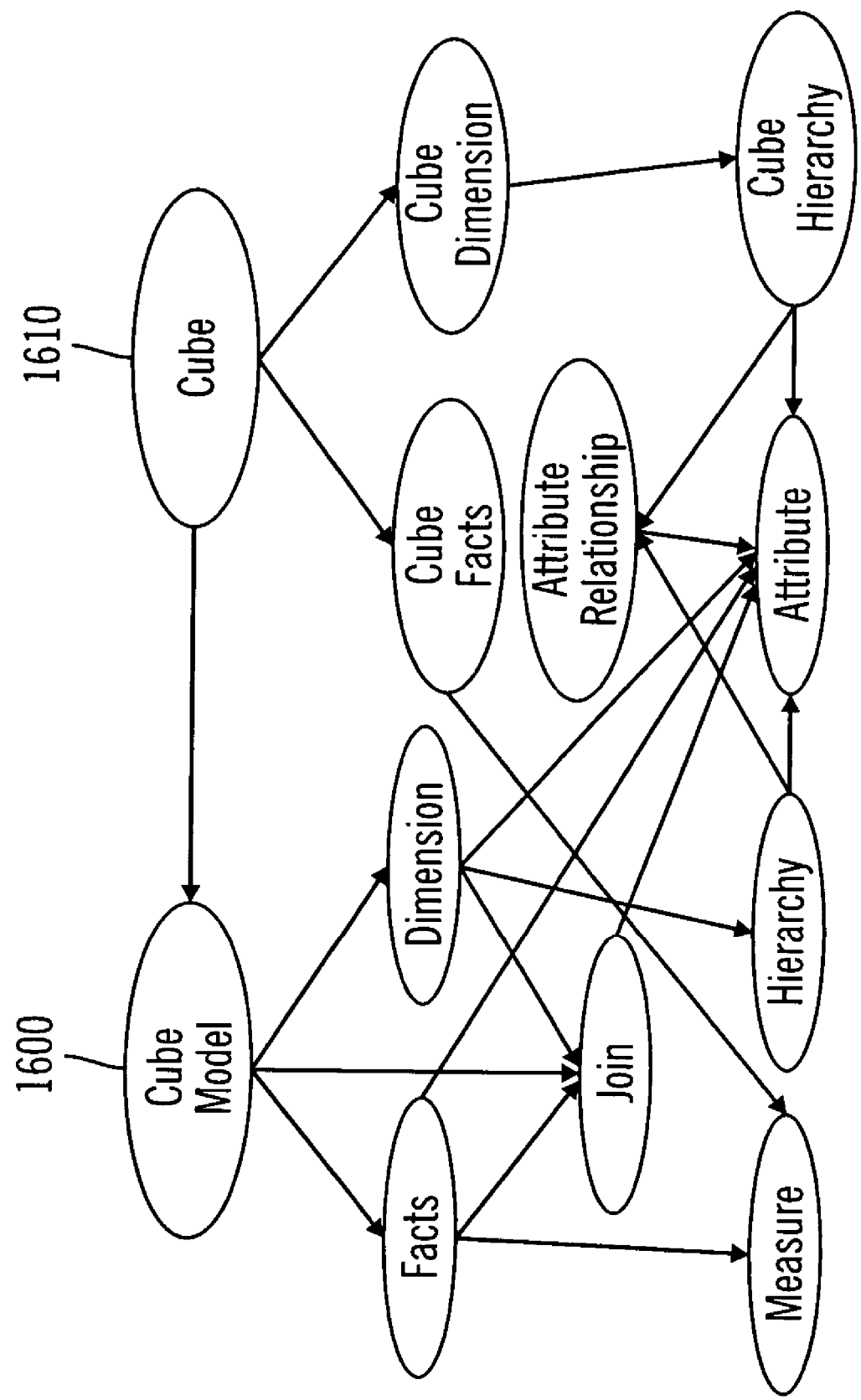
FIG. 16 illustrates some relationships among some metadata objects in accordance with certain implementations of the invention.

FIG. 16 illustrates some relationships among some metadata objects in accordance with certain implementations of the invention. The arrows indicate that a metadata object references another metadata object. For example, a cube metadata object 1610 references a cube model metadata object 1600. A more detailed relationship description of the metadata objects is illustrated in Table 16 in accordance with certain implementations of the invention.

TABLE 16

| Metadata<br>Metadata object 1 | References | Metadata<br>Metadata object 2 |
|---|---|---|
| Cube Model | zero or one | Facts |
| Cube Model | zero or more | Dimension/Join |
| Cube | one | Cube model |
| Cube | one | Cube Facts |
| Cube | one or more | Cube Dimension |
| Facts | one or more | Measure |
| Facts | zero or more | Attribute |
| Facts | zero or more | Join |
| Dimension | one or more | Attribute |
| Dimension | zero or more | Join |
| Dimension | zero or more | Hierarchy |
| Cube Facts | one | Facts |
| Cube Facts | one or more | Measure |
| Cube Dimension | one | Dimension |
| Cube Dimension | one or more | Attribute |
| Cube Dimension | one | Cube Hierarchy |
| Hierarchy | one or more | Attribute |
| Hierarchy | zero or more | Attribute Relationship |
| Cube Hierarchy | one | Hierarchy |
| Cube Hierarchy | one or more | Attribute |
| Cube Hierarchy | zero or more | Attribute Relationship |
| Measure | zero or more | Measure |
| Measure | zero or more | Attribute |
| Measure | zero or more | Dimension |
| Attribute | zero or more | Attribute |
| Attribute Relationship | two | Attribute |
| Join | multiple of two (minimum of two) | Attribute |

In accordance with certain implementation, there is a metadata object naming convention and rules for naming. Naming conventions and rules other than those described herein may be used without departing from the scope of the invention. There are two different naming conventions to name objects: ordinary and delimited. For the metadata objects, due to its flexibility, the delimited convention is used when naming objects and referring to database tables and columns. The delimited convention allows mixed case names, spaces, and special characters, such as national language characters. The complete set of characters is determined by the codepage of the database in which the objects reside.

Besides the naming conventions, some rules apply to the different identifiers in the objects in certain implementations. For example, a schema has a length of 1-30 bytes and schema names do not begin with 'SYS'; a name has a length of 1-128 bytes; a business name has a length of 1-128 bytes; comments have a length of 0-254 bytes; a table schema (used in referencing columns) has a length of 1-128 bytes; a table name (used in referencing columns) has a length of 1-128 bytes; and a column name (used in referencing columns) has a length of 1-128 bytes.

In addition to the relationships that are enforced, additional rules are described for each metadata object. That is, every metadata object has its own set of rules, and an instance of a metadata object is valid if the metadata object follows all of the metadata object rules for that metadata object. The rules are separated in three categories: Base Rules, Cube Model Completeness Rules, and Optimization Rules. The following discussion of specific rules provides a set of rules for certain implementations of the invention. In other implementations, the set of rules for one or more metadata objects may be modified without departing from the scope of the invention.

The base rules for a cube model metadata object are: (1) the cube model metadata object refers to zero or one facts metadata object; (2) the cube model metadata object refers to zero or more dimension(s); (3) dimension-join pairs have both a dimension and a join; (4) a join associated with a dimension is valid if all attributes of one side of a join are found in the attribute list of the facts metadata object and all other side attributes are found in the attribute list of the dimension metadata object; and (5) for each measure referenced in the facts of the cube model, all the explicit dimension references in the aggregations of the measure are referenced by the cube model. When the cube model references at least one dimension, an aggregation with an empty dimension set matches to at least one dimension from the cube model that was not previously referenced.

The base rules for a cube metadata object are: (1) the cube metadata object refers to one cube facts; (2) the cube metadata object refers to at least one cube dimension; (3) cube facts is derived from the facts used in the cube model; and, (4) cube dimensions are derived from the dimensions used in the cube model.

The base rules for a facts metadata object are: (1) a facts metadata object refers to at least one measure; (2) all attributes and measures referenced by a facts are joinable; (3) in a facts metadata object context, a single join can be defined between two given tables; (4) there are no join loops in a facts metadata object; and, (5) all joins referenced by a facts metadata object refer to fact metadata object attributes.

The base rules for a dimension metadata object are: (1) the dimension metadata object refers to at least one attribute; (2) attributes referenced by a dimension are joinable; (3) there are no join loops; (4) in a dimension context, a single join is defined between any two given tables; (5) hierarchies referenced by a dimension refer to the attributes of the dimension; (6) attribute relationships that are referenced by hierarchies of a dimension refer to the attributes of the dimension; and (7) joins referenced by a dimension refer to the attributes of the dimension.

The base rules for a cube facts metadata object are: (1) the cube facts metadata object refers to at least one facts; (2) the cube facts metadata object refers to at least one measure; and, (3) measures referenced by a cube facts metadata object are part of the facts metadata object.

The base rules for a cube dimension metadata object are as follows: (1) the cube dimension metadata object refers to one dimension; (2) the cube dimension metadata object refers to a cube hierarchy; and, (3) the cube hierarchy referenced by the cube dimension metadata object is derived from a hierarchy that is referenced by the dimension of the cube dimension metadata object.

The base rules for a hierarchy metadata object are: (1) the hierarchy metadata object refers to at least one attribute; (2) two attributes are required for a recursive deployment; (3) every attribute relationship within a hierarchy has a left attribute as part of the hierarchy; (4) every attribute relationship within the hierarchy has a cardinality of 1:1 or N:1: and, (5) certain combinations of hierarchy types and hierarchy deployments are allowed as indicated in Table 17 in accordance with certain implementations of the invention.

TABLE 17

| Type/Deployment | Standard | Recursive |
| --- | --- | --- |
| Balanced | X | |
| Ragged | X | |
| Unbalanced | X | X |
| Network | X | |

The base rules for a cube hierarchy metadata object are: (1) the cube hierarchy metadata object refers to one hierarchy; (2) the cube hierarchy metadata object refers to at least one attribute; (3) attributes referenced by the cube hierarchy metadata object are part of the hierarchy; (4) the order of the attributes in the cube hierarchy metadata object are the same as in the hierarchy (with the exception of hierarchies defined as a network); (5) every attribute relationship within a hierarchy has a left attribute as part of the hierarchy; and, (6) attribute relationships referenced in the cube hierarchy metadata object are also referenced in the hierarchy that defines the cube hierarchy.

The base rules for a measure metadata object are: (1) a measure metadata object can have, as parameters for each SQL expression template, attributes, columns, measures, or none of them; (2) attributes and measures, used as SQL template parameters, can not generate a dependency loop among attributes and/or measures; (3) every SQL template defined in the measure metadata object is not an empty string; (4) the SQL template does not use aggregation functions; (5) aggregation is not required if at least one measure and only measures are referenced; (6) the number of SQL templates matches the number of parameters of the first aggregation function, if an aggregation is present; (7) a measure metadata object with multiple SQL templates defines at least one aggregation step in an aggregation script; (8) if measure metadata object A refers to measure metadata object B, which defines multiple SQL templates, then measure metadata object A does not have an aggregation script; this rule applies for all levels in a measure reference tree; (9) a multi-parameter aggregation function is used as the first aggregation; (10) if a measure metadata object defines one or more aggregations, one aggregation may have an empty dimension set; (11) within a measure metadata object, a dimension may not be referenced more than once either within an aggregation or across aggregations; (12) within a SQL expression template, token indicators (i.e., {$$#}) begin numbering with 1 and are consecutive with no numbering gaps; and, (13) within a SQL expression, every column, attribute and measure is referenced at least once.

The base rules for an attribute metadata object are: (1) an attribute metadata object can have, as parameters for the SQL template, attributes, columns, or none of them; (2) the attributes, used as parameters for SQL template, can not generate a dependency loop among attributes; (3) the SQL template can not be an empty string or blank string; (4) no aggregation function is allowed to be part of the SQL template; (5) within a SQL expression template, token indicators (i.e., {$$#}) begin numbering with 1 and are consecutive with no numbering gaps; and, (6) within a SQL expression, every column, attribute and measure is referenced at least once.

The base rules for an attribute relationship metadata object are: (1) the attribute relationship metadata object refers to two attributes; and, (2) the attribute relationship metadata object cannot be defined as having a cardinality=N:N and a functional dependency=YES.

The base rules for the join metadata object are: (1) the join metadata object refers to at least one triplet of left attribute, right attribute, and operator; (2) all left attributes in the join metadata object resolve into one or more columns of a single table; (3) all right attributes in the join metadata object resolve into one or more columns of a single table; and, (4) each triplet of the join metadata object defines a valid operation; the datatypes of left and right attributes, as well as the operation defined for them, are compatible.

The cube model completeness rules extend the base rules in order to ensure that a cube model has the required links to other metadata objects to allow effective warehouse SQL queries to be formed. The cube model completeness rules for a cube model metadata object are: (1) a cube model metadata object refers to one facts; (2) a cube model metadata object refers to one or more dimensions.

The optimization rules extend the cube model completeness rules in order to ensure that optimization of warehouse SQL queries can be performed.

The optimization rules for a cube model metadata object is: (1) the join used in the facts to dimension has a cardinality of 1:1 or N:1 and joins a facts table to a primary table of a dimension.

The optimization rules for a dimension metadata object is: (1) considering the join network formed by the joins of the dimension, there is at least one table, primary table, in which all joins radiating from this table have cardinality of N: 1 or 1:1.

The optimization rules for a join metadata object are: (1) there is a constraint defined on the columns that participate in the join; if the join is a self-join, i.e. the same set of columns is used in both sides of the equality, a primary key is defined matching the set of columns; in all other cases, when the set of columns of one side are different from the other side of the join, a primary key matches the columns of one side of the join, and a foreign key matches the other set of columns as well as references the primary key; (2) the join cardinality is 1:1, N:1 or 1:N; if the join is a self-join, the cardinality is 1:1; in all other join cases, the cardinality is 1 on the side in which a primary key is defined and N on the side in which a foreign key is defined; if the foreign key side has also a primary key defined on it, a 1 is used as cardinality; (3) all attributes used in the join resolve to non-nullable SQL expressions; and, (4) the join type is INNER JOIN.

A.4 Metadata Object Example

Figure 17:
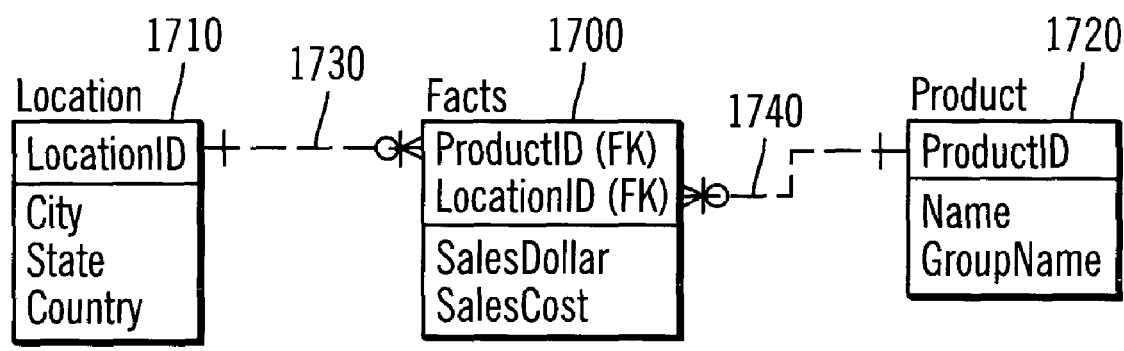
FIG. 17 illustrates a star schema composed of two dimension tables and a fact table in accordance with certain implementations of the invention.

FIG. 17 illustrates a star schema composed of two dimension tables 1710, 1720 and a fact table 1700 in accordance with certain implementations of the invention. Two lines 1730, 1740 represent joins between the fact table 1700 and the dimension tables 1710, 1720. In certain implementations, a database designer, using a modeling tool or user interface 150, may create metadata object instances for metadata objects 130. Most metadata objects 130 defined during the generation of the multidimensional metadata can be reused for a new model if the metadata objects overlap with the new model. FIGS. 18A-18E illustrate a possible set of metadata object instances, and, for simplicity, some properties of metadata objects, that may be generated for the star schema of FIG. 17 in accordance with certain implementations of the invention. In particular, some of the omitted properties in FIGS. 18A-18E are common properties. For example, FIGS. 18A-18E illustrate a cube model metadata object instance 1800, a cube metadata object instance 1802, a facts metadata object instance 1804, a cube facts metadata object instance 1806, measure metadata object instances 1808, 1810, dimension metadata object instances 1812, 1814, cube dimension metadata object instances 1816, 1818, hierarchy metadata object instances 1820, 1822, 1824, cube hierarchy metadata object instances 1826, 1828, join metadata object instances 1830, 1832, and attribute metadata object instances 1834-1848.

A user may use the user interface 150 to create metadata objects. After creating an empty cube model metadata object, a facts metadata object and dimension metadata objects are created and joined to the cube model metadata object by creating appropriate join metadata objects.

The properties of the metadata objects discussed herein may be modified without departing from the scope of the invention.

B. Specifying Multidimensional Calculations for a Relational On-line Analytical Processing (ROLAP) Engine The OLAP multidimensional metadata system 100 enables creation of a measure metadata object to assist with multidimensional calculations. In certain implementations, the measure metadata object includes the specific properties defined in Table 8.

Measures in a measure metadata object are defined by the aggregation of SQL expressions. In particular, table columns, attributes and measures are mapped to a SQL expression template to build SQL expressions. The resulting SQL expressions are then used as input for the first aggregation function of the measure metadata object. If a measure metadata object has more than one aggregation, the aggregation functions are performed in the order they are listed, with each subsequent aggregation taking the result of the previous aggregation as its input. If the SQL expression of the measure metadata object only references other measures, the aggregation function is omitted because the referenced measures describe any required aggregations.

The SQL expressions used in the calculation of a measure are created by the combination of two properties: a list of SQL expression templates and a list of columns, attributes, and measures. The SQL expression templates use a token notation where {$$n} is the token and n references a specific column, attribute, or measure from the list. The list of columns, attributes, and measures is ordered, and the position in the list of a column, attribute or measure corresponds to the token "n" value. For most aggregation functions the number of SQL expression templates in the list is one, because most aggregation functions accept a single expression as input. However, when an aggregation function such as CORRELATION is used, the number of SQL expression templates match the number of input parameters accepted by the aggregation function.

Again, SQL expressions are used as input to the first aggregation. Each aggregation specifies a function that is applied to a corresponding dimension set. The aggregation function can be any aggregation function supported by the underlying RDBMS 110, including, for example, SUM, COUNT, MIN, MAX, and CORRELATION. In certain implementations, each dimension is aggregated once by the measure metadata object. If the dimension set is empty, the aggregation function is applied to all dimensions in the cube or cube model that are not specifically being used by any other aggregations in the list.

The multidimensional metadata software 120 automatically generates a SQL statement for generation of a cube view using the metadata in the measure metadata object.

B.1 Requirements for Measures

This section describes some requirements for measures in accordance with certain implementations of the invention.

One requirement for measures is support for a specific calculation order within a measure. The calculation order for the set of measure metadata objects referenced by a cube model metadata object or a cube metadata object need not be the same—each measure metadata object may specify a calculation order different than the calculation order of any other measure metadata object. For example, a Quantity Sold=SUM(Revenue/UnitPrice) and Profit Margin=SUM (Profit)/SUM(Revenue). FIG. 19 illustrates Table A 1900, which shows base data in accordance with certain implementations of the invention. A member named "Clothes" is a parent for Trousers 1902, Shirt 1904, and Tie 1906, and the Quantity Sold for Clothes is determined using Unit Price 1910 and Revenue 1912: (680/40)+(780/60)+(175/25)=17+ 13+7=37. The Profit Margin for Clothes is determined using Revenue 1912 and Profit 1914: (68+117+52.5)/(680+780+ 175)=237.5/1635=0.145.

Another requirement for measures is support for aggregation functions with multiple input parameters, such as a correlation operation (e.g., CORRELATION(Revenue, Profit)). The measure object needs to define independent expressions for each aggregation function input.

Yet another requirement for measures is support for semi-additive measures, such as snapshot measures (e.g., Inventory). For example, for Market and Product dimensions, a sum operation is performed (e.g., SUM(Inventory)). For the Time dimension, a MIN operation is performed (e.g., MIN (Inventory)).

Figure 20:
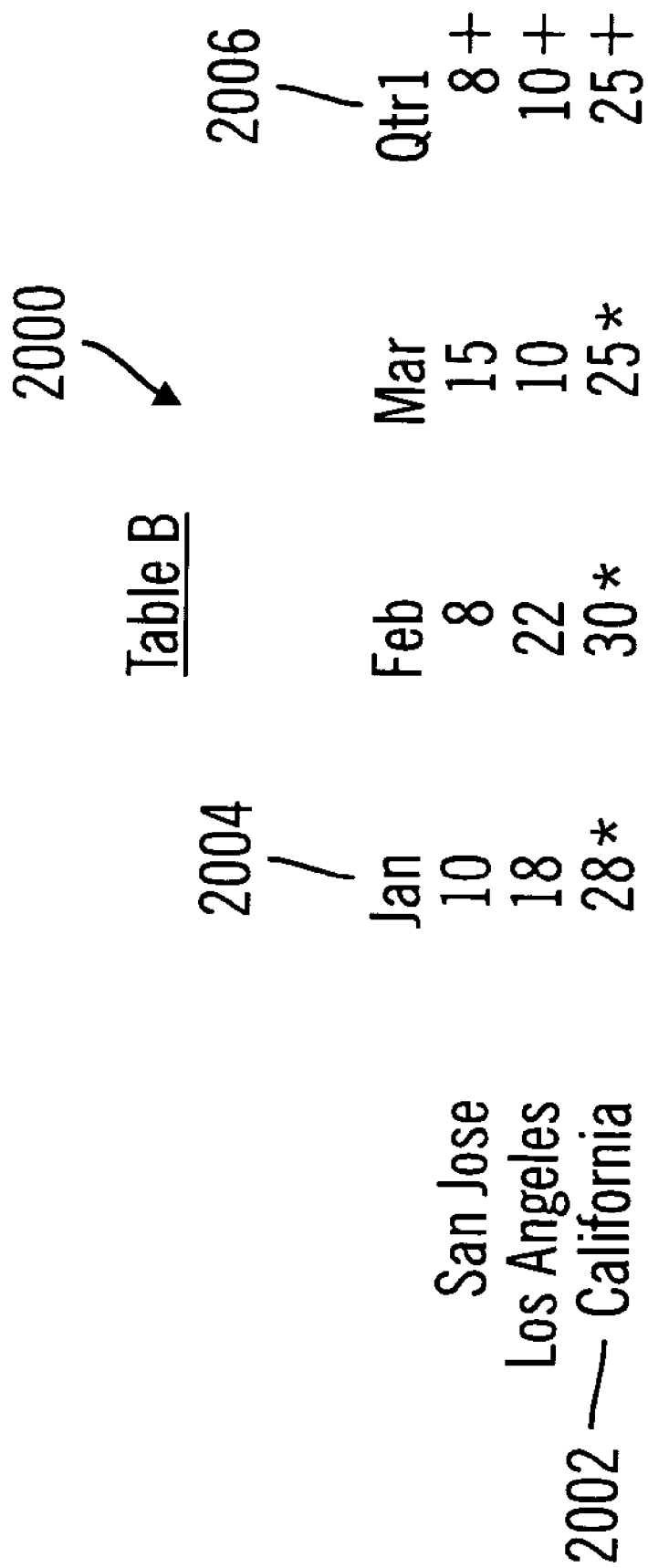
FIG. 20 illustrates Table B, which shows a measure that has the aggregations: SUM(Market) and MIN(Time) in accordance with certain implementations of the invention.

FIG. 20 illustrates Table B 2000, which shows a measure that has the aggregations: (SUM, Market) and (MIN, Time) in accordance with certain implementations of the invention. In Table B 2000, numbers without asterisks (e.g., *) or plus signs (e.g., +) represent base data. The numbers with asterisks represent the aggregation for (SUM, Market). The numbers with plus signs represent the aggregation for (MIN, Time). For example, (SUM, Market) for California 2002 for January 2004 is 28, and (MIN, Time) for California 2002 for the quarter1 2006 is 25.

Additional requirements for measures are support for one aggregation function per dimension, support for different calculation order across dimensions, and targeting to sophisticated applications (e.g., find the market locations that have the biggest average inventories, with (SUM, Product), (AVG, Time), (MAX, Market)). Targeting to sophisticated applications is a more generic representation of semi-additive measures, which are described further below with reference to FIG. 23. Also, the requirement of targeting to sophisticated applications is represented by asymmetric measures, which are described further below. An asymmetric measure defines multiple aggregation in the aggregation list.

FIGS. 21A-21D illustrate Table C 2100, which shows a measure that has the aggregations: (SUM, Product) (i.e., sum of product), (AVG, Time) (i.e., average over time), and (MAX, Market) (i.e., maximum for market), in accordance with certain implementations of the invention. In table C 2100, the numbers without asterisks (e.g., *) or plus signs (e.g., +) or dashes (e.g., −) represent base data. That is, the base data is illustrated in FIG. 21A. In FIG. 21B, in Table C 2100, the numbers for the aggregation for (SUM, Product) have been added and are identified by asterisks. For example, for Clothes 2102 in Los Angeles 2104 for January 2105, the (SUM, Product) is 66. In FIG. 21C, in Table C 2100, the numbers for the aggregation for (AVG, Time) have been added and are identified by plus-sign. For example, for Trousers 2106, for San Jose 2108 for the first quarter (QTR1) 2109, (AVG, Time) is 11. In FIG. 21D, the numbers for the aggregation for (MAX, Market) have been added and are identified by dashes (e.g., −). For example, for Shirt 2110, for California 2112, for January 2105, the (MAX, Market) is 36.

B.2 Describing Measures

In certain implementations of the invention, a measure metadata object may be created that includes a list of expressions and a list of aggregations. The measure metadata object was discussed in detail in Section A. For ease of understanding, the measure metadata object will also be discussed in this section. The list of expressions in the measure metadata object includes a SQL expression template for each expression and a list of columns, attributes and measures for each SQL expression template. Each entry in the list of aggregations includes an aggregation function and a corresponding dimension set. An empty dimension set means all remaining dimensions are to be used for the aggregation function. In certain implementations, for the measure metadata object, only one aggregation can have an empty dimension set.

Figure 22:
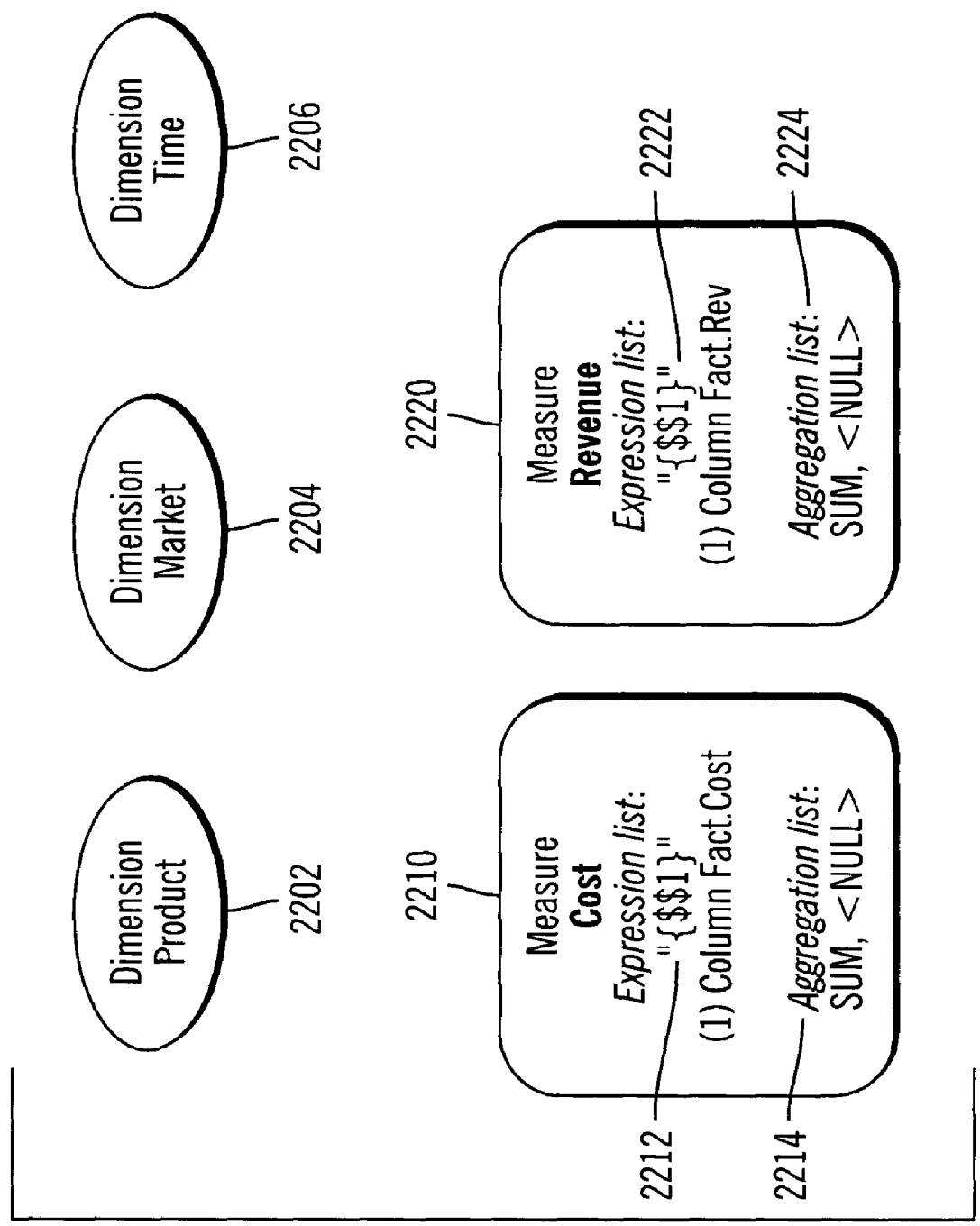
FIG. 22 illustrates creation of two fully additive measure metadata objects in accordance with certain implementations of the invention.

FIG. 22 illustrates creation of two fully additive measure metadata objects (Cost 2210 and Revenue 2220) in accordance with certain implementations of the invention. In the example of FIG. 22, there are three dimensions, Product 2202, Market 2204, and Time 2206. Each measure metadata object 2210, 2220 specifies a <NULL> dimension set, which means that all dimensions are used for the aggregation function of SLM.

The Cost measure metadata object 2210 is created for a cube model with the three dimensions: Product 2202, Market 2204, and Time 2206. The Cost measure metadata object 2210 has a SQL expression template 2212 (template "{$$1}"), which represents a simple mapping to the column specified in the single-item list of columns, attributes, and measures (list="Column Fact.Cost"). That is, for the Cost measure metadata object 2110, the expression list refers to "{$$1}", which is a token that is replaced with the column Fact.Cost when a SQL expression is generated. The aggregation list 2214 is (SUM, <NULL>) where SUM is the aggregation function, and <NULL> is an empty dimension set. The SQL expression from the SQL expression template 2212 is used as input for the SUM aggregation function, resulting in the SQL: SUM(Fact.Cost).

The Revenue measure metadata object 2220 is created for a cube model with three dimensions: Product 2202, Market 2204, and Time 2206. The Revenue measure metadata object 2220 has a SQL expression template 2222 (template="{$$1}"), which represents a simple mapping to the column specified in the single-item list of columns, attributes, and measures, where list="Column Fact.Rev". That is, for the Revenue measure metadata object 2220, the expression list refers to "{$$1}", which is a token that is replaced with the column Fact.Rev when a SQL expression is generated. The aggregation list 2224 is (SUM, <NULL>) where SUM is the aggregation function, and <NULL> is an empty dimension set. The SQL expression from the SQL expression template 2222 is used as input for the SUM aggregation function, resulting in the SQL: SUM(Fact.Rev).

Figure 23:
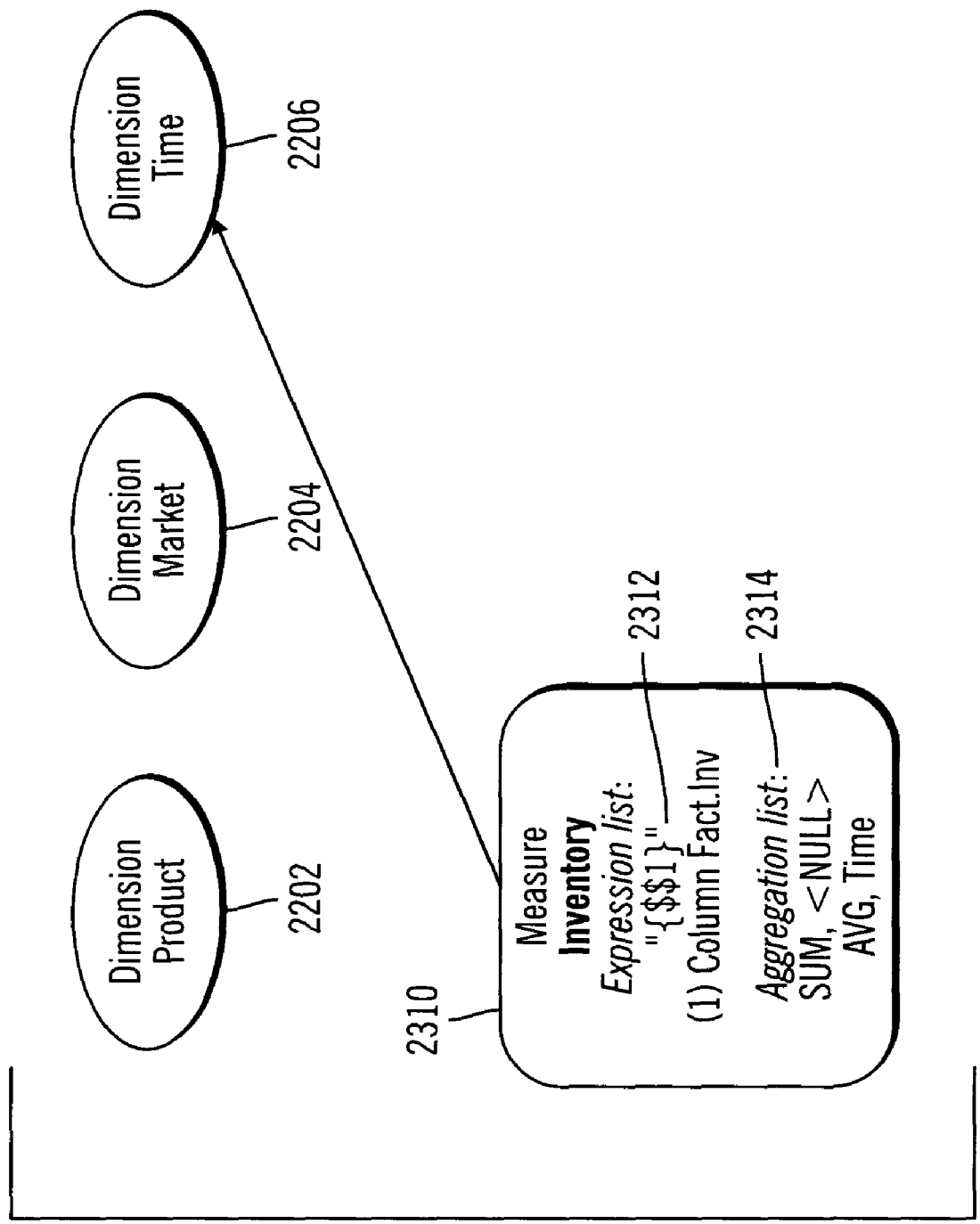
FIG. 23 illustrates creation of a semi-additive measure in accordance with certain implementations of the invention.

FIG. 23 illustrates creation of a semi-additive measure in accordance with certain implementations of the invention. The Inventory measure metadata object 2310 has a SQL expression template 2312 (template=" {$$1}"), which represents a simple mapping to the column specified in the single-item list of columns, attributes, and measures, where list="Column Fact.Inv". In the Inventory measure metadata object 2310, the aggregations list 2314 includes two aggregations SUM and AVG (i.e., average). The Inventory measure metadata object 2310 aggregates the Time dimension last, and so, the aggregation list specifies <NULL> for SUM, which means all dimensions not referenced in the list (i.e., all dimensions other than time, which would be product and market for this example), and AVG for Time. The SUM operation is performed first, and the results of the sum operation are used to perform the AVG operation. The resulting SQL expression involves multiple aggregation steps. For ease of understanding a simple example of the resulting SQL expression is provided. For example, the resulting SQL expression may be: AVG(S1), where S1 is the result of SUM(Fact.Inv).

Figure 24:
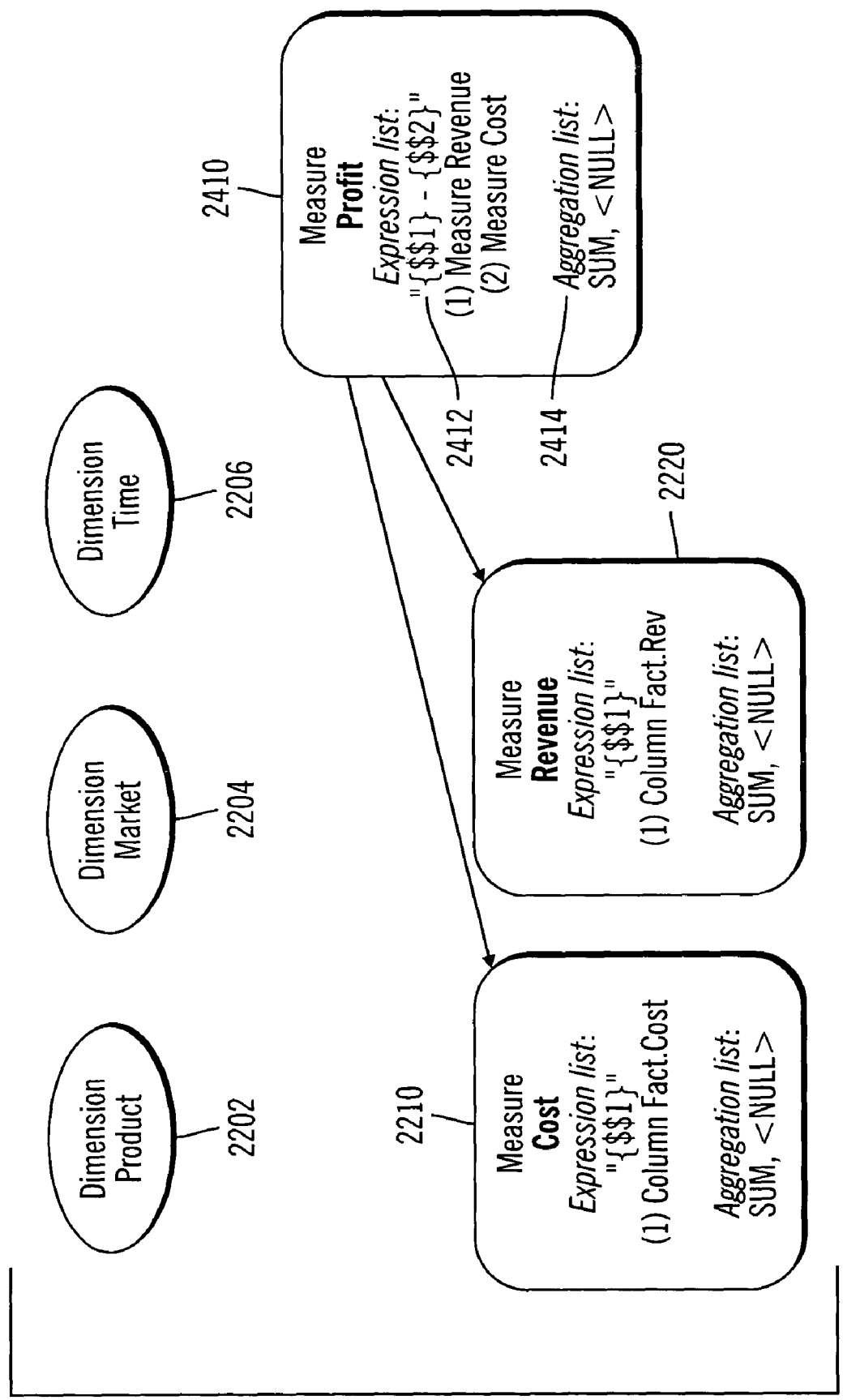
FIG. 24 illustrates creation of a composite measure with aggregation in accordance with certain implementations of the invention.

FIG. 24 illustrates creation of a composite measure with aggregation in accordance with certain implementations of the invention. In this case, the Profit measure metadata object 2410 uses predefined measures and determines the aggregation to be performed. A more complicated measure such as, Profit, might have a SQL expression template 2412 (template "{$$1}-{$$2}"), where the list of columns, attributes, and measures is list "Measure Revenue, Column Fact.Cost". That is, the expression list includes "{$$1}-{$$2}", which indicates that the first token {$$1} is replaced with the result of the aggregation from the Revenue measure metadata object 2220, and the second token {$$2} is replaced with the result of the aggregation from the Cost measure metadata object 2210. Replacing the tokens with the correct references, the SQL expression becomes: "Revenue-Fact.Cost". Expanding the revenue measure reference to its column reference, the SQL expression becomes: "Fact.Rev-Fact.Cost".

The aggregation list 2414 of the Profit measure metadata object 2410 is: (SUM, <NULL>). In the aggregation list 2410, a <NULL> dimension set is specified to represent all dimensions for the SUM operation. Using the profit SQL expression as input for the SUM aggregation function, the SQL expression of the Profit measure is: SUM(Fact.Rev-Fact.Cost). That is, profit is obtained by the sum of all subtractions of cost from revenue.

Figure 25:
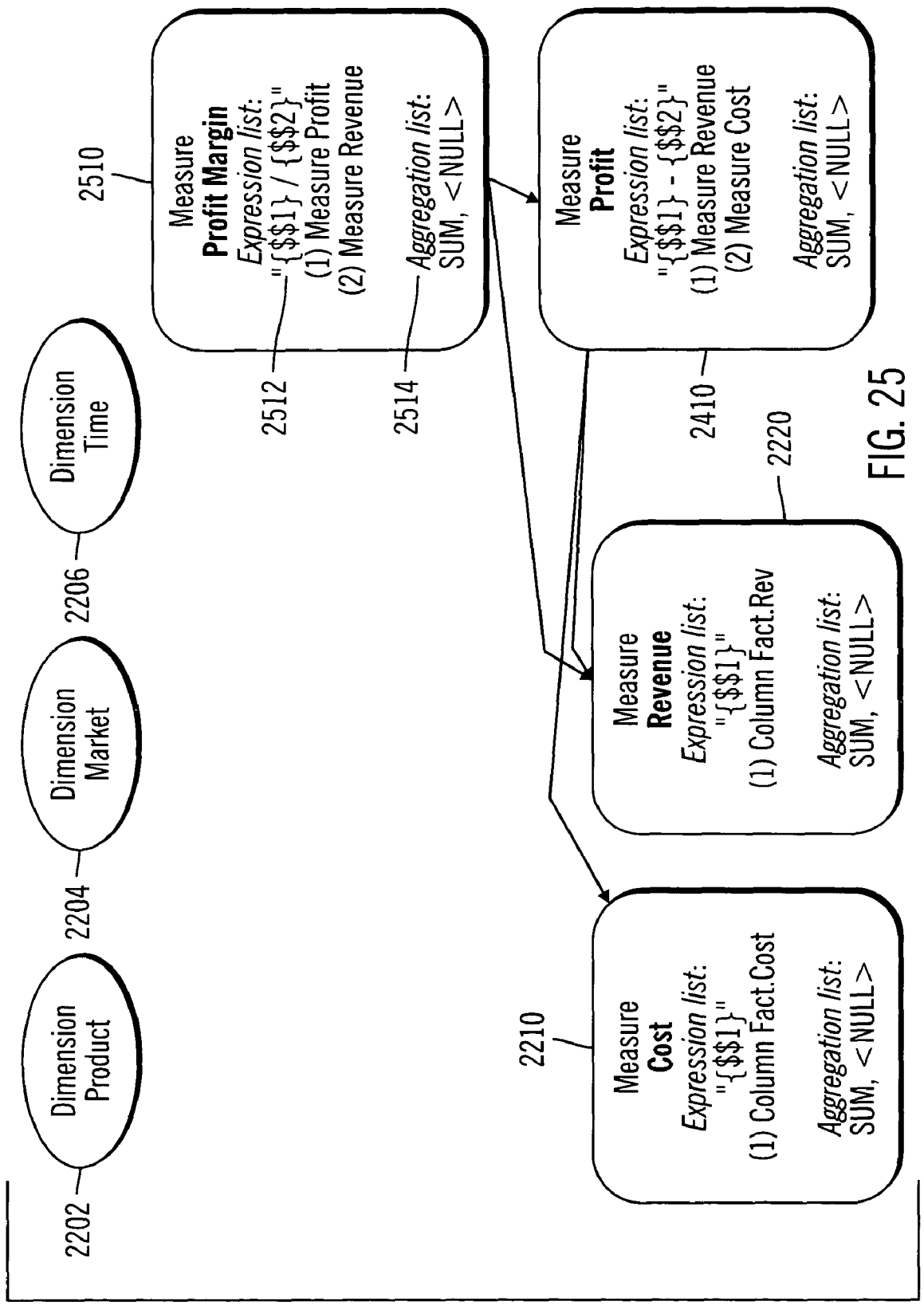
FIG. 25 illustrates creation of a composite measure without aggregation in accordance with certain implementations of the invention.

FIG. 25 illustrates creation of a composite measure without aggregation in accordance with certain implementations of the invention. In this case, the Profit Margin measure metadata object 2510 uses predefined measure metadata objects (i.e., the Revenue measure metadata object 2220 and the Profit measure metadata object 2410) and does not require any aggregation to be performed (which is indicated by a <NULL> in place of an aggregation in the aggregation list 2414). In this case, the aggregation comes from the base measures.

The Profit Margin measure metadata object has a SQL expression template 2512 (template "{$$1}/{$$2}"). The first token {$$1} is replaced by the result of the aggregation from the Profit measure metadata object 2410, while the second token {$$2} is replaced by the result of the aggregation from the Revenue measure metadata object 2220. Thus, the resulting SQL expression for the Profit Margin measure is SUM(Fact.Rev-Fact.Cost)/SUM(Fact.Rev). That is, a sum for profit is calculated, a sum for revenue is calculated, and profit is divided by revenue to obtain profit margin.

Figure 26:
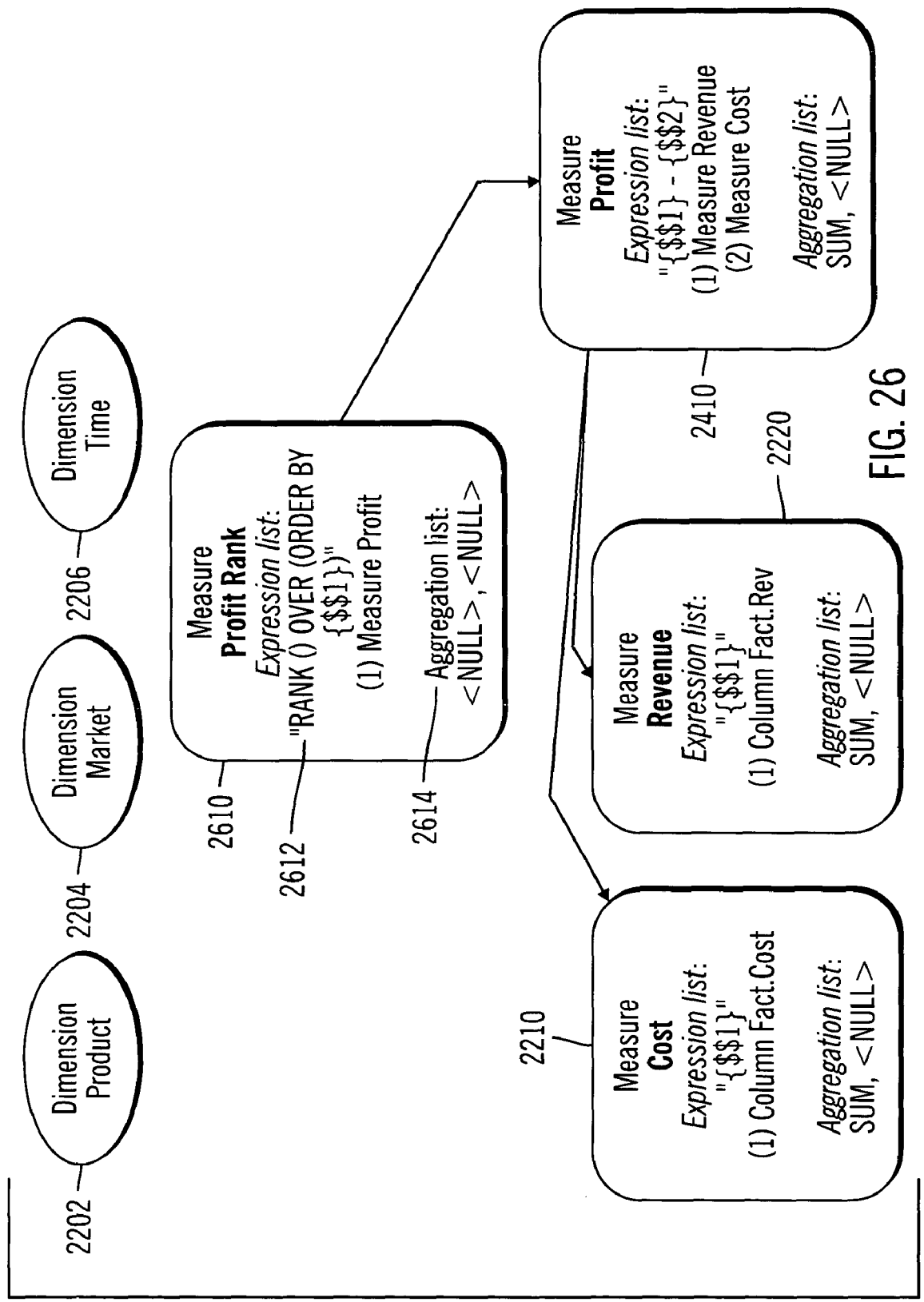
FIG. 26 illustrates creation of a measure with an OLAP function in accordance with certain implementations of the invention.

FIG. 26 illustrates creation of a measure with an OLAP function in accordance with certain implementations of the invention. The Profit Rank measure metadata object 2610 utilizes a RANK function (e.g., available from a DB2® UDB RDBMS) to rank the profit measure. The new Profit Rank measure metadata object 2610 does not require any aggregation. In particular, the Profit Rank measure metadata object 2610 has a SQL expression template (template="RANK( ) OVER (ORDER BY{$$1})"), which indicates that the first token {$$1} is replaced with the result of the aggregation from the Profit measure metadata object 2410. The aggregation list 2614 indicates that there is no aggregation with a <NULL> in place of an aggregation function. The resulting SQL expression for the RANK measure is RANK( ) OVER (ORDER BY SUM(Fact.Rev-Fact.Cost)).

Figure 27:
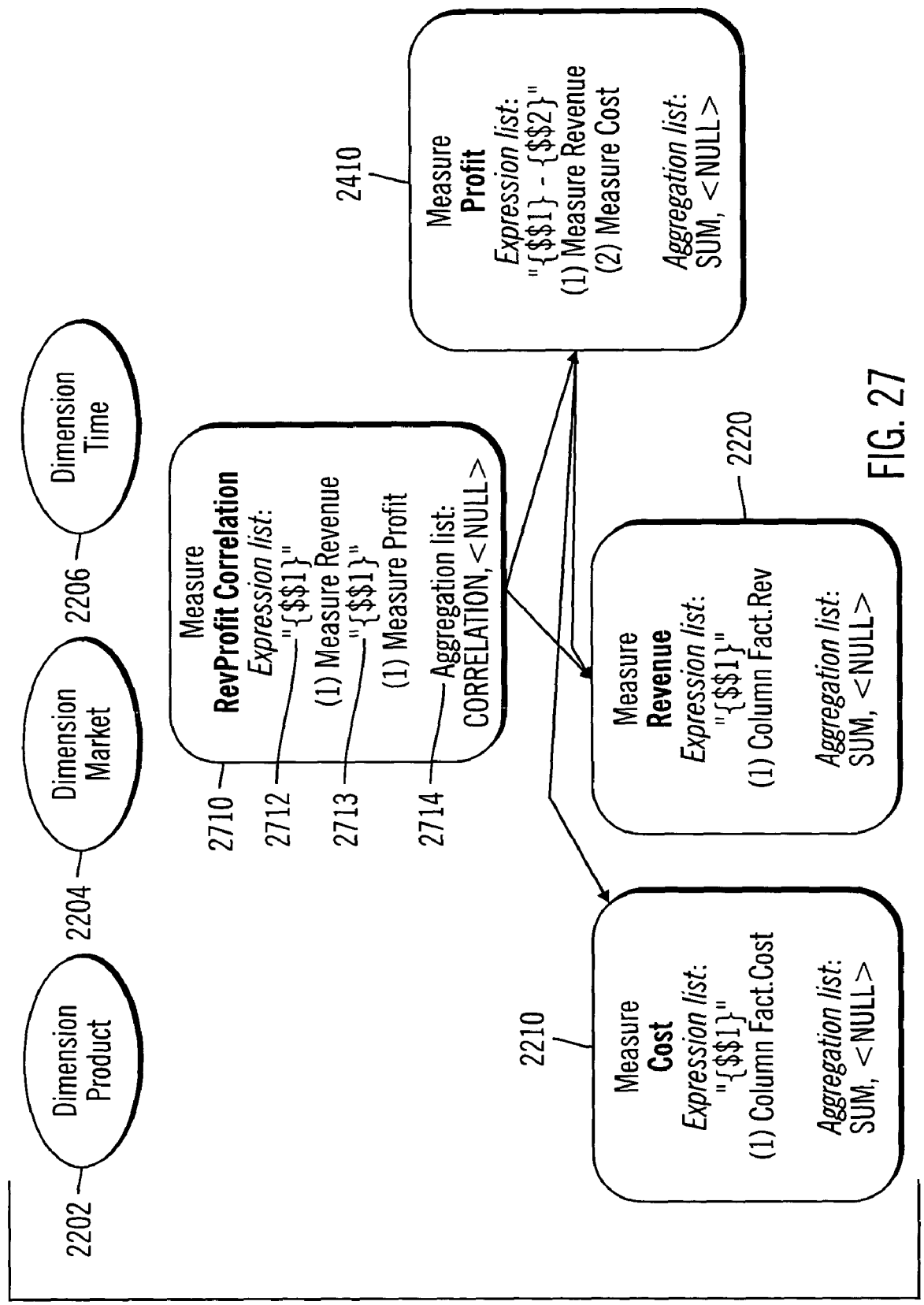
FIG. 27 illustrates a measure with an aggregation and multiple inputs in accordance with certain implementations of the invention.

FIG. 27 illustrates a measure with an aggregation and multiple inputs in accordance with certain implementations of the invention. The RevProfit Correlation measure metadata object 2710 utilizes the Revenue and Profit measure metadata objects 2220, 2410. For the RevProfit Correlation measure metadata object has two SQL expression templates 2712, 2713, each with a first token represented by {$$1}. For the SQL expression template 2712 (template="{$$1}"), the first token {$$1} is replaced with the result of the aggregation from the Revenue measure metadata object 2220. For the SQL expression template 2713 (template="{$$1}"), the first token {$$1} is replaced with the result of the aggregation from the Profit measure metadata object 2410. Then, a correlation is performed. A correlation is a statistical function that gives a measurement of how well two series of numbers relate to each other. The resulting SQL expression for the Correlation measure is CORRELATION(Fact.Rev, (Fact.Rev-Fact.Cost)). The aggregation list 2714 specifies a CORRELATION operation and a <NULL> dimension set to represent all dimensions.

Figure 28:
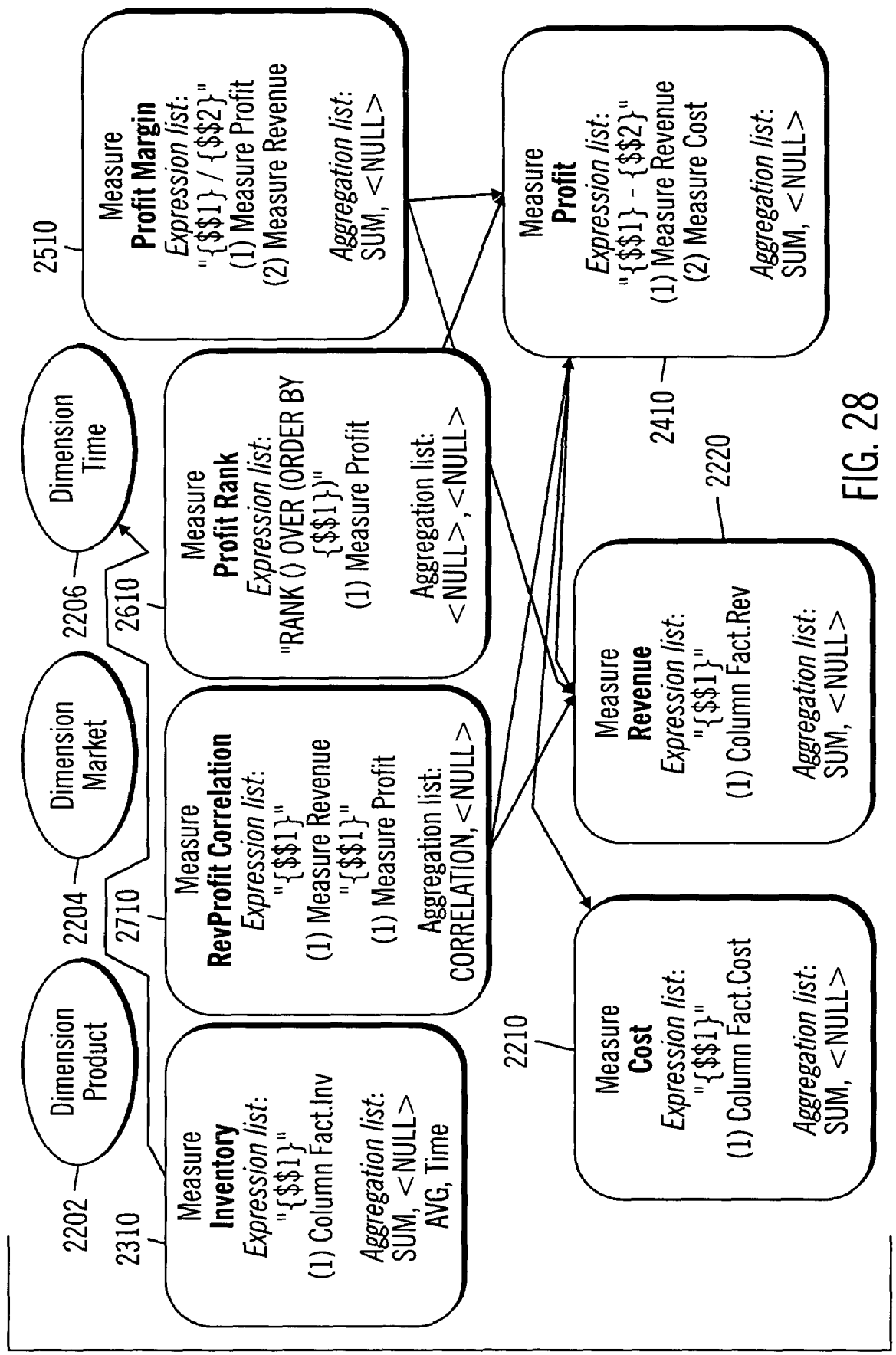
FIG. 28 illustrates all defined measure metadata objects from FIGS. 22-27 in accordance with some implementations of the invention.

FIG. 28 illustrates all defined measure metadata objects from FIGS. 22-27 in accordance with some implementations of the invention. Some measure metadata objects build on others. For example, the RevProfit Correlation measure metadata object 2710 builds on the Revenue measure metadata object 2220 and the Profit measure metadata object 2410, while the Profit measure metadata object 2410 builds on the Cost and Revenue measure metadata objects 2210, 2220.

Figure 29A:
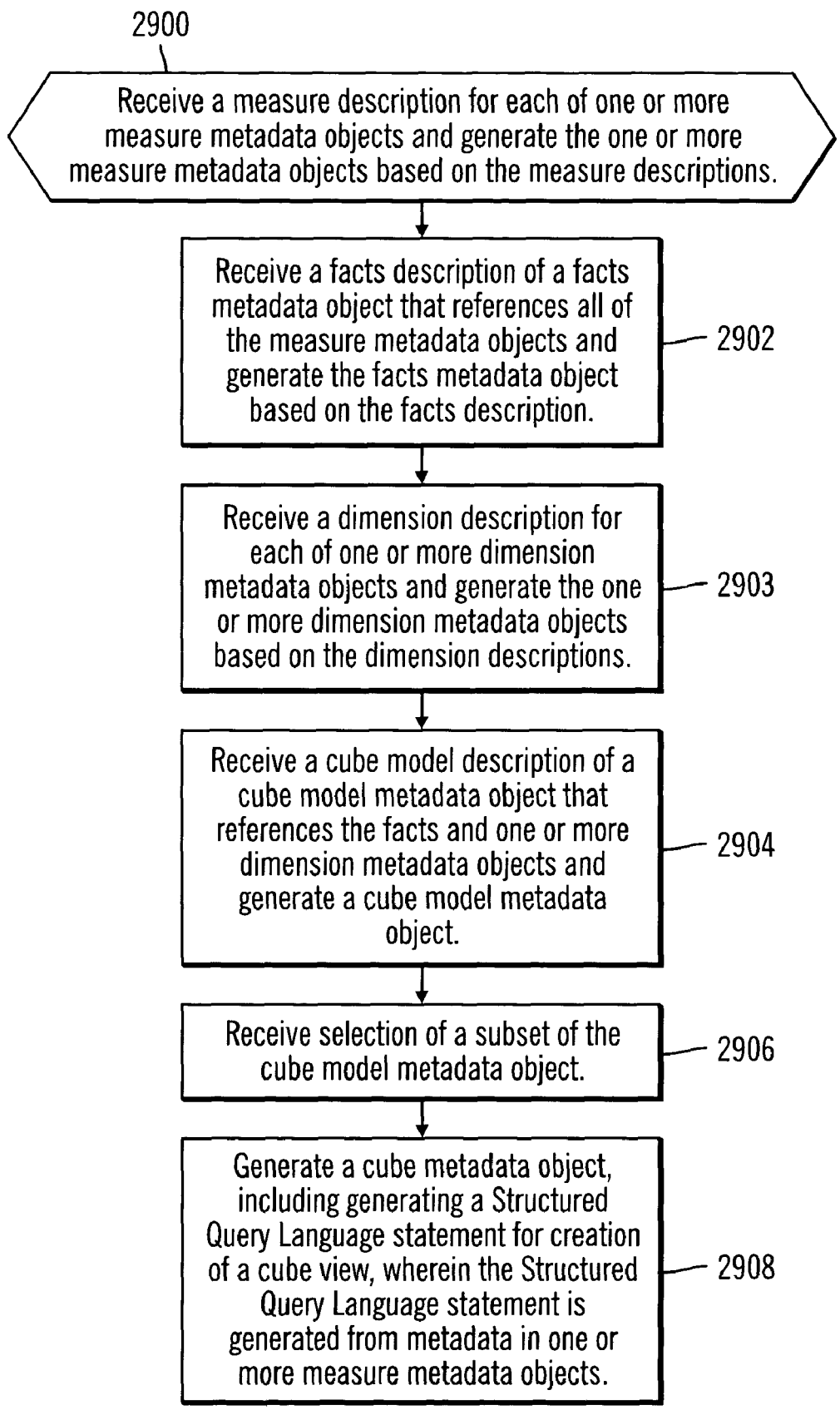
FIGS. 29A, 29B, 29C, 29D, and 29E illustrate logic for generating a SQL statement for one or more measure metadata objects in accordance with certain implementations of the invention.

B.3 Generating a SQL Statement for Measures Represented by One or More Measure Metadata Objects The multidimensional metadata software 120 generates a single SQL statement that calculates a set of measures represented by measure metadata objects. FIG. 29A illustrates logic for generating a SQL statement from one or more measure metadata objects in accordance with certain implementations of the invention. Control begins in block 2900 with receipt of a measure description for each of one or more measure metadata objects and generation of the one or more measure metadata objects, such as one or more of the measure metadata objects illustrated in FIGS. 22-28, based on the measure descriptions. In block 2902, a facts description of a facts metadata object is received that references all of the measure metadata objects, and a fact metadata object is generated from the facts description. Additionally, the facts description references attribute metadata objects and join metadata objects. In block 2903, a dimension description for each of one or more dimension metadata objects is received, and the one or more dimension metadata objects are generated from the dimension descriptions. The dimension description references one or more attribute metadata objects, zero or more join metadata objects, and one or more hierarchy metadata objects. Each hierarchy metadata object includes information used to build a ROLLUP clause. In particular, a cube model metadata object may reference several possible hierarchies, but selection of a single hierarchy is required for SQL generation, in certain implementations of the invention. In block 2904, a cube model description of a cube model metadata object that references the facts and one or more dimension metadata objects is received, and the cube model metadata object is generated from the cube model description. In block 2906, a selection of a subset of the cube model metadata object is received. In block 2908, a cube metadata object is generated based on the selection. Additionally, a SQL statement is generated for creating a cube view from metadata in one or more measure metadata objects. The generation of the SQL statement may also use other metadata in other metadata objects (e.g., a hierarchy metadata object).

In particular, the generation of the SQL statement may generate one or more ROLLUP operators from metadata in the hierarchy metadata object. A ROLLUP operator, an extension of a GROUP BY clause, generates multiple subtotal grouping clauses, based on a list of columns. The grouping clauses are generated using information from the hierarchy metadata object. This has the same effect, in OLAP terms, of a hierarchy calculation in a given dimension. Consider a dimension such as location, which has a hierarchy composed of country, state, and city. The ROLLUP (country, state, city) clause generates the grouping clauses that represent the calculation of the hierarchy. The general specification of a ROLLUP of n elements $(c_1, c_2, \ldots, c_{n-1}, c_{n-1}, c_n)$ is equivalent to the following grouping clauses:

$(c_1, c_2, \ldots, c_{n-1}, c_n)$
$(c_1, c_2, \ldots, c_{n-1})$
. . .
$(c_1, c_2)$
$(c_1)$ Note that n elements in a ROLLUP clause translate to (n+1) grouping clauses. An OLAP application may have multiple dimensions (e.g., defined in dimension metadata objects). A ROLLUP for each dimension returns results that represent an OLAP cube, in a relational way. The combination of more than one ROLLUP operator in a single statement results in the Cartesian product of the grouping clauses generated for each ROLLUP. For example, combining the following pair of ROLLUP operators in a single statement ROLLUP (country, state), ROLLUP (year, month) results in the generation of the following grouping clauses, which are a set of grouping clauses that make up a cube:

(country, state, year, month)
(country, state, year)
(country, state)
(country, year, month)
(country, year)
(country)
(year, month)
(year)
( )

Queries that use ROLLUP operators include all the generated grouping clauses in a single result set. Hence, the result set includes the union of all grouping clause columns, plus the aggregated columns. In order to combine results of different grouping sets, nulls are returned in any grouping columns in which a given row is not a member, as illustrated in the following example. See Table 18 for the result of the ROLLUP query for a single dimension. A SELECT statement is generated that includes a ROLLUP operator. The SELECT statement is generated based on metadata objects 130. For example, in the SELECT statement below, the "sum" operator is generated from a measures metadata object, and joins are generated from a join metadata object.

SELECT country, state, sum(amt) AS revenue
FROM fact f, location 1
WHERE f.lid=1.lid
GROUP BY ROLLUP (country, state)

TABLE 18

| Country | State | Revenue |
|---------|-------|---------|
| —       | —     | 235329.24 |
| CANADA  | —     | 35754.64 |
| CANADA  | ON    | 35754.64 |
| USA     | —     | 199574.60 |
| USA     | CA    | 103910.41 |
| USA     | NY    | 94665.19 |

In the example in Table 18, the row with the aggregate revenue for USA is designated by a null (shown as a dash) in the state column. The row with the aggregate revenue for all countries and states is designated by a null in both the country and state columns.

Although FIG. 29A describes use of measure metadata objects to generate a cube view, in additional implementations, the measure metadata objects may be used without creating a cube view. That is, the cube view is one way to use the definitions of the measure metadata objects in order to specify the calculations. Another way to use the definitions of the measure metadata objects is for an application to read the measure definitions and the cube model metadata and to directly generate a SQL statement from the measure definitions and cube model metadata.

Figure 29B:
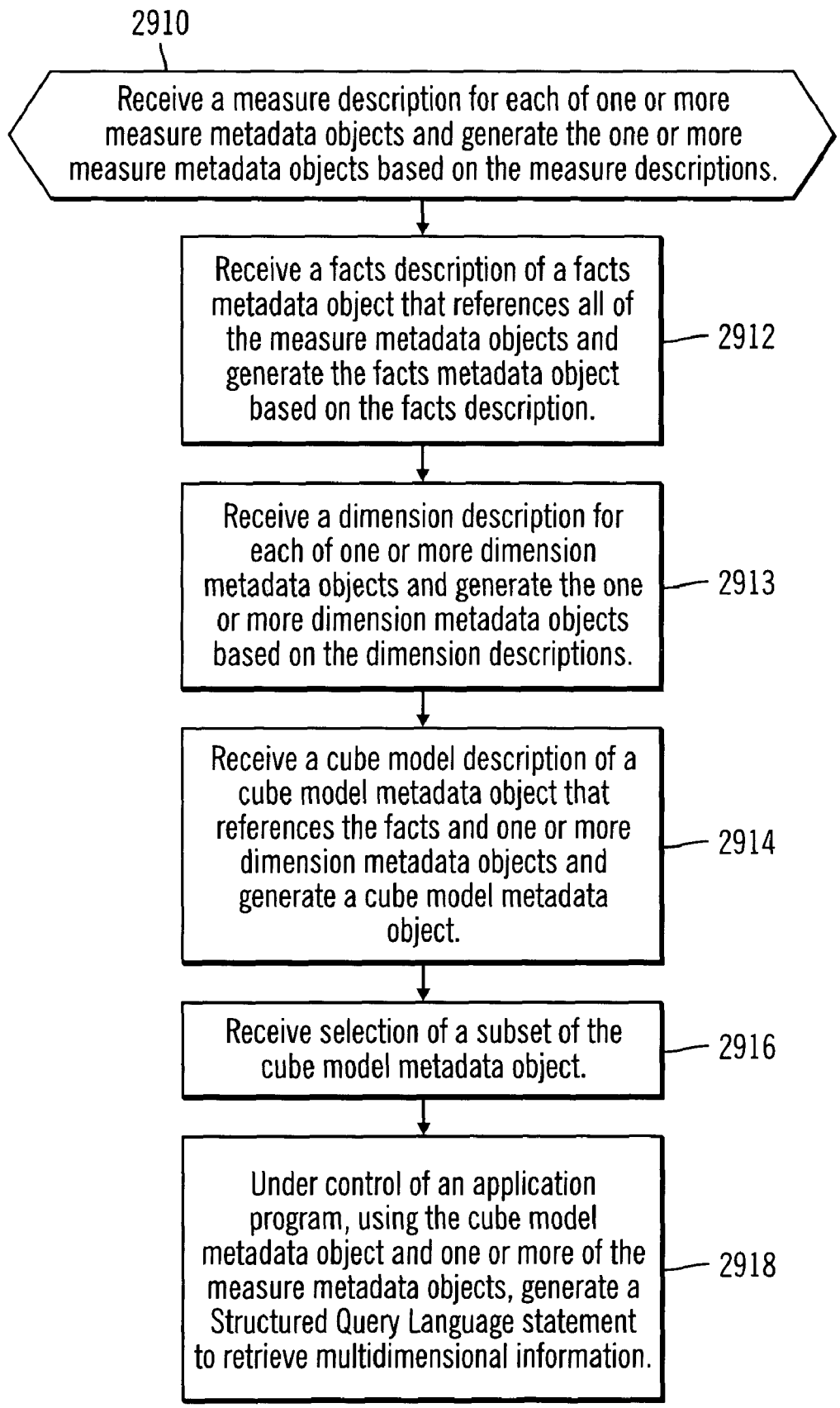

FIG. 29B illustrates logic for generating a SQL statement from one or more measure metadata objects and a cube model metadata object in accordance with certain implementations of the invention. Control begins in block 2910 with receipt of a measure description for each of one or more measure metadata objects and generation of the one or more measure metadata objects, such as one of the measure metadata objects illustrated in FIGS. 22-28, based on the measure descriptions. In block 2912, a facts description of a facts metadata object is received that references all of the measure metadata objects, and a fact metadata object is generated from the facts description. Additionally, the facts description references attribute metadata objects and join metadata object. In block 2913, a dimension description for each of one or more dimension metadata objects is received, and the one or more dimension metadata objects are generated from the dimension descriptions. The dimension description references one or more attribute metadata objects, zero or more join metadata objects, and one or more hierarchy metadata objects. Each hierarchy metadata object includes information used to build a ROLLUP clause. In particular, a cube model metadata object may reference several possible hierarchies, but selection of a single hierarchy is required for SQL generation, in certain implementations of the invention. In block 2914, a cube model description of a cube model metadata object that references the facts and one or more dimension metadata objects is received, and the cube model metadata object is generated from the cube model description. In block 2916, a selection of a subset of the cube model metadata object is made by an application program. In block 2918, under control of the application program, using the cube model metadata object and one or more of the measure metadata objects, a SQL statement is generated to retrieve multidimensional information. The generation of the SQL statement may also use other metadata in other metadata objects (e.g., a hierarchy metadata object).

The multidimensional metadata software 120 addresses key problems in calculating multiple measures with a single SQL statement (i.e., symmetry of a measure, distributiveness of aggregation functions involved, and order dimensions appear in the aggregation script). Also, the multidimensional metadata software 120 handles various query types (e.g., Grand Total query, Slice based query, and complete cube query). In a Grand Total slice, only the grand total for all dimensions is returned. A slice is a sub-cube, while a complete cube is an entire cube.

Measures are represented as measure metadata objects. When multiple measures are to be calculated in a single SQL statement, implementations of the invention determine whether the measures are compatible. Compatible measures have the same specification of aggregation order for the dimensions that they reference. If a set of measures are not compatible, then the invention determines at least one way for the calculation of the incompatible measures to be combined in a single SQL statement. In certain implementations, the incompatible measures may be combined using a JOIN operation (also referred to as "joining"), and this processing is further described in FIG. 29C. In certain implementations, the incompatible measures may be combined by restructuring aggregation steps so that they are compatible (which is also referred to as "nesting"), and this processing is further described in FIG. 29D. In certain implementations, a hybrid form of joining and nesting is implemented in which some sets of measures are joined and some sets of measures are nested.

Figure 29C:
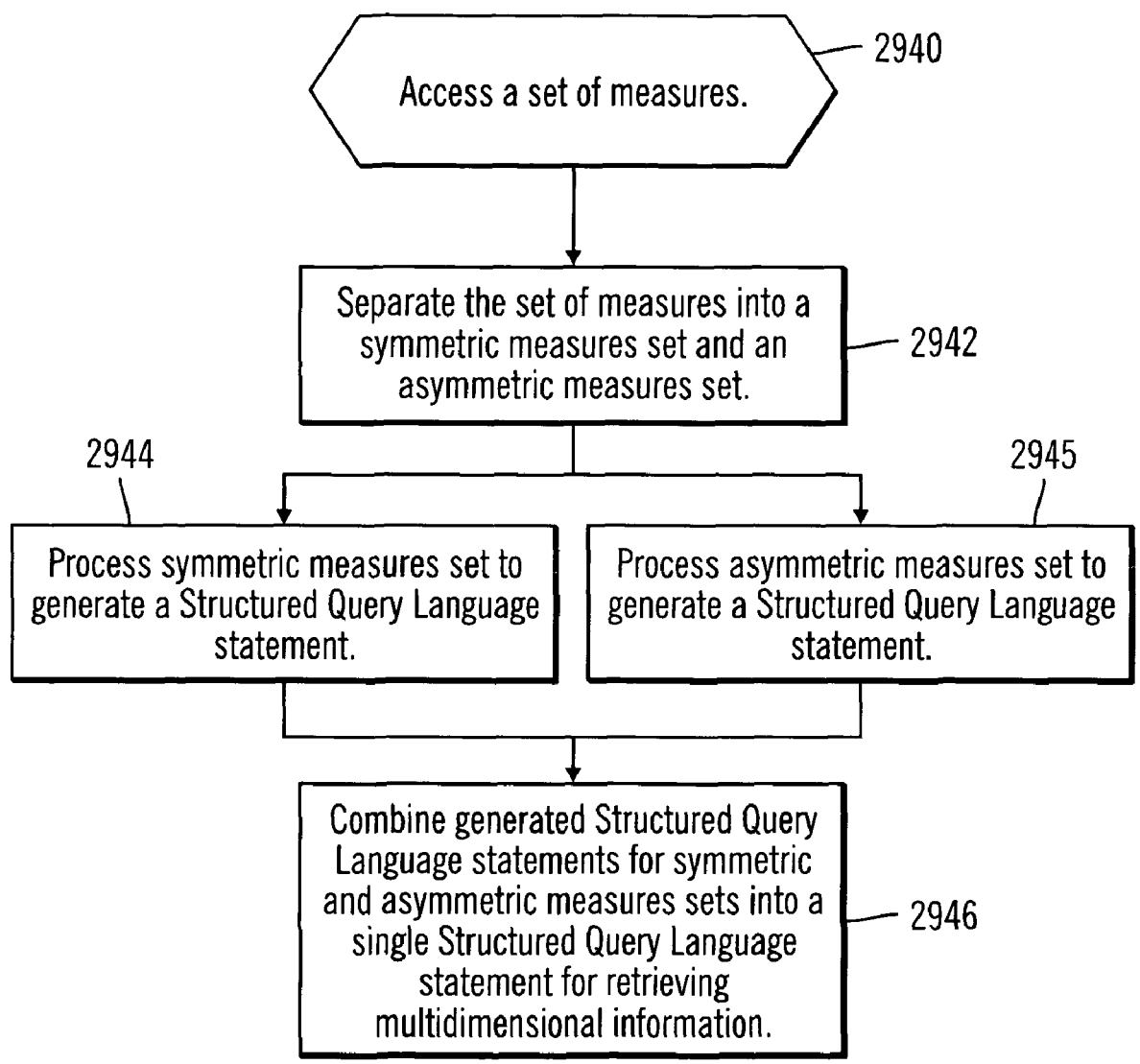

FIG. 29C illustrates further details of logic for combining measures in accordance with certain implementations of the invention. The processing of FIG. 29C illustrates the highest-level logic used to generate a single SQL statement for calculating all measures. Implementations of the invention attempt to generate the least number of compatible measures sets. Also, when multiple sets are inevitable, due to measure incompatibility, a preferred combination of sets is one that has a symmetric set of measures, with all the symmetric measures in it.

In FIG. 29C, control begins at block 2940 with a set of measures being accessed. A set of measures includes one or more measures. The measures are accessed by referencing one or more metadata objects. In block 2942, the set of measures in the one or more measure metadata objects are separated into a symmetric measures set and an asymmetric measures set. Symmetric measures have a single aggregation operator and do not specify any specific aggregation order. In many applications such measures are common. All symmetric measures are compatible. A single SQL statement to calculate all symmetric measures can be generated by using a ROLLUP operator per dimension. For example, the Revenue, Cost, and Product measure used in previous examples are symmetric. Some measure metadata objects may reference one or more other measures. For example, a Profit Margin measure references Profit and Revenue measures, which reference Income and Expense measures. Since both the Income and Expense measures are symmetric, the Profit Margin measure is in the symmetric measures set. In block 2944, a SQL statement is generated for the symmetric measures set. In block 2945, a SQL statement is generated for the asymmetric measures set. The symmetric and asymmetric measures sets may be processed independently and concurrently or in any order.

In block 2946, the SQL statement for the symmetric measures set is combined with the SQL statement for the asymmetric measures set to form a single SQL statement for retrieving multidimensional information. The technique used to combine these two statements depends on the nature of the set of asymmetric measures. When some measures in the asymmetric set can be computed from a common, symmetric subcube, nesting can be used to combine the calculation of those measures and the symmetric measures by rewriting the symmetric calculation as a nested calculation building on the calculation of the common symmetric subcube. If any measures of the asymmetric set require dimensions to be aggregated in specific orders (i.e., have little or no symmetry) or specify conflicting calculation order for the dimensions of the cube, then those asymmetric measures are divided into subsets sharing the same calculation order and a SQL statement is generated that combines them with an inner join. These asymmetric measures with incompatibilities that can not be resolved by means of nesting are then combined, by means of an inner join, with the symmetric measures and with any asymmetric measures that were able to be combined with the symmetric measures by means of nesting.

Figure 29D:
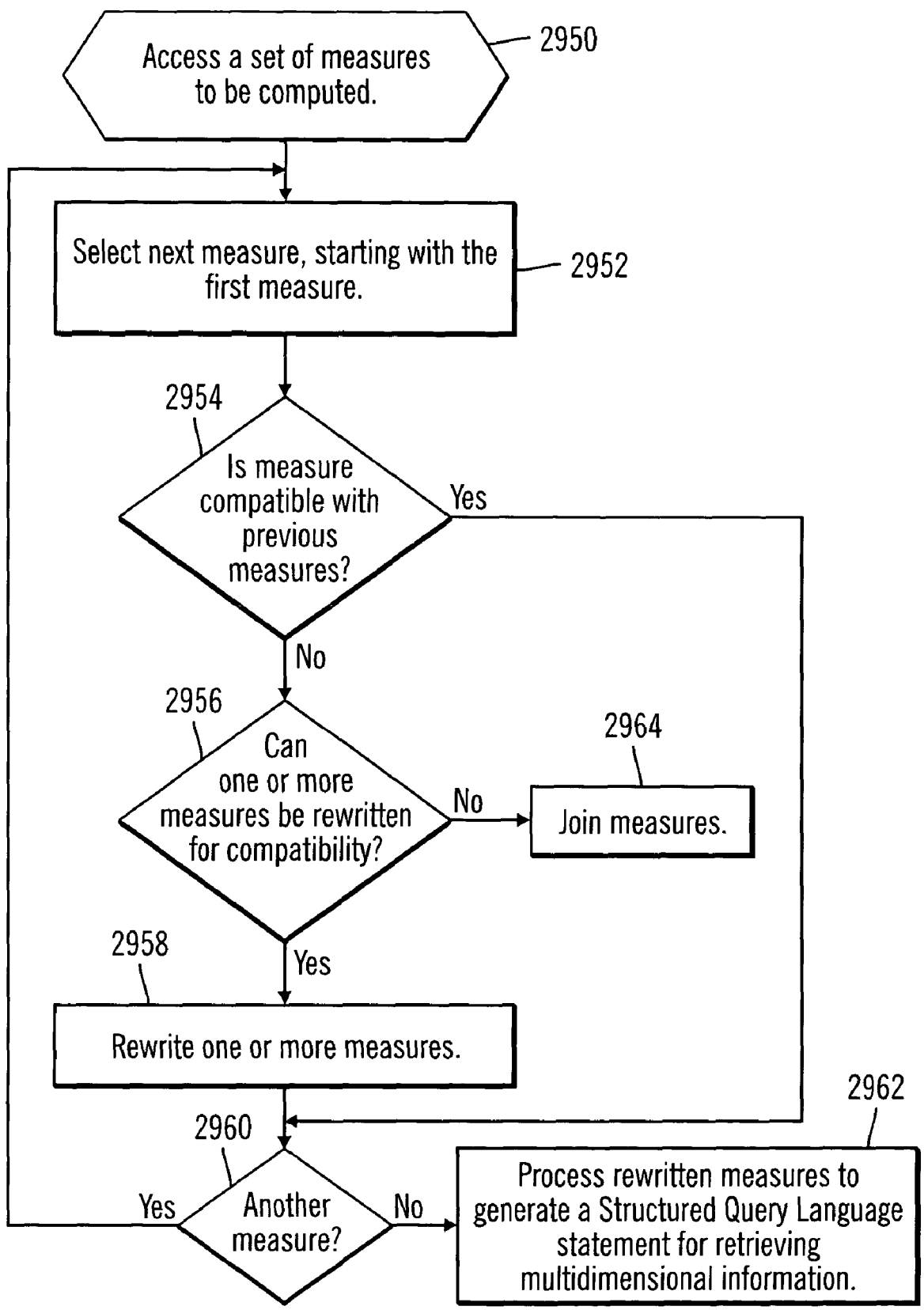

FIG. 29D illustrates further details of logic for combining incompatible measures using nesting in accordance with certain implementations of the invention. Control begins at block 2950 with a set of measures being accessed. In block 2952, the next measure in the set of measures is selected, starting with the one (e.g., the first). In block 2954, it is determined whether the measure is compatible with previous measures. For the first measure processed, the determination is that the measure is compatible (as there are no previous measures for the first measure). If the measure is compatible, processing continues to block 2960, otherwise, processing continues to block 2956. In block 2956, it is determined whether one or more measures may be rewritten so that the selected measure is compatible with the previous measures. If one or more measures may be rewritten, processing continues to block 2958, otherwise, processing continues to block 2964. In block 2958, one or more measures are rewritten. Then, it is determined whether there is another measure to be processed. If so, processing loops back to block 2952, otherwise, processing continues to block 2962. In block 2962, the rewritten measures are processed to generate a SQL statement for retrieving multidimensional information. If the selected measure is not compatible with previous measures, and cannot be rewritten, in block 2964, the measures are joined with the technique described with reference to FIG. 29C.

Figure 29E:
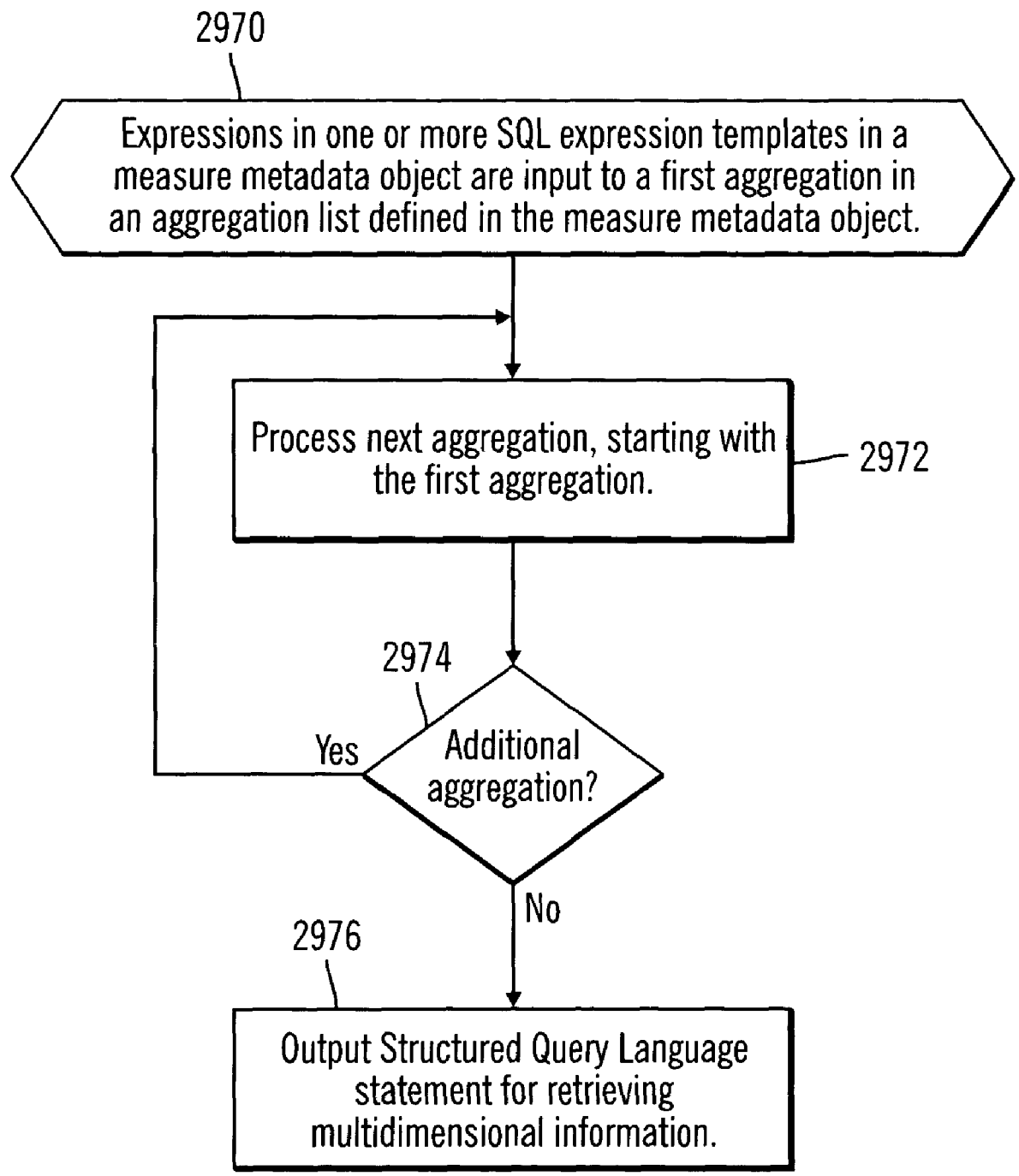

FIG. 29E illustrates further details of logic for generating a SQL statement for both a symmetric measure set and an asymmetric measure set (blocks 2944, 2945) in accordance with certain implementations of the invention. Control begins at block 2970 with expressions in one or more SQL expression templates in the measure metadata object being input to a first aggregation in an aggregation list defined in the measure metadata object. In block 2972, the next aggregation is processed, starting with one (e.g., the first aggregation). The result of processing an aggregation is a SQL statement. If the measure contains multiple aggregations, the SQL statement that results from the first aggregation is used as input for the next aggregation. This is called nested SQL statements. In block 2974, it is determined whether there is an additional aggregation in the aggregation list to process. If so, processing loops back to block 2972, and the output of the processing of the previous aggregation is input into the next aggregation. Otherwise, processing continues to block 2976. In block 2976, a Structured Query Language statement is output that retrieves multidimensional information. In certain implementations, the SQL statement may be catalogued as a cube view and referenced by a cube metadata object.

In terms of calculating multiple measures, symmetry of a measure, distributiveness of aggregation functions involved, and order dimensions appear in the aggregation script are addressed by the multidimensional metadata software 120.

As for symmetry, a symmetric measure defines a single aggregation in the aggregation list, and an asymmetric measure defines multiple aggregation in the aggregation list. When a measure does not define an aggregation, then the symmetry is defined by the base measures. In this situation, a measure is symmetric if all of its base measures are symmetric, and the measure is asymmetric if any of its base measures are asymmetric. FIG. 30 illustrates Table D 3000, which lists some measures and indicates which measures are symmetric or asymmetric in accordance with certain implementations of the invention. For example, the Cost measure 3002 is symmetric, while the Inventory measure 3004 is asymmetric. Table D 3000 does not provide an exhaustive list of measures, and other measures also may be defined as symmetric or asymmetric.

As for distributiveness, an aggregation function is distributive when it can be broken into multiple aggregation steps without changing the result of the aggregation function. For example, for SUM, which is distributive: single aggregation step=SUM(2,8,11)=21, and this single aggregation step may be broken into two aggregation steps, such as: aggregation step1 has step1$a$=SUM(2, 8) and step1$b$=SUM(11); and aggregation step2=SUM(step1$a$, step1$b$)=SUM(10,11)=21. This illustrates that SUM: is a distributive function because when a single step is broken apart, the results do not change. An aggregation function is non-distributive when the aggregation function cannot be broken into multiple aggregation steps without changing the result of the aggregation function. For example, average (AVG), standard deviation (STDDEV), and correlation (CORRELATION) are non-distributive. For example, for AVG: single aggregation step=AVG (2, 8, 11)=7, and this single aggregation step may be broken into two aggregation steps, such as: aggregation step1 has step1$a$=AVG(2, 8) and step1$b$=AVG(11); and, aggregation step2=AVG(step1$a$, step 1$b$)=AVG(5,11)=8. This illustrates that the average is a non-distributive measure because when a single aggregation step is broken apart, the results may change.

FIG. 31 illustrates Table E 3100, which lists some aggregation functions and indicates which aggregation functions are distributive and which are non-distributive in accordance with certain implementations of the invention. For example, the SUM aggregation function 3102 is distributive, while the AVG 3104 and CORRELATION 3106 aggregation functions are non-distributive. Table E does not provide an exhaustive list of aggregation functions, and other aggregation functions may be classified as distributive or non-distributive.

As for the order that dimensions appear in the aggregation script, it is desirable to have all measures of a facts table use the same number of aggregation steps and to have each aggregation step calculate the same set of dimensions. Two aggregation steps may be combined if the two aggregation steps use the same aggregation function. Also, if both aggregation functions are distributive, the aggregation step can be split into two or more aggregation steps. FIG. 32 illustrates Table F 3200, which lists measures and how an aggregation step may be broken up into multiple aggregation steps for the measures in accordance with certain implementations of the invention. In Table D 3200, the numbers with asterisks denote an alternative way to calculate the measure. For example, for the Cost measure 3202, the first option is a SUM of product, market, and time dimensions, while a second option is to first perform a sum of product and market dimensions, and then to add in the time dimension.

B.4 Generating a SOL Statement for a Symmetric Measures Set

The multidimensional metadata software 120 generates a SQL statement for symmetric measures. For ease of understanding, SQL statements that have been generated for some symmetric measures are provided in this section. The result of executing the SQL statement generated for a Grand Total query or an Arbitrary Slice query, may be stored, for example, in a report. However, the result of executing the SQL statement generated for a complete cube query is a cube view, which may itself be queried.

For all types of queries, the generation of the SQL expression for each measure follows the flow described in FIG. 29E.

For example, for a Grand Total query with symmetric measures, the multidimensional metadata software 120 may generate the following Select statement:

select SUM(f.Cost) as Cost, SUM(f.Rev) as Revenue, SUM (f.Rev−f.Cost) as Profit,
SUM(f.Revenue−f.Cost)/SUM(f.Rev) as "Profit Margin",
RANK ( ) OVER (ORDER BY SUM(f.Rev−f.Cost)) as "Profit Rank",
CORRELATION(f.Revenue, f.Revenue−f.Cost) as "RevProfit Correlation"
from Fact f For an Arbitrary Slice query with symmetric measures, the multidimensional metadata software 120 may generate the following Select statement:

select SUM(f.Cost) as Cost, SUM(f.Rev) as Revenue, SUM (f.Rev−f.Cost) as Profit,
SUM(f.Revenue−f.Cost)/SUM(f.Rev) as "Profit Margin",
RANK ( ) OVER (ORDER BY SUM(f.Rev−f.Cost)) as "Profit Rank",
CORRELATION(f.Revenue, fRevenue−f.Cost) as "RevProfit Correlation",
m.Country, m.State, t.Year
from Fact f, Market m, Time t
where f.marketid=m.marketid AND f.timeid=t.timeid
group by m.Country, m.State, t.Year For a complete cube query with symmetric measures, the multidimensional metadata software 120 may generate the following select statement:

select SUM(f.Cost) as Cost, SUM(f.Rev) as Revenue, SUM (f.Rev−f.Cost) as Profit,
SUM(f.Revenue−f.Cost)/SUM(f.Rev) as "Profit Margin",
RANK ( ) OVER (ORDER BY SUM(f.Rev−f.Cost)) as "Profit Rank",
CORRELATION(f.Revenue, f.Revenue−f.Cost) as "RevProfit Correlation",
m.Country, m.State, m.City,
t.Year, t.Quarter, t.Month,
p.Line, p.Group, p.Product
from Fact f, Market m, Time t, Product p
where f.marketid=m.marketid AND f.timeid=t.timeid AND f.prodid=p.prodid
group by
ROLLUP(m.Country, m.State, m.City),
ROLLUP(t.Year, t.Quarter, t.Month),
ROLLUP(p.Line, p.Group, p.Product)

B.5 Generating a SQL Statement for an Asymmetric Measures Set

The multidimensional metadata software 120 generates a SQL statement for asymmetric measures. For ease of understanding, SQL statements that have been generated for some asymmetric measures are provided in this section. The result of executing the SQL statement generated for a Grand Total query or an Arbitrary Slice query, may be stored, for example, in a report. However, the result of executing the SQL statement generated for a complete cube query is a cube view, which may itself be queried.

A set of asymmetric measures is calculated by using a nested SELECT statement. Each of the aggregation steps maps to a level of nesting in the SELECT. The first aggregation step is calculated in the innermost nesting level of the SELECT, which is described in block 2970 of FIG. 29E. The results of each level are used as input to the immediate outer nested SELECT, as described in block 2972 of FIG. 29E. In each of these levels, for dimensions that have not yet been calculated and are not supposed to be calculated in a given level, the most granular (detailed) dimension attribute is included in the GROUP BY clause. In this manner, no aggregation happens for those dimensions. With regards to the aggregation functions, each level has the aggregation function taking as input the results of the measure in the immediate inner level. For the lowest level, the input for the aggregation function is the SQL expressions defined in the measure, as described in block 2970 of FIG. 29E.

For example, for a Grand Total query with asymmetric measures, the multidimensional metadata software 120 may generate the following Select statement:

select AVG(s.Inventory) as Inventory
from (select SUM(f.Inv) as Inventory, f.timeid
 from Fact f
 group by f.timeid) s For an Arbitrary Slice query with asymmetric measures, the multidimensional metadata software 120 may generate the following Select statement:

select AVG(s.Inventory) as Inventory,
 s.Country, s.State, s.Year
from (select SUM(f.Inv) as Inventory,
 f.timeid, m.Country, m.State, t.Year
 from Fact f, Market m, Time t
 where f.marketid=m.marketid AND f.timeid=t.timeid
 group by f.timeid, m.Country, m.State, t.Year) s
group by s.Country, s.State, s.Year For a complete cube query with asymmetric measures, the multidimensional metadata software 120 may generate the following select statement:

select AVG(s.Inventory) as Inventory,
 s.Year, s.Quarter, s.Month,
 s.Country, s.State, s.City,
 s.Line, s.Group, s.Product
from (select SUM(f.Inv) as Inventory, f.timeid, m.Country,
 m.State, m.City,
 t.Year, t.Quarter, t.Month, p.Line, p.Group, p.Product
 from Fact f, Market m, Time t, Product p
 where f.marketid=m.marketid AND f.timeid=t.timeid
  AND f.prodid=p.prodid
 group by f.timeid, t.Year, t.Quarter, t.Month,
  ROLLUP(m.Country, m.State, m.City),
  ROLLUP(p.Line, p.Group, p.Product)) s
group by ROLLUP(s.Year, s.Quarter, s.Month),
 s.Country, s.State, s.City, s.Line, s.Group, s.Product B.6 Generating a SOL Statement for Incompatible Measure Sets This section describes how multiple SQL statements generated for multiple measure sets (e.g., symmetric and asymmetric measures sets) are combined into a single SQL statement.

In the example of Table F, it is not possible to find a common set of dimension sets. There are two options to calculate all (i.e., symmetric and asymmetric) measures. Each option creates two separate SQL queries and merges them together. For example, a first option is to take Cost, Revenue, Profit, Profit Margin, Profit Rank, and RevProfit Correlation of all dimensions ("AllDim") and an Inventory of AllbutTime, Time. For example, a second option is to take a RevProfit Correlation of all dimensions ("AllDim) and Inventory, Cost, Revenue, Profit, Profit Margin, Profit Rank for AllbutTime, Time.

The multiple SQL statements generated for the symmetric and asymmetric measures sets share the same set of attributes when these SQL statements are generated for the same slice or cube. Therefore, the attribute instances will be the same in all the SQL statements. The technique of combining the SQL statements of different measures sets consists of joining the results of both SQL statements. That is, the SQL statements generated for each measures set are joined into a single SQL statement by connecting them with an INNER JOIN. In certain implementations, the type of join used is an INNER JOIN on the attributes that were used in the GROUP BY clauses of the SQL statements.

The clause used in the inner join between the multiple SQL statements depends on the type of SQL statements being combined (i.e., slice-based vs. complete cube). For slice-based SQL statements, the clause used in the inner join will use a simple ANDed equality of all the attributes in the slice. The following is a slice-based SQL statement generated by the multidimensional metadata software 120 for the first option:

select r1.Inventory, r2.Cost, r2.Revenue, r2.Profit, r2.Margin,
   r2."Profit Rank", r2."RevProfit Correlation",
   r1.Country, r1.State, r1.Year
(select AVG(s.Inventory) as Inventory,
   s.Country, s.State, s.Year
from (select SUM(f.Inv) as Inventory,
   f.timeid, m.Country, m.State, t.Year
   from Fact f, Market m, Time t
   where f.marketid=m.marketid AND f.timeid=t.timeid
   group by f.timeid, m.Country, m.State, t.Year) s group by
     s.Country, s.State, s.Year) r1
INNER JOIN
(select SUM(f.Cost) as Cost, SUM(f.Rev) as Revenue, SUM
   (f.Rev−f.Cost) as Profit,
   SUM(f.Revenue−f.Cost)/SUM(f.Rev) as Margin,
   RANK ( ) OVER (ORDER BY SUM(f.Rev−f.Cost)) as "Profit Rank",
   CORRELATION(f.Revenue, f.Revenue−f.Cost) as "RevProfit Correlation",
   m.Country, m.State, t.Year
from Fact f, Market m, Time t
where f.marketid=m.marketid AND f.timeid=t.timeid
group by m.Country, m.State, t.Year) r2
ON r1.Country=r2.Country AND r1.State=r2.state AND
   r1.Year=r2.Year In a Grand Total slice, only the grand total for all dimensions is returned. If the slice being queried is a Grand Total slice, then there are no attributes that are being grouped by, therefore, a transient constant attribute is used in the join clause. The transient constant attribute is associated with the Grand Total column and describes whether an aggregation is held for the given attribute. The following is a Grand Total slice SQL statement generated by the multidimensional metadata software 120 for the first option:

select r1.Inventory,
   r2.Cost, r2.Revenue, r2.Profit, r2.Margin, r2."Profit Rank", r2."RevProfit Correlation"
(select AVG(s.Inventory) as Inventory, 1 as GrandTotal
from (select SUM(f.Inv) as Inventory, f.timeid
   from Fact f
   group by f.timeid)
   s
)r1
INNER JOIN
(select SUM(f.Cost) as Cost, SUM(f.Rev) as Revenue, SUM
   (f.Rev−f.Cost) as Profit,
   SUM(f.Revenue−f.Cost)/SUM(f.Rev) as "Profit Margin",
   RANK ( )(OVER (ORDER BY SUM(f.Rev−f.Cost)) as "Profit Rank",
   CORRELATION(f.Revenue, f.Revenue−f.Cost) as "RevProfit Correlation",
   1 as GrandTotal
from Fact f) r2
ON r1.GrandTotal=r2.GrandTotal For the complete cube type of SQL statement, the join clause also takes into consideration the fact that the instances of an attribute will also contain the representation of aggregations. For that reason, transient attributes are added to the base SQL statements that are being combined. These new transient constant attributes describe whether an aggregation is held for the given attribute. The join clause then joins attribute instances when they contain specific members or contain aggregation. The following is a cube-based SQL statement generated by the multidimensional metadata software 120 for the first option that shows the use of the transient constant attribute suffixed by AGG (i.e., aggregation):

select r1.Inventory, r2.Cost, r2.Revenue, r2.Profit, r2.Margin,
   r2."Profit Rank", r2."RevProfit Correlation",
   r1.Year, r1.Quarter, r1.Month, r1.Country, r1.State,
   r1.City, r1.Line, r1.Group, r1.Product (select AVG(s.Inventory) as Inventory, s.Year, s.Quarter, s.Month,
   s.Country, s.State, s.City, s.Line, s.Group, s.Product,
   GROUPING(s.Year) as YearAgg, GROUPING(s.Quarter)
     as QuarterAgg, GROUPING(s.Month) as MonthAgg,
   s.CountryAgg, s.StateAgg, s.CityAgg, s.LineAgg,
     s.GroupAgg, s.ProductAgg from (select SUM(f.Inv) as
   Inventory, f.timeid, t.Year, t.Quarter, t.Month, m.Country, m.State, m.City, p.Line, p.Group, p.Product,
   GROUPING(m.Country) as CountryAgg, GROUPING
     (m.State) as StateAgg, GROUPING(m.City) as CityAgg,
   GROUPING(p.Line) as LineAgg, GROUPING
     (p.Group) as GroupAgg, GROUPING(p.Product) as ProductAgg
from Fact f, Market m, Time t, Product p
where f.marketid=m.marketid AND f.timeid=t.timeid
   AND f.prodid=p.prodid
group by f.timeid, t.Year, t.Quarter, t.Month, ROLLUP
   (m.Country, m.State, m.City), ROLLUP(p.Line, p.Group, p.Product)) s
group by ROLLUP(s.Year, s.Quarter, s.Month), s.Country,
   s.State, s.City, s.Line, s.Group, s.Product,
   s.CountryAgg, s.StateAgg, s.CityAgg, s.LineAgg,
   s.GroupAgg, s.ProductAgg)
r1
INNER JOIN
(select SUM(f.Cost) as Cost, SUM(f.Rev) as Revenue, SUM
   (f.Rev−f.Cost) as Profit,
   SUM(f.Revenue−f.Cost)/SUM(f.Rev) as "Profit Margin",
   RANK ( ) OVER (ORDER BY SUM(f.Rev−f.Cost)) as "Profit Rank",
   CORRELATION(f.Revenue, f.Revenue−f.Cost) as "RevProfit Correlation",
   m.Country, m.State, m.City, t.Year, t.Quarter, t.Month, p.Line, p.Group, p.Product,
   GROUPING(m.Country) as CountryAgg, GROUPING
     (m.State) as StateAgg, GROUPING(m.City) as CityAgg,
   GROUPING(t.Year) as YearAgg, GROUPING(t.Quarter)
     as QuarterAgg, GROUPING(t.Month) as MonthAgg,
   GROUPING(p.Line) as LineAgg, GROUPING(p.Group)
     as GroupAgg, GROUPING(p.Product) as ProductAgg
from Fact f, Market m, Time t, Product p
where f.marketid=m.marketid AND f.timeid=t.timeid AND
   f.prodid=p.prodid
group by ROLLUP(m.Country, m.State, m.City), ROLLUP
   (t.Year, t.Quarter, t.Month),
ROLLUP(p.Line, p.Group, p.Product)) r2
ON (r1.Country=r2.Country OR (r1.CountryAgg=1 AND
   r2.CountryAgg=1)) AND
   (r1.State=r2.5tate OR (r1.StateAgg=1 AND
   r2.5tateAgg=1)) AND (r1.City= r2.City OR (r1.CityAgg=1 AND r2.CityAgg=1)) AND
(r1.Year=r2.Year OR (r1.YearAgg=1 AND
r2.YearAgg=1)) AND
(r1.Quarter=r2.Quarter OR (r1.QuarterAgg=1 AND
r2.QuarterAgg=1)) AND
(r1.Month=r2.Month OR (r1.MonthAgg=1 AND
r2.MonthAgg=1)) AND
(r1.Line=r2.Line OR (r1.LineAgg=1 AND
r2.LineAgg=1)) AND (r1.Group=r2.Group OR
(r1.GroupAgg=1 AND r2.GroupAgg=1)) AND
(r1.Product=r2.Product OR (r1.ProductAgg=1 AND
r2.ProductAgg=1))

Although the example above illustrates two measure sets, implementations of the invention may combine more than two measures sets. Moreover, although examples herein have been directed to SQL statements, other statements that may be used to access a database are within the scope of the invention.

In certain implementations, rather than combining SQL statements generated for multiple measures sets, aggregation sets are restructured so that they are compatible. For example, calculation of Sales and Inventory measures may be combined. Because the Sales measure uses SUM for all dimensions and the Inventory measure uses SUM for all but time, the computation for the Sales measure may be broken down into two steps. The first step is SUM for all dimensions but time, and the last step is SUM for time (which works because SUM is distributive). This computation order for Sales is now compatible with the steps required for Inventory.

IBM, DB2, Z/OS, and AIX are trademarks of International Business Machines Corporation in the United States and/or other countries. Windows is a trademark of Microsoft Corporation in the United States and/or other countries. Solaris and JDBC are trademarks of Sun Microsystems in the United States and/or other countries. Linux is a trademark of Linus Torvalds in the United States and/or other countries. HP-UX is an Open Group UNIX 95 branded product in the United States and/or other countries. Pilot Suite is a trademark of Pilot Software in the United States and/or other countries. Express is a trademark of Oracle Corporation in the United States and/or other countries. Essbase is a trademark of Hyperion Solutions Corporation in the United States and/or other countries. TM1 is a trademark of Applix, Inc. in the United States and/or other countries.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 29A, 29B, 29C, 29D, and 29E describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 29A, 29B, 29C, 29D and 29E was described as being implemented in software. This logic may be part of the operating system of the host systems or an application program. In yet further implementations, this logic may be maintained in storage areas or in a read only memory or other hardwired type of device. The preferred logic may be implemented in hardware or in programmable and non-programmable gate array logic.

Figure 33:
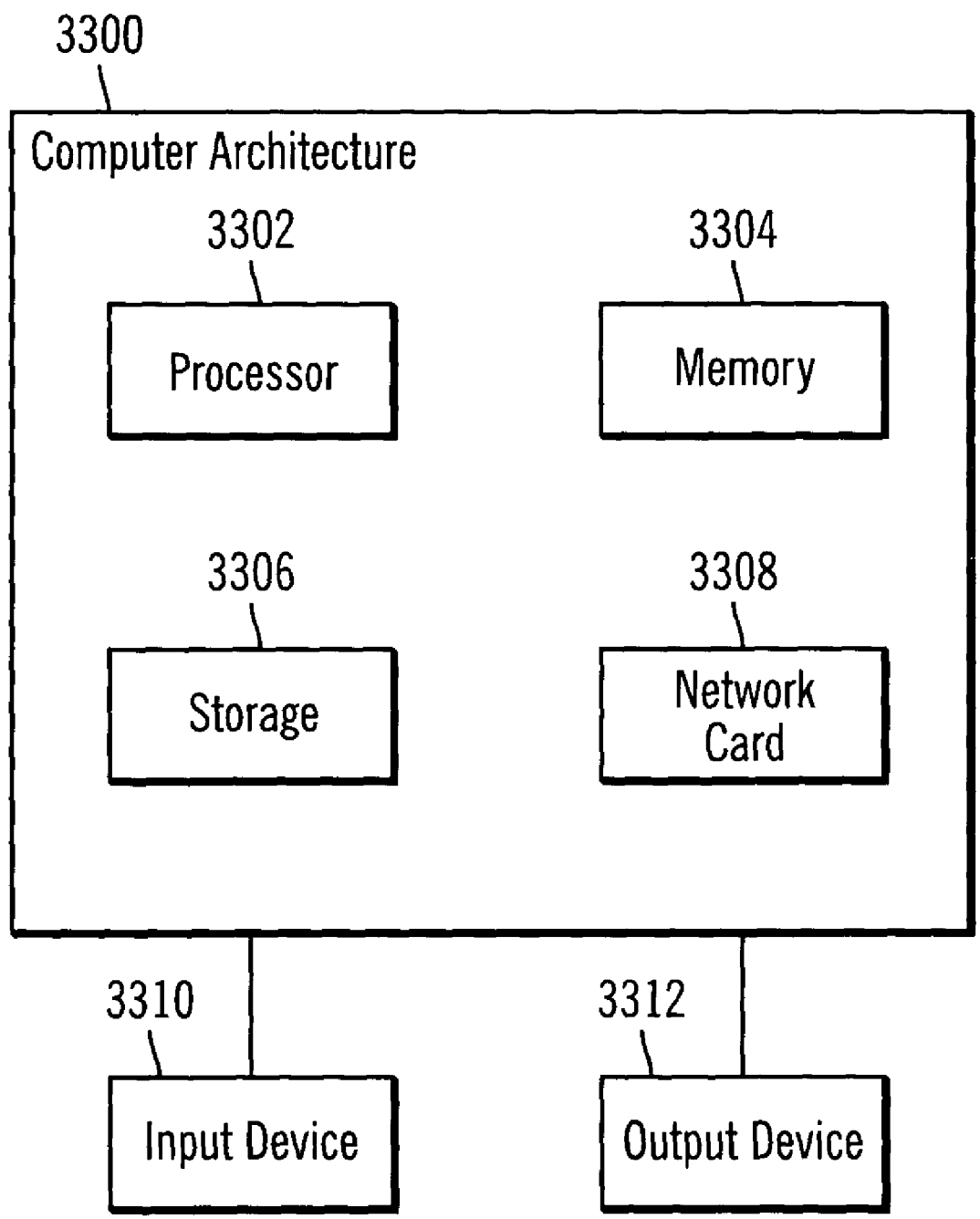
FIG. 33 illustrates one implementation of the architecture of a computer system.

FIG. 33 illustrates one implementation of the architecture of the computer system 100. The computer system 100 may implement a computer architecture 3300 having a processor 3302 (e.g., a microprocessor), a memory 3304 (e.g., a volatile memory device), and storage 3306 (e.g., a non-volatile storage area, such as magnetic disk drives, optical disk drives, a tape drive, etc.). The storage 3306 may comprise an internal storage device or an attached or network accessible storage. Programs in the storage 3306 are loaded into the memory 3304 and executed by the processor 3302 in a manner known in the art. The architecture further includes a network card 3308 to enable communication with a network. An input device 3310 is used to provide user input to the processor 3302, and may include a keyboard, mouse, pen-stylus, microphone, touch sensitive display screen, or any other activation or input mechanism known in the art. An output device 3312 is capable of rendering information transmitted from the processor 3302, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A computer-implemented method for specifying on-line analytical processing multidimensional calculations, comprising:

accessing, using a computer including a processor, measures that include symmetric and asymmetric measures, wherein each of the symmetric measures have a single aggregation, and wherein each of the asymmetric measures have multiple aggregations, wherein a measure is defined by one or more structured query language expressions and wherein the one or more structured query language expressions are used as input to an aggregation of the measure;

selecting each of the symmetric and asymmetric measures one at a time; and for the selected one of the symmetric and asymmetric measures, determining whether the selected measure is compatible with previously selected measures, wherein compatible measures have a same specification of aggregation order for dimensions that the measures reference;

in response to determining that the selected measure is compatible, selecting another of the symmetric and asymmetric measures; and in response to determining that the selected measure is not compatible, determining whether one or more measures of the symmetric and asymmetric measures can be rewritten so that the selected measure is compatible with the previously selected measures;

in response to determining that the one or more measures of the symmetric and asymmetric measures can be rewritten, rewriting the one or more measures of the symmetric and asymmetric measures; and in response to determining that the one or more measures of the symmetric and asymmetric measures cannot be rewritten, generating a first structured query language statement for the symmetric measures;

generating a second structured query language statement for the asymmetric measures; and combining the first structured query language statement and the second structured query language statement for the symmetric and asymmetric measures into a single structured query language statement.

2. The method of claim 1, wherein each of the one or more structured query language expressions includes a template for building a query language expression.

3. The method of claim 2, wherein the template uses a token notation that references a specific column, attribute, or measure from a list of columns, attributes and measures.

4. The method of claim 1, wherein each of the one or more structured query language expressions includes a list of columns, attributes, and measures.

5. The method of claim 1, further comprising:
generating a new statement for retrieving multidimensional information, wherein the new statement is a structured query language statement and wherein the structured query language statement is generated based on the one or more aggregations in each of the measures.

6. The method of claim 5, wherein the one or more aggregations is a list of aggregations and wherein the list of aggregations comprises a list of aggregation functions and corresponding dimensions sets.

7. The method of claim 6, wherein the dimension set specifies NULL for a corresponding aggregation function to include all available dimensions other than dimensions specified in another aggregation function in the list of aggregations.

8. The method of claim 5, wherein the new statement is generated using metadata in a hierarchy to build ROLLUP clauses.

9. The method of claim 5, wherein generation of the new statement further comprises:
generating a SELECT statement for a grand total query.

10. The method of claim 5, wherein generation of the new statement further comprises:
generating a SELECT statement.

11. The method of claim 1, wherein the combining comprises use of a join.

12. The method of claim 1, further comprising:
generating a structured query language statement for creation of a cube view, wherein the structured query language statement is generated from metadata in the measures;
executing the structured query language statement to create the cube view; and
querying the cube view.

13. The method of claim 1, further comprising:
under control of an application program, generating a new structured query language statement to retrieve multidimensional information.

14. A computer system for specifying on-line analytical processing multidimensional calculations, comprising:
a processor;
memory connected to the processor; and
hardware logic implementing code and connected to the processor, that, when executed by the processor, performs:
accessing measures that include symmetric and asymmetric measures, wherein each of the symmetric measures have a single aggregation, and wherein each of the asymmetric measures have multiple aggregations, wherein a measure is defined by one or more structured query language expressions and wherein the structured query language expressions are used as input to an aggregation of the measure;
selecting each of the symmetric and asymmetric measures one at a time; and
for the selected one of the symmetric and asymmetric measures, determining whether the selected measure is compatible with previously selected measures, wherein compatible measures have a same specification of aggregation order for dimensions that the measures reference;

in response to determining that the selected measure is compatible, selecting another of the symmetric and asymmetric measures; and in response to determining that the selected measure is not compatible, determining whether one or more measures of the symmetric and asymmetric measures can be rewritten so that the selected measure is compatible with the previously selected measures;

in response to determining that the one or more measures of the symmetric and asymmetric measures can be rewritten, rewriting the one or more measures of the symmetric and asymmetric measures; and in response to determining that the one or more measures of the symmetric and asymmetric measures cannot be rewritten, generating a first structured query language statement for the symmetric measures;

generating a second structured query language statement for the asymmetric measures; and combining the first structured query language statement and the second structured query language statement for the symmetric and asymmetric measures into a single structured query language statement.

15. The system of claim 14, wherein each of the one or more structured query language expressions includes a template for building a query language expression.

16. The system of claim 15, wherein the template uses a token notation that references a specific column, attribute, or measure from a list of columns, attributes and measures.

17. The system of claim 14, wherein each of the one or more structured query language expressions includes a list of columns, attributes, and measures.

18. The system of claim 14, wherein the at least one program further comprises:
generating a new statement for retrieving multidimensional information, wherein the new statement is a structured query language statement and wherein the structured query language statement is generated based on the one or more aggregations in each of the measures.

19. The system of claim 18, wherein the one or more aggregations is a list of aggregations and wherein the list of aggregations comprises a list of aggregation functions and corresponding dimensions sets.

20. The system of claim 19, wherein the dimension set specifies NULL for a corresponding aggregation function to include all available dimensions other than dimensions specified in another aggregation function in the list of aggregations.

21. The system of claim 18, wherein the new statement is generated using metadata in a hierarchy to build ROLLUP clauses.

22. The system of claim 18, wherein the at least one program further comprises:
generating a SELECT statement for a grand total query.

23. The system of claim 18, wherein the at least one program further comprises:
generating a SELECT statement.

24. The system of claim 18, wherein the combining comprises use of a join.

25. The system of claim 14, wherein the at least one program further comprises:
generating a structured query language statement for creation of a cube view, wherein the structured query language statement is generated from metadata in the measures;
executing the structured query language statement to create the cube view; and
querying the cube view.

26. The system of claim 14, wherein the at least one program further comprises:
under control of an application program, generating a new structured query language statement to retrieve multidimensional information.

27. An article of manufacture embodied as a computer readable storage medium including a program for specifying on-line analytical processing multidimensional calculations, wherein the program, when executed by a processor of a computer, causes operations to be performed, the operations comprising:
accessing measures that include symmetric and asymmetric measures, wherein each of the symmetric measures have a single aggregation, and wherein each of the asymmetric measures have multiple aggregations, wherein a measure is defined by one or more structured query language expressions and wherein the structured query language expressions are used as input to an aggregation of the measure;
selecting each of the symmetric and asymmetric measures one at a time; and
for the selected one of the symmetric and asymmetric measures,
determining whether the selected measure is compatible with previously selected measures, wherein compatible measures have a same specification of aggregation order for dimensions that the measures reference;
in response to determining that the selected measure is compatible, selecting another of the symmetric and asymmetric measures; and
in response to determining that the selected measure is not compatible,
determining whether one or more measures of the symmetric and asymmetric measures can be rewritten so that the selected measure is compatible with the previously selected measures;
in response to determining that the one or more measures of the symmetric and asymmetric measures can be rewritten, rewriting the one or more measures of the symmetric and asymmetric measures; and
in response to determining that the one or more measures of the symmetric and asymmetric measures cannot be rewritten,
generating a first structured query language statement for the symmetric measures;
generating a second structured query language statement for the asymmetric measures; and
combining the first structured query language statement and the second structured query language statement for the symmetric and asymmetric measures into a single structured query language statement.

28. The article of manufacture of claim 27, wherein each of the one or more structured query language expressions includes a template for building a query language expression.

29. The article of manufacture of claim 28, wherein the template uses a token notation that references a specific column, attribute, or measure from a list of columns, attributes and measures.

30. The article of manufacture of claim 27, wherein each of the one or more structured query language expressions includes a list of columns, attributes, and measures.

31. The article of manufacture of claim 27, the operations further comprising:
generating a new statement for retrieving multidimensional information, wherein the new statement is a structured query language statement and wherein the structured query language statement is generated based on the one or more aggregations in each of the measures.

32. The article of manufacture of claim 31, wherein the one or more aggregations is a list of aggregations and wherein the list of aggregations comprises a list of aggregation functions and corresponding dimensions sets.

33. The article of manufacture of claim 32, wherein the dimension set specifies NULL for a corresponding aggregation function to include all available dimensions other than dimensions specified in another aggregation function in the list of aggregations.

34. The article of manufacture of claim 31, wherein the new statement is generated using metadata in a hierarchy to build ROLLUP clauses.

35. The article of manufacture of claim 31, wherein the operations for generation of the new statement further comprise:
generating a SELECT statement for a grand total query.

36. The article of manufacture of claim 31, wherein the operations for generation of the new statement further comprise:
generating a SELECT statement.

37. The article of manufacture of claim 27, wherein the combining comprises use of a join.

38. The article of manufacture of claim 27, the operations further comprising:
generating a structured query language statement for creation of a cube view, wherein the structured query language statement is generated from metadata in the measures;
executing the structured query language statement to create the cube view; and
querying the cube view.

39. The article of manufacture of claim 27, the operations further comprising:
under control of an application program, generating a new structured query language statement to retrieve multidimensional information.

* * * * *